US006531788B2

(12) United States Patent
Robson

(10) Patent No.: US 6,531,788 B2
(45) Date of Patent: Mar. 11, 2003

(54) SUBMERSIBLE ELECTRICAL POWER GENERATING PLANT

(76) Inventor: John H. Robson, 1167 Lomond Dr., Mundelein, IL (US) 60060

(*) Notice: Subject to any disclaimer, the term of this patent is extended or adjusted under 35 U.S.C. 154(b) by 0 days.

(21) Appl. No.: 09/791,278

(22) Filed: Feb. 22, 2001

(65) Prior Publication Data
US 2002/0158472 A1 Oct. 31, 2002

(51) Int. Cl.$^7$ .............. H02P 9/04; F03D 9/00; F03B 13/10; F03B 13/12; F03B 13/00
(52) U.S. Cl. .............. 290/43; 290/42; 290/53; 290/54
(58) Field of Search .............. 290/42, 43, 44, 290/53, 54; 114/274, 272, 61.1, 244; 405/7; 406/131, 187, 179; 60/495, 496

(56) References Cited

U.S. PATENT DOCUMENTS

| 365,133 | A | * | 6/1887 | Kessler .............. 415/7 |
| 2,501,696 | A | * | 3/1950 | Souczek .............. 290/43 |
| 3,973,864 | A | | 8/1976 | Atherton |
| 3,980,894 | A | | 9/1976 | Vary et al. |
| 3,986,787 | A | | 10/1976 | Mouton, Jr. et al. |
| 4,009,677 | A | * | 3/1977 | Croisant .............. 440/6 |
| 4,023,041 | A | | 5/1977 | Chappell |
| 4,025,220 | A | | 5/1977 | Thompson et al. |
| 4,038,821 | A | | 8/1977 | Black |
| 4,095,918 | A | | 6/1978 | Mouton, Jr. et al. |
| 4,134,710 | A | | 1/1979 | Atherton |
| 4,137,005 | A | | 1/1979 | Comstock |
| 4,140,433 | A | * | 2/1979 | Eckel .............. 290/55 |
| 4,163,904 | A | | 8/1979 | Skendrovic |
| 4,163,905 | A | | 8/1979 | Davison |
| 4,174,923 | A | | 11/1979 | Williamson |
| 4,203,702 | A | | 5/1980 | Williamson |
| 4,205,943 | A | | 6/1980 | Vauthier |
| 4,219,303 | A | | 8/1980 | Mouton, Jr. et al. |
| 4,256,970 | A | | 3/1981 | Tomassini |
| 4,306,157 | A | | 12/1981 | Wracsaricht |
| 4,335,093 | A | * | 6/1982 | Salomon .............. 114/102.29 |
| 4,335,319 | A | | 6/1982 | Mettersheimer |
| 4,383,182 | A | * | 5/1983 | Bowley .............. 290/43 |
| 4,467,218 | A | | 8/1984 | Andruszkiw et al. |
| 4,520,273 | A | | 5/1985 | Rowe |
| 4,524,285 | A | * | 6/1985 | Rauch .............. 290/43 |
| 4,551,066 | A | | 11/1985 | Frisz |
| 4,613,279 | A | * | 9/1986 | Corren et al. .............. 290/54 |
| 4,661,716 | A | * | 4/1987 | Chu .............. 290/53 |
| 4,684,817 | A | | 8/1987 | Goldwater |
| 4,748,808 | A | | 6/1988 | Hill |
| 4,818,888 | A | | 4/1989 | Lenoir, III |
| 4,843,249 | A | | 6/1989 | Bussiere |
| 4,850,190 | A | * | 7/1989 | Pitts .............. 60/398 |
| 5,266,006 | A | | 11/1993 | Tsui et al. |
| 5,372,617 | A | * | 12/1994 | Kerrebrock et al. .............. 366/151.1 |

(List continued on next page.)

FOREIGN PATENT DOCUMENTS

JP            406123274 A   *   5/1994

Primary Examiner—Nestor Ramirez
Assistant Examiner—Julio Gonzales Ramirez
(74) Attorney, Agent, or Firm—Meroni & Meroni, P.C.

(57) ABSTRACT

A submersible generating plant for producing electricity from ocean currents. The apparatus consists of two counter-rotating, rear-facing turbines with a plurality of rotor blades extending radially outward from two separate horizontal axis that convey the kinetic energy from the two side-by-side turbine rotors through separate gearboxes to separate generators that are housed in two watertight nacelles that are located sufficiently far apart to provide clearance for the turbine rotors. The two generators and their gearboxes serve as ballast and are located below a streamlined buoyancy tank that extends fore and aft above and between them. A leverage system having no moving parts adjusts lifting forces to balance changing downward vector forces that result from changes in drag acting on the downward angled anchor line.

98 Claims, 32 Drawing Sheets

U.S. PATENT DOCUMENTS

| | | | |
|---|---|---|---|
| 5,440,176 A | * | 8/1995 | Haining ........................ 290/42 |
| 5,661,259 A | * | 8/1997 | Cipolla ................... 114/144 R |
| 5,798,572 A | * | 8/1998 | Lehoczky .................... 290/43 |
| 5,834,853 A | | 11/1998 | Ruiz et al. |
| 5,937,644 A | | 8/1999 | Dipmall |
| 6,006,518 A | | 12/1999 | Geary |
| 6,064,123 A | | 5/2000 | Gislason |
| 6,091,161 A | * | 7/2000 | Dehlsen et al. ................ 290/43 |
| 6,104,097 A | * | 8/2000 | Lehoczky .................... 290/43 |
| 6,168,373 B1 | * | 1/2001 | Vauthier ..................... 415/221 |

* cited by examiner

SUBMERSIBLE ELECTRICAL POWER GENERATING PLANT

BACKGROUND OF THE INVENTION

1. Field of the Invention

The present invention relates to improvements on a submersible electrical power generating plant. More specifically, my invention is primarily intended for providing an improved electrical power generating plant that is able to generate electricity from the kinetic energy contained in steady ocean currents.

2. Description of the Prior Art

The wealth of the United States has been created largely through the exploitation of cheap energy provided by the past abundance of fossil fuels. Because of the increasing shortages of natural gas in North America and the approaching worldwide shortages of oil, and because of the growing danger of global warming caused by the combustion of fossil fuels, reliable sources of renewable energy are needed.

A growing percentage of the efforts to utilize renewable sources of energy has been concentrated in the creation of wind farms. Although wind powered generating systems should be encouraged, they do have a problem: wind energy is inherently intermittent. Wind speeds can fluctuate hourly and have marked seasonal and diurnal patterns. They also frequently produce the most power when the demand for that power is at its lowest. This is known in the electricity trade as a low capacity factor. Low capacity factors, and still lower dependable on-peak capacity factors, are the major source of wind power's problem. Because of the steadiness of the Coriolis force driven ocean currents, submersible generators can have capacity factors equal to those of many fossil fuel plants. The fact that these ocean currents can produce a steady supply of electricity, makes that power much more valuable than the intermittent power produced by the wind-driven turbines. For the submersible turbines to achieve the high capacity factors, however, proper placement is very important.

Ocean currents flow at all depths in the ocean, but the strongest usually occur in the upper layer which is shallow compared to the depth of the oceans. The main cause of surface currents in the open ocean is the action of the wind on the sea surface. A wind of high constancy, blowing over great stretches of an ocean, have the greatest effect on producing current. It is for this reason that the north-west and south-east trade winds of the two hemispheres are the mainspring of the ocean's surface current circulation. In the Atlantic and Pacific oceans the two trade winds drive an immense body of water westwards over a width of some 50 degrees of latitude, broken only by the narrow belt of the east-going Equatorial Counter-current, which is found a few degrees north of the equator in both of these oceans. A similar westward flow of water occurs in the South Indian Ocean, driven by the south-east trade wind. These westward surface currents produce giant eddies that are centered in latitudes of approximately 30° N. and S. that rotate clockwise in the northern hemisphere and counter-clockwise in the southern hemisphere. Currents of over 3.5 mph are confined to very restricted regions. They have been recorded in the equatorial regions of the oceans, and in the warm currents flowing to higher latitudes in the western sides of the oceans, with the exception of the Brazil current. The book, *Ocean Passages of the World* (published by the Hydrographic Department of the British Admiralty, 1950), lists 14 currents that exceed 3 knots (3.45 mph), a few of which are in the open ocean. The Gulf Stream and the Kuro Shio are the only two currents the book lists having velocities above 3 knots that flow throughout the year. Both of these currents are driven by the Coriolis force that is caused by the Earth's eastward rotation acting upon the ocean currents produced by the trade winds. Because these currents are caused by the Earth's rotation, they will continue flowing as long as our planet continues to turn on its axis.

The Gulf Stream starts roughly in the area where the Gulf of Mexico narrows to form a channel between Cuba and the Florida Keys. From there the current flows northeast through the Straits of Florida, between the mainland and the Bahamas, flowing at a substantial speed for some 400 miles. It hits its peak velocity off Miami, where the Gulf Stream is about 45 miles wide and 1,500 feet deep. There the current reaches speeds of as much as 6.9 mph in its narrow central axis, which is located less than 18 miles from shore between Key Largo and North Palm Beach. Farther along it is joined by the Antilles Current, coming up from the southeast, and the merging flow, broader and moving more slowly, continues northward and then northeastward, where it roughly parallels the 100-fathom curve as far as Cape Hatteras.

The Kuro Shio is the Pacific Ocean's equivalent to the Gulf Stream. A large part of the water of the North Equatorial current turns northeastward east of Luzon and passes the east coast of Taiwan to form this current. South of Japan, the Kuro Shio flows in a northeasterly direction, parallel to the Japanese islands, of Kyushu, Shikoku, and Honshu. According to *Ocean Passages of the World*, the top speed of the Kuro Shio is about the same as that of the Gulf Stream. The Gulf Stream's top flow rate is 156.5 statute miles per day (6.52 mph) and the Kuro Shio's is 153 statute miles per day (6.375 mph). Other possible sites for the underwater generators are the East Australian Coast current, which flows at a top rate of 110.47 statute miles per day (4.6 mph), and the Agulhas current off the southern tip of South Africa, which flows at a top rate of 139.2 statute miles per day (5.8 mph). Another possible site for these generators is the Strait of Messina, the narrow opening that separates the island of Sicily from Italy, where the current's steady counter-clockwise rotation is produced—not by the wind—but by changing water densities produced by evaporation in the Mediterranean. Oceanographic current data will suggest other potential sites.

Submersible turbine generating systems can be designed to efficiently produce power from currents flowing as slowly as 3 mph—if that flow rate is consistent—by increasing the size of the turbines in relation to the size of the generators, and by adding more gearing to increase the shaft speeds to the generators. Because the Coriolis currents can be very steady, capacity factors of between 70 percent and 95 percent are possible. This compares to capacity factors for well-located wind machines of between 23 percent and 30 percent. Because a well-placed submersible water turbine will operate in a current having even flow rates, it is possible for them to produce usable current one-hundred percent of the time.

Most water turbines are impulse and reaction turbines, which are very different from those that would be used for these underwater generators. Most water turbines obtain their kinetic energy from a head of water, making them well suited for dam sites. These submersible turbines would obtain no energy from a head of water and could be likened more to a child's pinwheel that would be powered by water rather than air. Although the turbines on the invention would have more in common with the wind turbines than the impulse and reaction water turbine, there would be major differences. The water would be much denser and would be moving much more slowly.

The amount of kinetic energy contained in a moving fluid can be calculated using the following formula:

$$KE = \tfrac{1}{2} \times M \times V^2.$$

M=mass per second
V=velocity

The mass is the weight of the fluid that passes through the diameter of the turbine's blades per second. This is obtained by calculating the area of the blade's sweep and multiplying that quantity by the distance the fluid traveled in one second. This volume is then multiplied by the weight of the fluid per cubic unit to get the mass. Because the mass passing through the blades in one second is a factor of the velocity, the power produced by the current does not increase by the square of the velocity, but by its cube. Therefore, the equation for the kinetic energy passing through the turbine can also be written:

$$KE = \tfrac{1}{2} \times A \times D \times V^3$$

A=area swept
D=density/cu. m.
V=velocity

Wind turbines that generate electric power usually have two or three long, narrow rotor blades. They have these long blades—not because they can capture the most kinetic energy from the wind—but because the blades must be able to survive violent wind conditions. A wind turbine with many blades or very wide blades would be subject to extremely large forces when the wind blows at hurricane velocities because the energy in the wind increases with the cube of its velocity. To limit the impacts from these extreme conditions, the manufacturers of wind machines prefer that their turbines have only two or three long and narrow rotor blades that can be feathered and locked. Because the underwater turbines would be powered by the relatively steady and comparatively slow movement of a medium that is approximately 870 times the density of air—instead of the water turbines having just two or three narrow blades to absorb the kinetic energy form a small percentage of the fluid passing through the rotor's sweep area—the water turbines can have full-bladed rotors with many wide blades that can cover most of their sweep areas. These solid rotors would allow the turbines to extract a larger percentage of the kinetic energy from the fluid passing through the sweep area. The water turbines' rotor blades would be cupped, with the cups being deeper near the hubs than out at the much faster moving tips. Because there are only small variations in the velocities of the Coriolis-force currents, there would be no need to feather or stop the blades.

Because the kinetic energy increases and decreases with the cube of the fluid's velocity, a 5 mph current can produce almost twice the power as a 4 mph current, using turbines of the same size. This does not mean that the turbines in the faster currents will always produce the most power per dollar invested because it is possible that turbines in somewhat slower currents near shore can have lower capital costs per kilowatt of generating capacity than those turbines placed in stronger currents much farther offshore. Turbines placed in slower currents will require larger rotors and more gearing to convert the slower turning, higher torque revolutions into the high rotation speeds required by the generators.

The highest operating efficiency obtainable by the narrow-bladed wind turbines under ideal conditions is about 45%. Even though it is possible for the water turbines to have higher efficiencies than 45% because of their full-bladed rotors, the following calculations are based on that efficiency. Assuming efficiencies of 45%, water turbines generating 600 kilowatts of electricity would require rotor diameters as shown in the following table:

| Rotor Diameters to Generate 600 Kilowatts of Electricity in Currents of Different Velocities in MPH Assuming 45% Efficiency | |
|---|---|
| current velocity | rotor diameter |
| 7.0 | 34.1 |
| 6.5 | 38.1 |
| 6.0 | 43.0 |
| 5.5 | 49.0 |
| 5.0 | 56.5 |
| 4.5 | 66.2 |
| 4.0 | 79.0 |
| 3.5 | 96.5 |
| 3.0 | 110.0 |

To produce the same amount of electric power from low current velocities as from high current velocities, not only are larger rotor diameters required, but also more gearing is required to increase the slower shaft speeds to those high RPMs shaft speeds required by the generators.

One factor that must be addressed when designing any submerged generator that will be tethered with an anchor system is the downward vector force that will be produced by the drag on the downward angled anchor line. The downward vector force increases in the same proportion as does the tangent of the anchor line's downward angle where the line attaches to the unit. If a unit was prevented from moving lower and the horizontal drag totaled 100,000 pounds, the downward forces and the pounds of pull on the anchor chain would increase as the chain angle increased as follows:

| anchor chain angle | pounds of downward vector force | pounds of tension on anchor line |
|---|---|---|
| 0° | 0 | 100,000 |
| 5° | 8,748 | 100,383 |
| 10° | 17,633 | 101,543 |
| 15° | 26,795 | 103,528 |
| 20° | 36,397 | 106,418 |
| 25° | 46,631 | 110,338 |
| 30° | 57,735 | 115,470 |
| 35° | 70,021 | 122,077 |
| 40° | 83,910 | 130,541 |
| 45° | 100,000 | 141,421 |
| 50° | 119,175 | 155,572 |
| 55° | 142,815 | 174,345 |
| 60° | 173,205 | 200,000 |

If the downward force is not equalized, the unit will be pulled down to that depth where the angle of the anchor chains' pull would be reduced enough so that the resulting downward vectored forces would equal the upward forces provided by the unit's buoyancy and hydrofoils. The forces would then be in equilibrium and the unit would remain at that depth—as long as there were no changes in the current's velocity or in the demands for electrical power. Increasing either of these would increase the horizontal resistance and cause the unit to sink lower. Because the downward forces increase at an increasing rate as the angle of the downward pull increases, the angle that the anchor chain attaches to the unit should be kept reasonably small. Another reason for keeping the anchor line angle small is that the forces pulling on the anchor line increase with the reciprocal of the cosine (the secant) of the angle—and, as that angle increases, increasing the pull on the anchor chain, the anchor's holding ability is decreasing.

Most wind turbines use a so-called three-phase asynchronous (cage wound) generator, also called an induction generator to generate alternating current. One reason for choosing this type of generator is that it is very reliable and tends to be comparatively inexpensive. The generator also has some mechanical properties, which are useful, such as generator "slip," and certain overload capability.

To increase the RPMs and reduce the torque to manageable levels, the power from the hubs are transferred in either three or four stages. The first stage consists of a strongly built planetary gear system. A second planetary gear system is either attached to a third planetary gear system or to helical gears, depending on the revolutions and torque of the shaft coming from the first stage. The last stage consists of helical gears—and, depending on the sizing of the gears in the first two or three stages, a fourth stage of helical gears might be required to increase the shaft speeds to the 1,200 to 1,800 RPMs required by the generators producing the 60 Hz current used in the US.

The generators and rotors can be any size as long as they are matched to each other and to the water velocity. The magnitude of voltage generated is fixed by the speed of the rotors and the number of magnetic lines per pole. The more poles there are, the more lines of magnetic force. This also means that the more poles there are, the slower the revolutions required to produce the same amount of power at the same frequency. The synchronous generator speeds required for electric generators can be calculated using the following formula:

$$(C \times 60)/(P/2)$$
C = frequency in cycles per second
P = the number of poles (an even number)

| Pole number | RPMs 50 Hz | 60 Hz |
|---|---|---|
| 2 | 3,000 | 3,600 |
| 4 | 1,500 | 1,800 |
| 6 | 1,000 | 1,200 |
| 8 | 750 | 900 |
| 10 | 600 | 720 |
| 12 | 500 | 600 |
| 16 | 375 | 450 |
| 20 | 300 | 360 |
| 40 | 150 | 180 |
| 80 | 75 | 90 |
| 100 | 60 | 72 |

Conventional wind-powered machines have compact generators that have 4 or 6 poles and use a rotor-gearbox-generator drive train. The Lagerway wind machines, made in Australia, use large diameter ring generators with many poles (more than 80) and no gearbox. Rather than using a 4 or 6 pole generator, an adaptation of the Lagerway ring generator can be used to reduce the gearbox requirements. A disadvantage of the Lagerway-type ring generators is that the nacelles' diameter must be much larger.

Electric generators produce heat. The electric current flowing through the conductors, both in the stator and rotor, produces heat because of the electrical resistance. In addition, heat is generated in the steel of the rotor armature core by the changing of magnetic lines. Although the amount of heat from all the losses in large generators is only about 1 percent of the output, it can it be numerically great. For example, a pair of generators producing 1,200 kW might have a loss of 12 kW, which is equivalent to 40,973 BTU per hour. Therefore, a liquid cooling system is needed to dissipate the heat produced by the generators and gearboxes.

Unlike most power plants, the submersible turbines will continue to spin whether there was a demand for the electricity or not. Because the turbines would operate best under steady loads and their operating costs would be zero, any power produced in excess of that needed by the grid system can be used to create energy in another form that can be stored for later use. This can include the production of hydrogen in facilities on land. The simplest way to obtain hydrogen is to split the water molecule into its basic elements by electrolysis. Feeding a direct current through a salt water electrolyte splits the water molecule into two atoms of hydrogen and one of oxygen, with the hydrogen gas collecting at the negatively charged cathode. Common energy efficiencies for electrolysis of water are at about 65%, but efficiencies of 80% to 85% are possible. The amount of hydrogen that can be produced by this method is directly proportional to the amount of electricity used. Instead of adding more generating capacity to handle the periods of peak demands, we should generate more than enough power from the water turbines' free energy to cover the peak loads and then add additional loads to fully utilize their generating capacity during periods of low demand. Not only can these submersible turbines eliminate the need for fossil fuels to produce electricity, they can also produce hydrogen to replace still more of the natural gas and petroleum that is being depleted, as well as provide the perfect fuel for fuel cells. Producing the hydrogen would also be beneficial environmentally because its combustion produces only water vapor.

An important consideration concerning the placing of these submersible generating units into service is that they will not be readily accessible for servicing and repair. It is possible for these underwater turbines to be designed to generate power for many years without any servicing. This can be accomplished by eliminating moving parts, by using materials that will not be affected by electrochemical reactions while immersed in a salt-water electrolyte and by electrolysis—and by depending on simplicity and the unchanging laws of physics. In those rare situations where a complex electrical depth control system must be used, reliability can still be achieved by building the proper redundancy into that system.

Most of the prior art for generating electricity from ocean currents can be grouped into a few categories. There are the water wheels and rotating canisters that are mounted on vertical shafts that have V-shaped, cupped or articulated buckets, fins, or flippers to reduce the resistance to the water when the periphery of the wheels are moving toward the current. U.S. patents in this group include U.S. Pat. No. 3,973,864 issued to Atherton, U.S. Pat. No. 4,038,821 issued to Black, U.S. Pat. No. 4,134,710 issued to Atherton, U.S. Pat. No. 4,551,066 issued to Frisz, U.S. Pat. No. 4,748,808 issued to Hill, U.S. Pat. No. 4,818,888 issued to Lenoir, and U.S. Pat. No. 6,006,518 issued to Geary. There are patents for devices having vertical turbines that are mounted on horizontal shafts that do not use shrouds or other devices that surround the rotors. These patents include U.S. Pat. No. 4,023,041 issued to Chappell, U.S. Pat. No. 4,137,005 issued to Comstock and U.S. Pat. No. 5,440,176 issued to Haining. Then there are more U.S. patents that use turbines mounted on horizontal shafts in which the rotors are enclosed in shrouds, flarings, hollow tubes, Venturi-shaped tubes, or have funnel-shaped intakes for the purpose of increasing the water velocity through the turbine. Examples of these include U.S. Pat. No. 3,980,894 issued to Vary, U.S. Pat. No. 3,986,787 issued to Mouton, U.S. Pat. No. 4,095,918 issued to Mouton, U.S. Pat. No. 4,163,904 issued to Skendrovic, U.S. Pat. No. 4,205,943 issued to Vauthier, U.S. Pat. No. 4,306,137 issued to Wracsaricht, U.S. Pat. No. 4,335,319 issued to Mattersheimer, U.S. Pat. No. 4,520,273 issued to Rowe, U.S. Pat. No. 6,064,123 issued to Gislason. Counter-rotating impellers are used in U.S. Pat. No. 4,203,702 issued to Williamson. The blades on these devices overlap and there are V-shaped diverters located ahead of the turbines force the fluid to the outside of the turbines. All the inventions mentioned above are devices that are mounted on underwater structures or are suspended from barges, pontoons, or platforms on pylons at the surface. The problem with mounting the generating devices on platforms is that the strongest currents are near the surface where the depths are usually greater than 1,200 feet and mounting the generating devices high above the ocean floor on giant structures would be extremely costly. The problem with suspending them from barges or pontoons is that they would interfere with ship traffic, be vulnerable to violent storms, and be unsightly.

Among the patented inventions to generate electricity from ocean currents, there are tethered devices that rely on hydrofoils and/or ballast tanks to provide lifting forces to keep the devices at the desired depths. U.S. Pat. No. 6,091,161 issued to Delhsen uses variable-pitch rotor blades to limit the drag force. Although this patent may have things in common with my invention in that they are both tethered and have counter-rotating, rear-facing turbines, the inventions are very different. The Delhsen's submersible underwater generating device would have little or no stability because, with the buoyancy tank between the heavy elements and not above them, its center of buoyancy is not above the center of gravity. Also the lifting force provided by the hydrofoil that joins the nacelles is at the same level as the heavy elements, further adding to a lack of stability. The upward canted hydrofoil wing tips that supposedly provide roll stability would have little or no effect unless the hitch points to the two anchor lines were lower. Because the anchor lines attach directly ahead of the center of drag, the canted wing tips would have little effect on stability. The resistance to roll is further decreased in the Delhsen invention by the anchor line's attachment point being at the same height as the center of buoyancy rather than below it. With the attachment point located there, if the device should have positive buoyancy, the canted wing tips would decrease stability. The placement of the stabilizer fin forward of the hydrofoil makes no sense. With the anchor attachment points being behind this "stabilizing fin," the fin would make the device more unstable. The device uses two anchors, each connected to capstans that are located at the front of each nacelle to adjust the anchor chains to eliminate yaw. The hydrofoil between the nacelles contains separate ballast tank compartments that are capable of being filled with fluid or purged to control buoyancy and the shift the center of buoyancy. The nacelles also contain buoyancy tanks that can be independently filled or purged to compensate for roll of the device. The Delhsen invention utilizes a computer system to balance those forces produced by the hydrofoil, buoyancy and drag to allow the device to seek that current that will allow for an even production of electric power. The drag force on the rotors is controlled by adjusting the pitch of the rotor blades so that the device seeks an initial equilibrium velocity of water current that will allow the tethered device to stay within a chosen predetermined depth range. A problem with this approach is that, although the purpose of the generator is to capture kinetic energy to maximize power output, it controls the depth by reducing that output.

U.S. Pat. No. 6,109,863 issued to Milliken is another tethered unit that consists of a buoyant device that contains two counter-rotating water wheels or turbines that are mounted side-by-side on vertical shafts. The vanes of the turbine have sub-vanes that open when the large vanes are moving toward the current to allow the water to pass through them. Although these are counter-rotating turbines that are side-by-side, because they are mounted on vertical shafts, their counter rotation has no effect on the device's stability. In this and all other devices that use turbines mounted on vertical shafts—not only are the areas for capturing the energy of the moving fluid small in proportion to the frontal area of the device, they waste additional energy because—even though the fins on the reverse side of the vertical turbine may fold or open to allow water to have much less resistance as they rotate toward the front of the turbine—they still produce some drag that must be subtracted from the power produced by that side of the turbine that is being pushed by the kinetic energy of the flowing water. The inefficiencies of all these vertical shafted turbines can be compared to using paddle wheels for propelling boats rather than modern propellers. Also the invention has no means of balancing changing downward vector forces that would result from changes in drag, caused by changes in either the current velocity or changes in the generator loads acting on the downward angled anchor line.

U.S. Pat. No. 4,219,303 issued to Mouton is a tethered unit with a pair of axle-less, counter-rotating, co-axial turbine wheels having ring rims that bear against friction drive wheels which turn one or more electrical generators that are contained in water-tight rooms within the wall of a nozzle or shroud that surround the periphery of the turbines. To increase the velocity of the water through the turbines, the device has an opening nozzle in the front that directs the water into a narrowing vena contracta, through the two counter-rotating, co-axial turbines and then on to an expanding shroud downstream that is for the purpose of increasing the water's velocity. This device depends on buoyancy and a weight on the bottom to maintain the proper depth. Many devices use vertical turbines mounted radially on horizontal shafts that are enclosed in shrouds, hollow tubes, Venturi-shaped tubes, or have funnel-shaped intakes to increase the fluid velocity through the turbines. Although it is possible for the velocity of the fluid passing through a vertical turbine's sweep area to be increased somewhat by using these devices, much of the kinetic energy contained in additional cross-section of the moving fluid is absorbed by those shrouds and funnel shaped devices in the form of increased frontal resistance (drag) that slows the water flow to offset some of the accelerated flow being channeled through the smaller constricted area of the turbine. Shrouds and Venturi-shaped tubes are not used on commercial wind-powered turbines because they do not increase the velocities enough to justify their cost. Instead of using these devices, the manufacturers of the wind machines increase the diameters of the turbine rotors. This is also the best approach for the water turbines.

A key consideration when designing a tethered submersible generator is that of stability. A fully submerged object that is floating freely in a liquid will always float with its center of buoyancy (the center of gravity of the fluid that the object is displacing) directly above the object's center of gravity. The prior art does not show tethered submersible electrical power plants that utilized this principal of physics.

Although previous inventions may also generate electric power with low operating costs, none can produce as much power at such low cost per kilowatt hour as my invention because of its highly efficient energy-collecting design and its extremely low maintenance requirements.

Accordingly, it is a principal object of my invention to provide a submersible electrical power generating plant that is capable of being free of service or replacement for many years.

It is a further object of my invention to provide a stable submersible electrical power generating plant that has its center of buoyancy located above its center of gravity.

It is a still further object of my invention to provide a submersible electrical power generating plant that has an adjustable center of gravity.

It is a further object of my invention to provide a submersible electrical power generating plant that is capable of generating electrical power from low speed current flow when equipped with turbines, generators, and gearing are properly sized for the slow current.

It is a still further object of my invention to provide a submersible electrical power generating plant that is made of carbon fiber composites.

It is a further object of my invention to provide a submersible electrical power generating plant that has improved directional stability.

It is a further object of my invention to utilize the same changes in the current's kinetic energy that changes the downward vector forces to adjust the lifting forces to balance those downward forces.

It is a further object of my invention to utilize those unchanging lifting forces produced by displacement to support the unchanging weight of the submersible electrical power generating plant, and to utilize those changing lifting forces that are produced by the hydrofoils to balance the changing downward vector forces.

Other objects of my invention, as well as particular features, elements, and advantages thereof, will be elucidated in, or apparent from, the following description and the accompanying drawing figures.

SUMMARY OF THE INVENTION

According to my present invention I have provided a submersible electrical power generating plant for generating electrical power with no fuel costs from the flow of ocean current.

In the present invention, a submersible electrical power generating plant for generating electrical power with almost no operating costs from the flow of ocean current has a submersible electrical power generating structure and an electrical power collection and transmission structure connected to the submersible electrical power generating structure for collecting and transmitting electrical current.

The submersible electrical power generating structure, made of carbon fiber composites, has a superior located center of buoyancy (the center of gravity of that water being displaced), an inferior located center of gravity and a center of drag (that point where sum of all the drag forces caused by every exposed part of an object moving through a fluid are balanced). The power generating structure has a streamlined torpedo-shaped buoyancy tank with a nose end, a rear end, a top side, a bottom side, a left side, a right side, a plurality of valves and a plurality of compartments. Said center of gravity of said submersible electrical power generating structure can be changed by adding water into or subtracting water from said streamlined torpedo-shaped buoyancy tank. The streamlined torpedo-shaped buoyancy tank has a vertical tail fin capable of improving directional stability of said submersible electrical power generating structure. Said vertical tail fin can be on either said top side of said submersible electrical power generating structure extending upward or said bottom side of said submersible electrical power generating structure extending downward. The water level in each of said plurality of compartments is adjustable by piping the water in and out through said plurality of valves. The power generating structure has a pair of side-by-side counter-rotating water turbine rotors. Said water turbine rotors are full-bladed, having wide rotor blades that cover most of the turbines' sweep area. Said pair of side-by-side counter-rotating full-bladed water turbine rotors are made of carbon fiber composites and sufficiently hollow so that their density is near that of the water that is displaced by said pair of side-by-side counter-rotating full-bladed water turbine rotors. Said pair of side-by-side counter-rotating full-bladed water turbine rotors turn so that both said plurality of first blades and said plurality of second blades are moving downward at the center of the submersible electrical power generating plant and upward on the outside of the submersible electrical power generating plant. One of said pair of side-by-side counter-rotating full-bladed water turbine rotors is a mirror image of said second water turbine rotor. Each of said pair of side-by-side counter-rotating full-bladed water turbine rotors has a horizontal water turbine axis parallel to said streamlined torpedo-shaped buoyancy tank. Each of said pair of side-by-side counter-rotating full-bladed water turbine rotors has a plurality of rotor blades, which extend radially outward from said horizontal water turbine axis. Said pair of counter-rotating full-bladed water turbine rotors are located beneath said streamlined torpedo-shaped buoyancy tank and facing rear end of said streamlined torpedo-shaped buoyancy tank. The power generating structure has a pair of watertight nacelles. Each of said pair of watertight nacelles is connected to one of said pair of horizontal water turbine axis. Said pair of watertight nacelles is firmly connected to each other through a center connecting means, which has an upside, a down side and a center point. The center point is located slightly forward of and below said center of drag of said submersible electrical power generating structure. Said center connecting means being securely mounted to said bottom side of said streamlined torpedo-shaped buoyancy tank through a third connecting means, which is long enough to ensure said submersible electrical power generating structure having said center of buoyancy above said center of gravity. Said pair of watertight nacelles are securely mounted to said bottom side of said streamlined torpedo-shaped buoyancy tank. Each of said pair of watertight nacelles has a low-speed shaft connecting to said horizontal water turbine axis, a gear box connecting to said low-speed shaft capable of converting low speed to high speed, a high-speed shaft connecting to said gear box, and an electrical power generator driven by said high speed shaft capable of generating electrical power. Said pair of watertight nacelles are located sufficiently far apart to provide clearance for said pair of side-by-side counter-rotating full-bladed water turbine rotors. Said center connecting means has a cooling system capable of effectively and efficiently distributing heat generated by said gear boxes and said electrical power generators to outside water.

To maintain a uniform depth, increases in the downward vector force that are caused by increased drag must be balanced by an equal and opposite lifting force. Those lifting forces that are produced by displacement are not affected by current velocity and are used primarily to provide some positive buoyancy to the submersible generator. Those lifting forces that are produced by the flow of a fluid over an airfoil-shaped hydrofoil are affected by current velocity, and these lifting forces are utilized to balance the changing downward forces by changing the hydrofoil's angle of attack. The angle of attack is increased by raising the front edge of the hydrofoil higher than the back edge of the hydrofoil in relation to the flow of the water. With the vertical height of the anchor line attachment point properly adjusted on a strong bar (which acts as a lever), increased drag—which will increase the downward vector force—will provide the proper leverage to that bar to cause the increased pull on the anchor line to cause the entire submersible power plant to rotate vertically (raising the nose and dropping the trail) so that the hydrofoils increasing angle of attack will provide only that additional lifting force required to balance the increased downward vector force—thereby allowing the submersible generating plant to remain at a reasonably uniform depth.

It should be further noted that because the exterior surface of the present invention will not corrode and because the present invention relies on the unchanging laws of physics and mechanical simplicity, it is capable of operating for between 8 and 20 years without servicing or replacement. The primary reason that the present invention would need to be brought out of the water for servicing is because of bio-fouling or biological growth of organisms on the exterior surfaces. For example, the hulls of ocean-going ships are often coated with anti-fouling paints that can keep the bio-organism growth under control for about 5 years. The reason that these organisms must be removed from ships is that their growth increases the drag of the hull moving through the water, reducing speed and increasing fuel consumption. Furthermore, a large build-up of bio-organisms can also make it difficult for ships to navigate.

Because the submersible turbines burn no fuel and do not navigate, a large build-up of bio-growth should have little or no effect on the present invention's efficiency. Only when the turbine blades acquire so much growth that they lose efficiency, will cleaning be necessary. The exterior surface of the present invention should be coated with a heavy coating of an anti-fouling paint before it is placed into service. With the proper antifouling coating, the present invention should operate without need for service or cleaning for at least 8 years, and a period of more than 20 years is possible. In this regard, the submersible electrical power generating plant is capable of being free of service or replacement for many years. It is neither mounted on underwater structures nor suspended from any structure at water surface. It is capable of generating electrical power from low speed current flow when equipped with larger turbines and/or smaller generators and more gearing. It is also capable of conveying kinetic energy by said pair of side-by-side counter-rotating full-bladed water turbine rotors through said pair of electrical power generators.

In a preferred embodiment, the power generating structure has an attaching device located at said center point of said center connecting means. The attaching device being adjustable up and down vertically by a device that may be powered by electricity or compressed air. With the vertical height of said attachment device properly adjusted at a point below and slightly forward of the submersible electrical power generating plant's center of drag, increases in the drag force will cause the submersible electrical power generating plant to rotate vertically which will increase the angle of attack of the airfoil-shaped hydrofoils by lifting the leading edge of the hydrofoil higher than the trailing edge in relation to the flow of water to increase the lifting force to balance the increased downward vector force caused by the increased drag acting through the downward angled anchor line.

The streamlined torpedo-shaped buoyancy tank has a pair of airfoil-shaped hydrofoils. One of said pair of airfoil-shaped hydrofoils is a mirror image of the other. One airfoil-shaped hydrofoils is fixed on said left side of said streamlined torpedo-shaped buoyancy tank projecting horizontally leftward. The other airfoil-shaped hydrofoil fixed on said right side of said streamlined torpedo-shaped buoyancy tank projecting horizontally rightward. Said pair of airfoil-shaped hydrofoils are located at said rear end of said streamlined torpedo-shaped buoyancy tank, which are capable of providing increasing lift while countering an increasing vertical rotational force that would result from an increasing drag acting on said anchor line's attachment point that is below said center of drag. Said pair of airfoil-shaped hydrofoils is capable of providing said submersible electrical power generating plant with equal and opposite lifting forces to balance changing downward vector forces with a depth-control system that uses no moving parts to keep said submersible electrical power plant at a uniform depth. The water level in each of said plurality of compartments is adjustable by piping the water in and out through said plurality of valves to make longitudinal adjustments of the center of gravity.

There is a weight member on ocean floor connecting to said submersible electrical power generating structure through a connecting means at said attaching device. Said weight member on ocean floor limiting the height of said submersible electrical power generating structure floating above the ocean floor.

In a second embodiment, the streamlined torpedo-shaped buoyancy tank has two pairs of airfoil-shaped hydrofoils instead of one pair. This is the only difference between the first embodiment and the second embodiment. One of the first pair of airfoil-shaped hydrofoils is a mirror image of the other. One of the first pair of airfoil-shaped hydrofoils is fixed on said left side of said streamlined torpedo-shaped buoyancy tank projecting horizontally leftward and the other is fixed on said right side of said streamlined torpedo-shaped buoyancy tank projecting horizontally rightward. Said first pair of airfoil-shaped hydrofoils located above said center of gravity of said submersible electrical power generating structure. The second pair of airfoil-shaped hydrofoils is located at rear end of the streamlined torpedo-shaped buoyancy tank. One of said second pair of airfoil-shaped hydrofoils is a mirror image of the other. One of said second pair of airfoil-shaped hydrofoils is fixed on said left side of said streamlined torpedo-shaped buoyancy tank projecting horizontally leftward and the other is fixed on said right side of said streamlined torpedo-shaped buoyancy tank projecting horizontally rightward. Both said first pair of airfoil-shaped hydrofoils and said second pair of airfoil-shaped hydrofoils are capable of providing said submersible electrical power generating structure with more lift and less drag at high angle of attack. Both said first pair of airfoil-shaped hydrofoils and said second pair of airfoil-shaped hydrofoils are capable of providing said submersible electrical power generating plant with equal and opposite lifting forces to balance changing downward vector forces with a depth-control system that uses no moving parts to keep said submersible electrical power plant at a uniform depth.

In a third embodiment, said center connecting means in the preferred embodiment has a horizontal level arm at said center point of said center connecting means extending horizontally backward toward said rear end of said streamlined torpedo-shaped buoyancy tank. Said horizontal level arm has another pair of horizontal fins. One horizontal fin is a mirror image of another horizontal fin. Said horizontal level arm and said pair of horizontal fins have a specific gravity near that of the water they are placed in. The horizontal level arm and the pair of horizontal fins are capable of keeping said pair of side-by-side counter-rotating full-bladed water turbine rotors facing directly into the current regardless of the nose-high attitude or position of the streamlined torpedo-shaped buoyancy tank.

In a fourth embodiment, the streamlined torpedo-shaped buoyancy tank has two pair of fins as those in the second embodiment. However, the first pair of fins has been modified. The first pair of airfoil-shaped hydrofoils has a first airfoil-shaped hydrofoil and a second airfoil-shaped hydrofoil. Said first airfoil-shaped hydrofoil has a first leading edge. Said second airfoil-shaped hydrofoil has a second leading edge. Both of said first pair of airfoil-shaped hydrofoils are self-adjusting lifting hydrofoils. Said first airfoil-shaped hydrofoil is a mirror image of said second airfoil-shaped hydrofoil. Said first airfoil-shaped hydrofoil is fixed on said left side of said streamlined torpedo-shaped buoyancy tank at a first pivoting point through a first pivoting member projecting horizontally leftward. A first front surface area of said first airfoil-shaped hydrofoil front of said first pivoting member is nearly equal to a first back surface area of said first airfoil-shaped hydrofoil behind said first pivoting member. Said first airfoil-shaped hydrofoil has a first lever arm. Said first lever arm attached to said first airfoil-shaped hydrofoil at said first pivoting point and extending vertically upward. Said first lever arm has a first flat plate. Said first flat plate is capable of being slid up and down said first lever arm and secured at any point. Said first airfoil-shaped hydrofoil has a first rod at said first leading edge. Said first rod extends forward has a first counter weight, which is capable of being secured at any point on said first rod. Said first leading edge is prevented from tipping below horizontal or any angle by said first adjustable stop. The second airfoil-shaped hydrofoil fixed on said right side of said streamlined torpedo-shaped buoyancy tank at a second pivoting point through a second pivoting member projecting horizontally rightward and has the same structure and features of said first airfoil-shaped hydrofoil. Said first airfoil-shaped hydrofoil and said second airfoil-shaped hydrofoil are linked together by a shaft extending horizontally through said streamlined torpedo-shaped buoyancy tank at both said first pivoting point and said second pivoting point. Said first pair of airfoil-shaped hydrofoils is located above or slightly forward of said center of gravity of said submersible electrical power generating structure. Said first pair of self-adjusting airfoil-shaped hydrofoils is capable of automatically adjusting the lifting force of said first pair of self-adjusting airfoil-shaped hydrofoils to balance changes in the downward force caused by changes in current velocity.

DESCRIPTION OF THE DRAWINGS

Other features of my invention will become more evident from a consideration of the following detailed description of my patent drawings, as follows.

DETAILED DESCRIPTION OF THE PREFERRED EMBODIMENT

Figure 1:
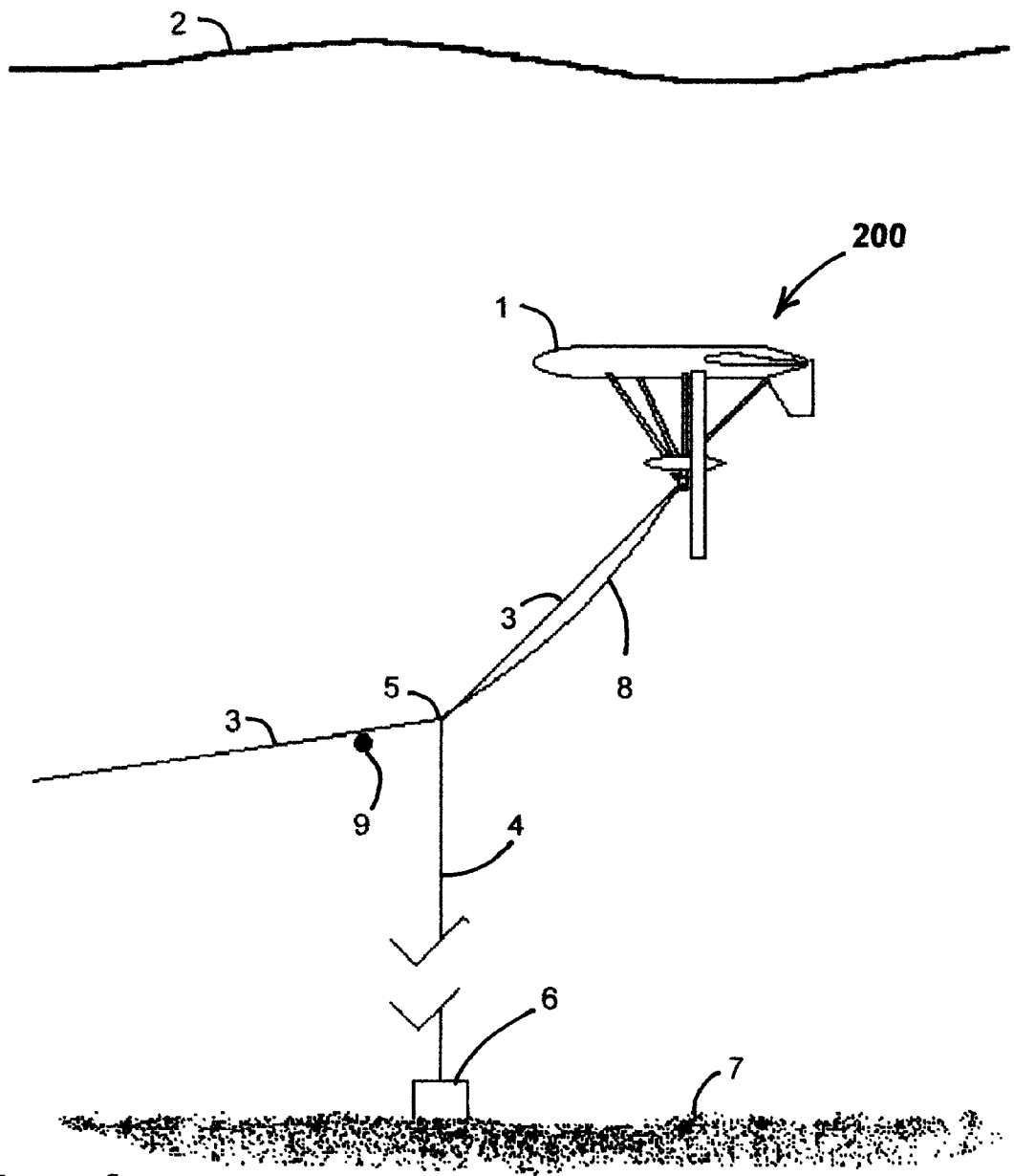
FIG. 1 is side view of the submersible electrical power generating plant with one pair of airfoil-shaped hydrofoil and a weight on the bottom.

Referring now to the drawings, the present invention concerns a submersible electrical power generating plant for generating electrical power with no fuel costs from the flow of ocean current. The invention disclosed a new and improved apparatus to capture the kinetic energy from the faster moving water that is near the surface of those steady currents that are primarily the result of the Coriolis force. Instead of building giant structures that rest on the sea floor, the invention utilizes the forces produced by buoyancy, hydrodynamics, kinetic energy, leverage and weight to keep the submerged generators aligned to the current and stable at the desired depth without relying on moving parts that can break or malfunction. The invention also includes modifications for use when conditions are not suitable for the primary invention. The invention consists of two counter-rotating, water turbines with a plurality of rotor blades extending radially outward from two separate horizontal axis that convey the kinetic energy from the two side-by-side rear-facing turbine rotors through separate speed increasing gearboxes to separate generators that are housed in separate watertight nacelles that are located sufficiently far apart to provide clearance for the turbine rotors. Said pair of side-by-side rear-facing turbine rotors are full-bladed, having a plurality of wide rotor blades that cover most of the turbines' sweep area. The side-by-side turbines and generators rotate in opposite directions so that the torque effect produced by one turbine and generator that would otherwise spin the unit in the direction opposite to the rotating turbine, is canceled by the opposite and equal torque from the other turbine. The invention's water-tight nacelles that contain the heavy generators and gearboxes are positioned below a torpedo-shaped buoyancy tank to provide stability.

Referring now to FIG. 1, which is a side elevation view of the submersible electrical power generating plant for generating electrical power with no fuel costs from the flow of ocean current. Said submersible electrical power generating plant 200 has a submersible electrical power generating structure 1, which is below the water's surface 2 tethered by an anchor line 3. A line 4 is connected to the anchor line at 5, with the line's other end connected to a weight member 6 that is on the sea floor 7. Said weight member 6 on ocean floor limiting the height of said submersible electrical power generating structure 1 floating above the ocean floor. An underwater electric cable 8 is connected to a larger gathering cable 9 that is neutrally buoyant that crosses the anchor lines to collect the electricity from many similar generating devices.

Referring now to FIGS. 2, 3, 27 and 28 which is a preferred embodiment of the current invention. The submersible electrical power generating structure 1 has a high center of buoyancy 221 (center of buoyancy is at the center of gravity of the water that is displaced), a low center of gravity 222 (adjusted with ballast water) and a center of drag 22 (that point where sum of all the drag forces caused by every exposed part of an object moving through a fluid is balanced). Said submersible electrical power generating structure 1 further comprises a streamlined torpedo-shaped buoyancy tank 11 with a nose end 23, a rear end 24, a top side 231, a bottom side 232, a left side 233, a right side 234, and a plurality of compartments 68, 69, 77, 78, 79, 80 and 101. Said center of gravity 222 of said submersible electrical power generating structure 1 can be changed vertically and longitudinally by adding water into or subtracting water from said streamlined torpedo-shaped buoyancy tank 11. Said streamlined torpedo-shaped buoyancy tank 11 has a vertical tail fin 20 capable of improving directional stability of said submersible electrical power generating structure 1, a pair of airfoil-shaped hydrofoils 10, a pair of side-by-side counter-rotating full-bladed water turbine rotors 16 and 28, and a pair of watertight nacelles 17 and 27. Said vertical tail fin 20 can be on either said top side 231 of said submersible electrical power generating structure 1 extending upward or said bottom side 232 of said submersible electrical power generating structure 1 extending downward.

Said pair of airfoil-shaped hydrofoils 10 has a first airfoil-shaped hydrofoil 201 and a second airfoil-shaped hydrofoil 202. Said first airfoil-shaped hydrofoil 201 is a mirror image of said second airfoil-shaped hydrofoil 202. Said first airfoil-shaped hydrofoil 201 is fixed on said left side 233 of said streamlined torpedo-shaped buoyancy tank 11 projecting horizontally leftward and said second airfoil-shaped hydrofoil 202 is fixed on said right side 234 of said streamlined torpedo-shaped buoyancy tank 11 projecting horizontally rightward. Said pair of airfoil-shaped hydrofoils 10 is located at said rear end 24 of said streamlined torpedo-shaped buoyancy tank 11. Said pair of airfoil-shaped hydrofoils 10 is capable of providing said submersible electrical power generating structure 1 with more lift and less drag at high angles of attack when the leading edges of the hydrofoils are higher than the trailing edges in relation to the flow of water. The water level in each of said plurality of compartments 68, 69, 77, 78, 80, and 101 is adjustable by piping the water in and out.

Said pair of side-by-side counter-rotating full-bladed water turbine rotors 16 and 28 are sufficiently hollow so that their density (specific gravity) is near that of the water displaced by said pair of side-by-side counter-rotating full-bladed water turbine rotors 16 and 28. Said pair of side-by-side counter-rotating full-bladed water turbine rotors 16 and 28 turn so that both said plurality of first blades 205 and said plurality of second blades 206 are moving downward at the center of the submersible electrical power generating plant 200 and upward on the outside of the submersible electrical power generating plant 200. Said pair of side-by-side counter-rotating full-bladed water turbine rotors 16 and 28 has a first water turbine rotor 16 and a second water turbine rotor 28. Said first water turbine rotor 16 is a mirror image of said second water turbine rotor 28. Said first water turbine rotor 16 has a first horizontal water turbine axis 203 parallel to said streamlined torpedo-shaped buoyancy tank 11 and a plurality of first rotor blades 205. Said plurality of first rotor blades 205 extend radially outward from said first horizontal water turbine axis 203. Said second water turbine rotor 28 has a second horizontal water turbine axis 204 parallel to said first horizontal water turbine axis 203 and a plurality of second rotor blades 206. Said plurality of second rotor blades 206 extend radially outward from said second horizontal water turbine axis 204. Said pair of counter-rotating full-bladed water turbine rotors 16 and 28 are located beneath said streamlined torpedo-shaped buoyancy tank 11 and facing rear end 24 of said streamlined torpedo-shaped buoyancy tank 11. Said pair of watertight nacelles 17 and 27 has a first watertight nacelle 17 and a second watertight nacelle 27. Said first watertight nacelle 17 connects to said first horizontal water turbine axis 203. Said second watertight nacelle 27 connects to said second horizontal water turbine axis 204. Both said first watertight nacelle 17 and said second watertight nacelle 27 are firmly connected to each other through a center connecting means 29 and 30. Said center connecting means 29 and 30 has an upside 207, a down side 208, a center support section 32, and a center point 209. Said center point 209 is located below and slightly forward of said center of drag 22 of said submersible electrical power generating structure 1. (The center of drag is the sum of the drag forces caused by every exposed part of an object moving through a fluid and it is located where all said drag forces are balanced). Said center connecting means 29 and 30 is securely mounted to said bottom side 232 of said streamlined torpedo-shaped buoyancy tank 11 through a third connecting means 12, 13, 14, 15, 25 and 26. Said center connecting means 29 and 30 has a cooling system 31 capable of distributing heat produced within the pair of watertight nacelles 17 and 27 to outside water. Said third connecting means 12, 13, 14, 15, 25 and 26 are long enough to ensure said submersible electrical power generating structure 1 having said center of buoyancy 221 located above said center of gravity 222. Said first nacelle 17 is securely mounted to said bottom side 232 of said streamlined torpedo-shaped buoyancy tank 11 through a first connecting means 13 and 14. Said second nacelle 27 is securely mounted to said bottom side 232 of said streamlined torpedo-shaped buoyancy tank 11 through a second connecting means 25 and 26. Said pair of watertight nacelles 17 and 27 is located sufficiently far apart to provide clearance for said pair of side-by-side counter-rotating full-bladed water turbine rotors 16 and 28.

Figure 12:
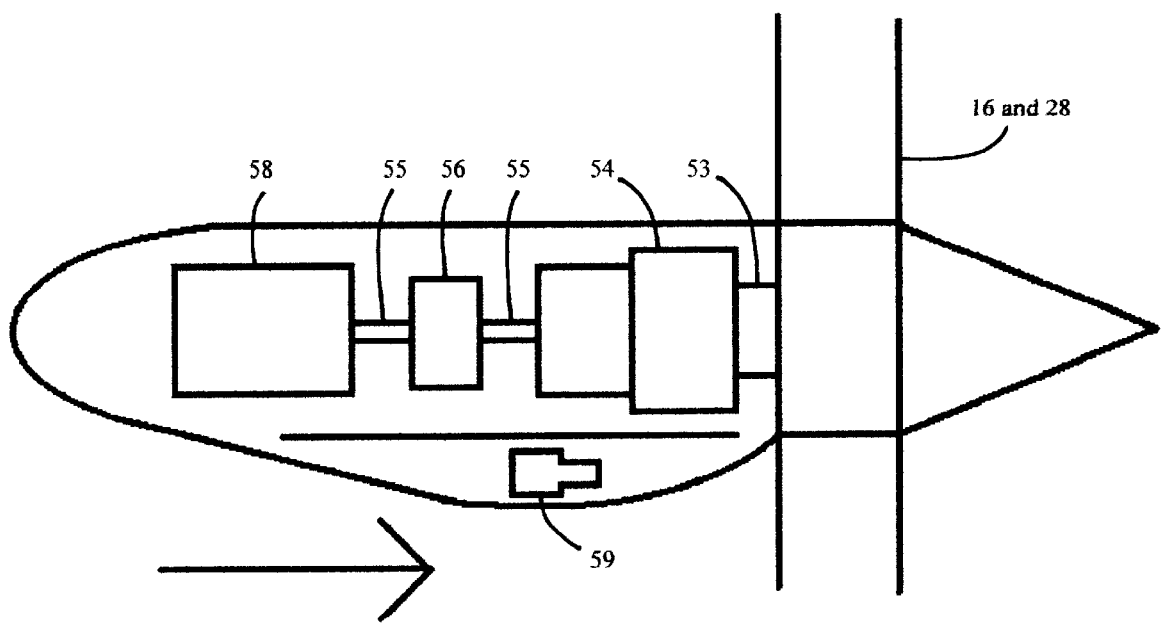
FIG. 12 is a cross section view of a nacelle.

Referring now to FIG. 12, which shows the inside structure of the first watertight nacelle 17. The first water turbine rotor 16 turns a first low-speed shaft 53 with great torque. A first gearbox 54 containing planetary and helical gears converts the low speed to high speed to drive a first high speed shaft 55. An eddy current clutch 56 makes the connection between the first high speed shaft 55 and 57 when the RPMs of the shaft are synchronized with the 60-cycle current to drive the first electrical power generator 58. The invention may be modified to produce the same amount of electricity from low current velocities by increasing the diameter of said pair of side-by-side counter-rotating full-bladed water turbine rotors 16 and 28 and by increasing the gearing in said first gearbox 54 in first watertight nacelle 17, and second gearbox (not shown) in said second watertight nacelle 27 to convert the slower shaft speed to the high shaft speed required by said generator 54. At the bottom of each of said nacelles is a float operated sump pump 59. Since the second watertight nacelle 27 is a mirror image of said first watertight nacelle 17, the second watertight nacelle 27 has a similar structure as the first watertight nacelle 17. All said first gear box 54, said second gear box, said first low-speed shaft 53, said second low-speed shaft, said first high-speed shaft 55, said second high-speed shaft, said first electrical power generator 58 and said second electrical power generator are lubricated and cooled by oil.

Figure 2:
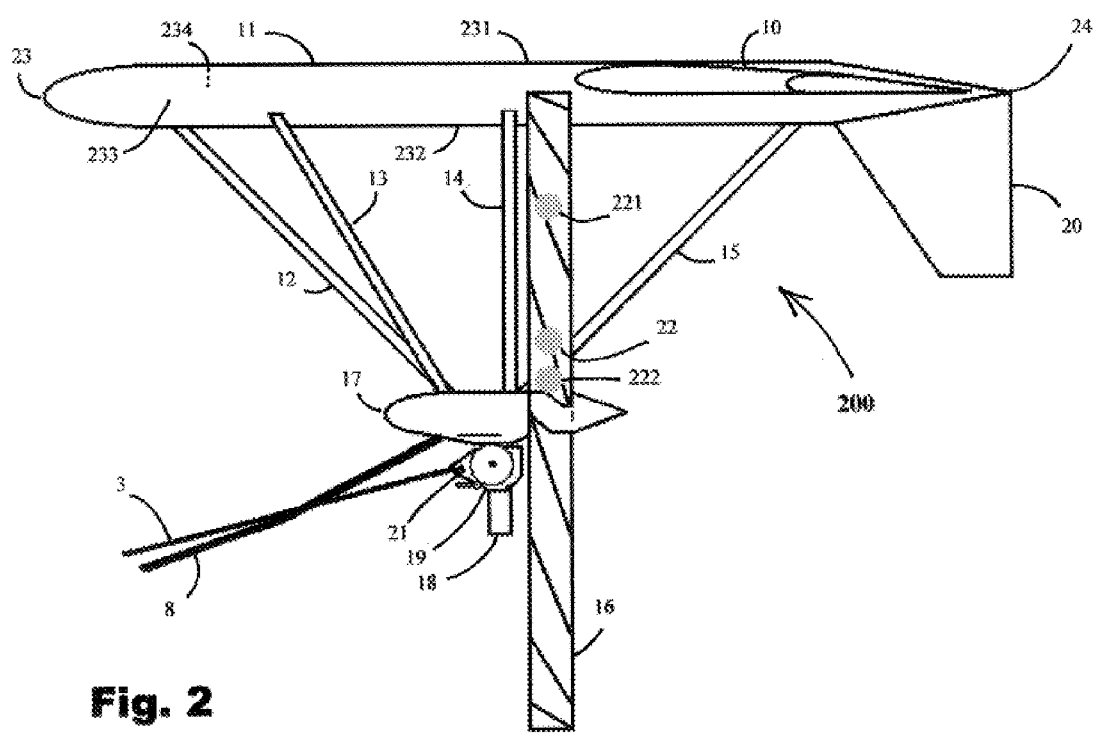
FIG. 2 is a side view of the submersible electrical power generating structure in FIG. 1.
Figure 3:
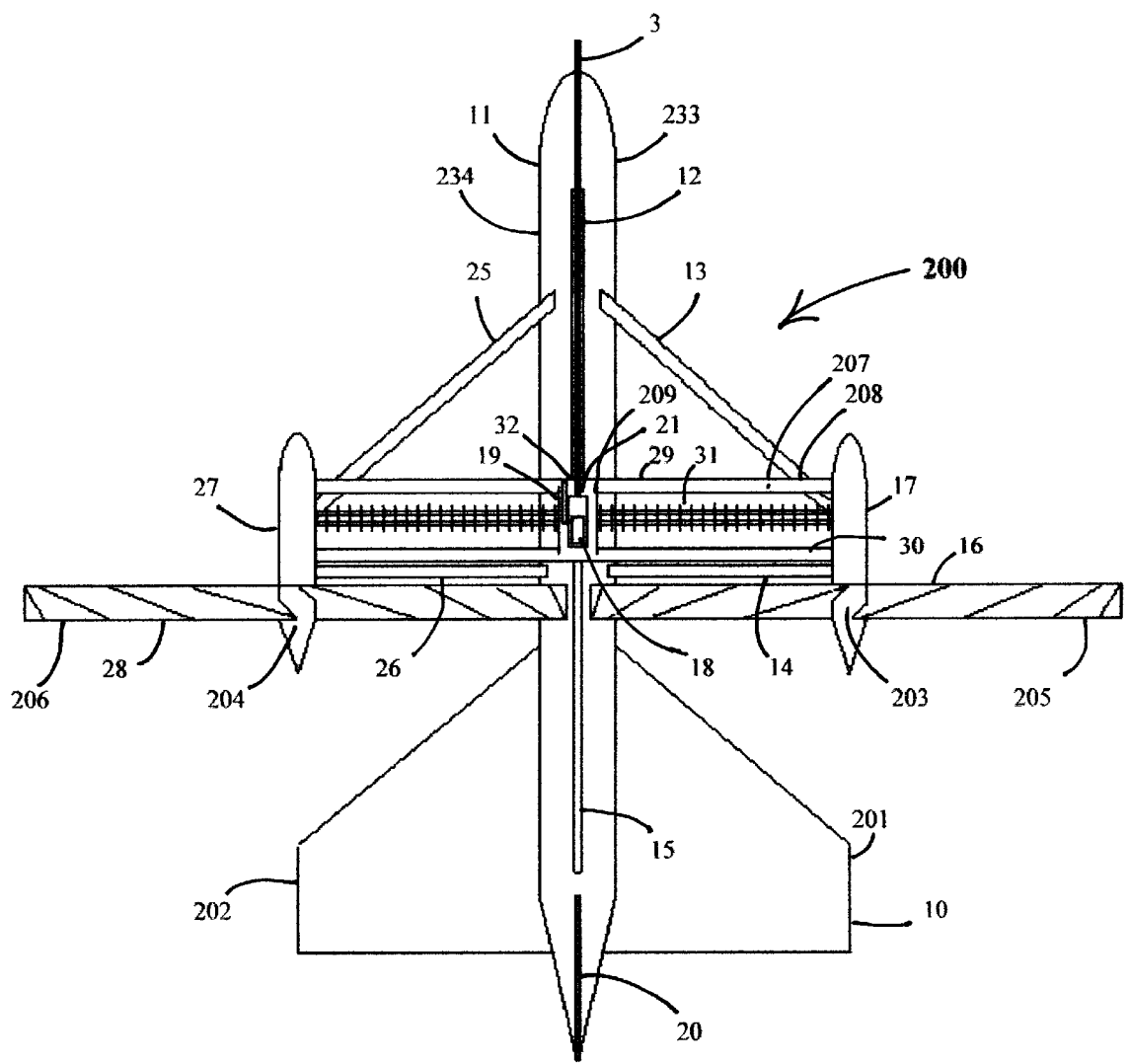
FIG. 3 is a bottom view the submersible electrical power generating structure in FIG. 2.

Referring to FIGS. 2 and 3, the anchor line 3 attaches at 21 to an attaching device 19 is located on a strong bar 18 fixed at said center point 209 of said center connecting means 29 and 30. Said attaching device 19 is adjustable up and down vertically along said strong bar 18 by a device that may be powered by electricity or compressed air to change angle of attack of said pair of airfoil-shaped hydrofoils 10 to increase the lifting force on said submersible electrical power generating structure 1 to balance an increase in the downward vector force resulting from an increased drag acting through a downward angled anchor line 3. Once the height of the anchor line's attachment device 19 has been adjusted to provide the proper leverage to the strong bar 18, the changing angle of attack of the hydrofoils 10 will, without any parts moving, increase the lifting force to balance the increasing downward vector force resulting from increases in drag on the anchor line 3, thereby keeping the submersible generating plant 1 at a uniform depth. Said submersible electrical power generating structure 1 is made of carbon fiber composites that do not corrode. Therefore, said submersible electrical power generating structure 1 in the current invention is capable of being free of service or replacement for many years. The submersible electrical power generating plant 1 in this invention is neither mounted on underwater structures nor suspended from any structure at water surface. The submersible electrical power generating plant is capable of generating electrical power from low speed current flow when equipped with larger turbine rotors 16 and 28 in relation to the size of the generators 58 and with additional gearing at 54. The submersible electrical power generating plant is capable of conveying kinetic energy by said pair of side-by-side counter-rotating full-bladed water turbine rotors 16 and 28 through either said first electrical power generator 58 or said second electrical power generator.

Figure 4:
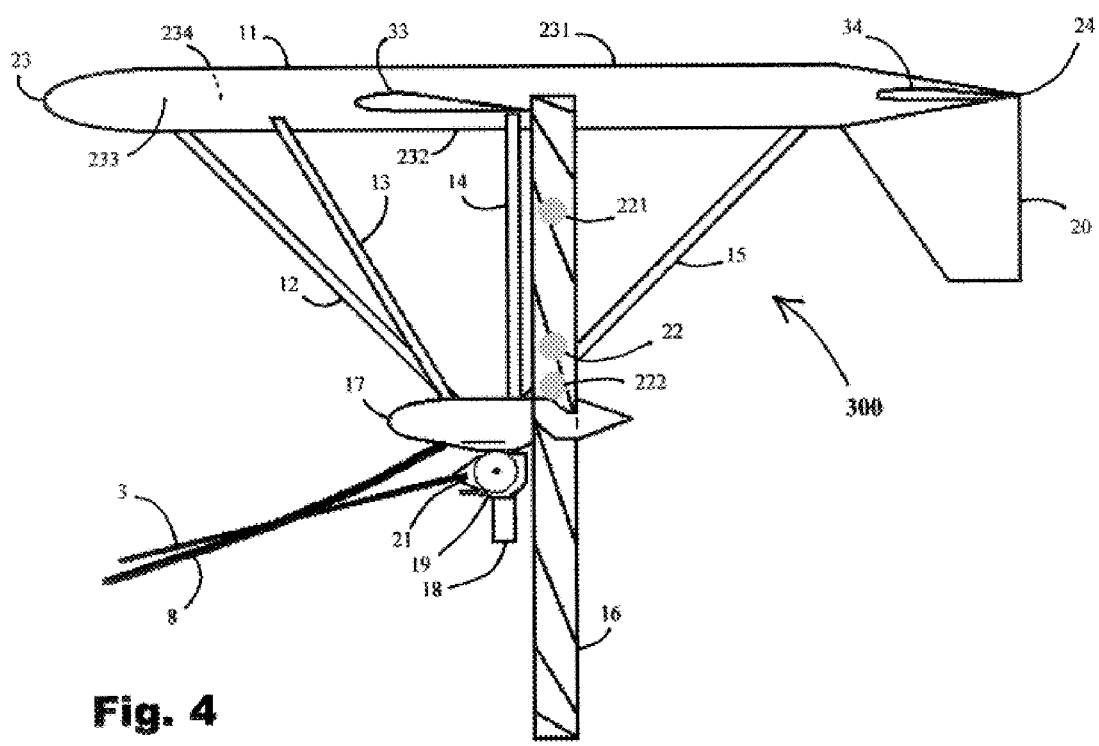
FIG. 4 is a side view of the submersible electrical power generating structure with two pairs of airfoil-shaped hydrofoil.
Figure 5:
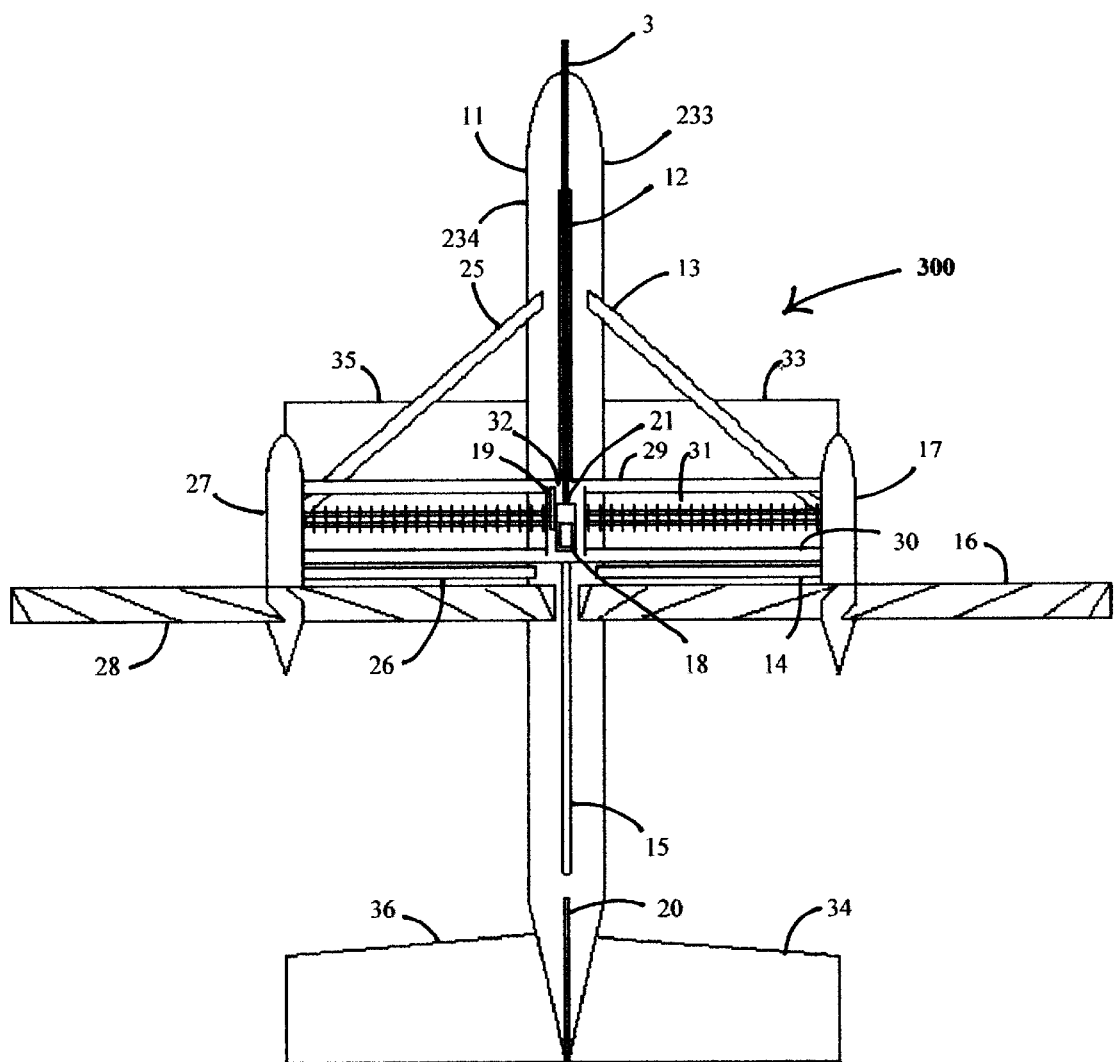
FIG. 5 is a bottom view of the submersible electrical power generating structure in FIG. 4.
Figure 6:
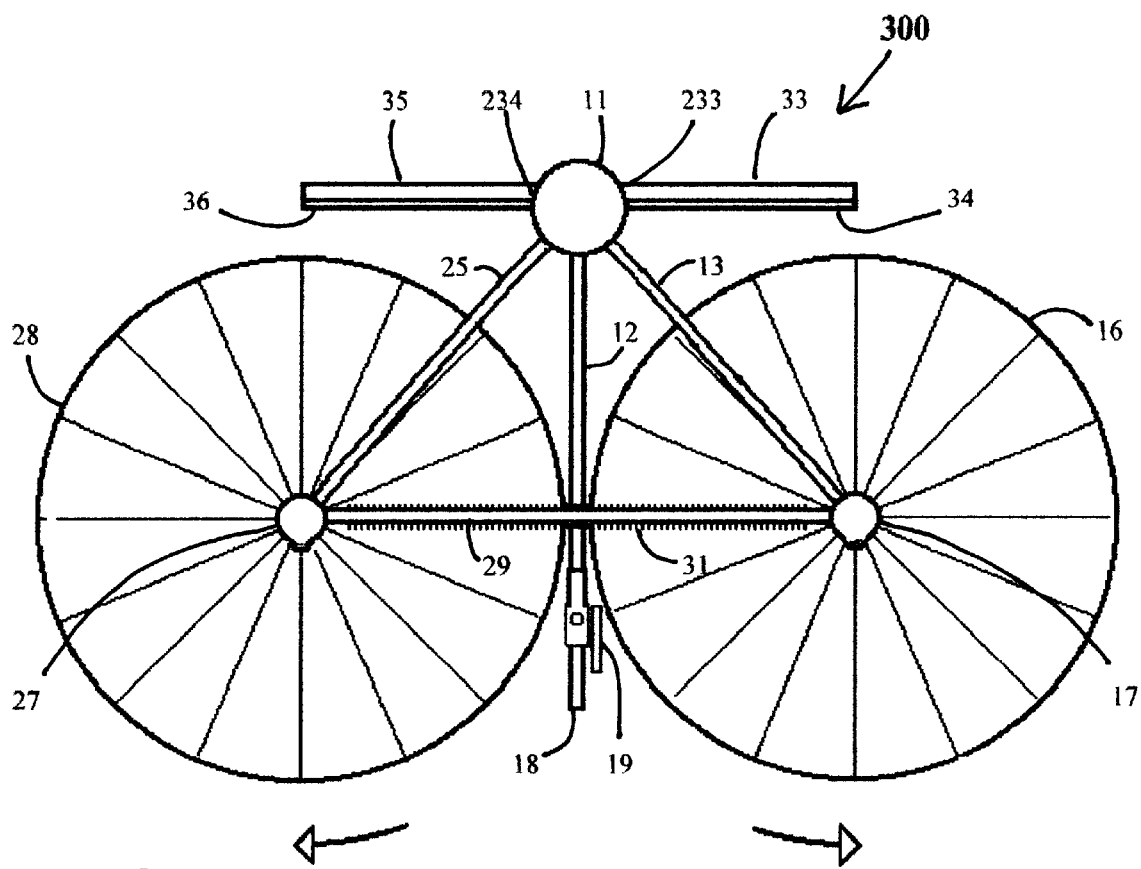
FIG. 6 is a front elevation view of the submersible electrical power generating structure in FIG. 5.

Referring now to FIGS. 4, 5 and 6, which shows a second embodiment of the current invention. With the exception of the two pairs of airfoil-shaped hydrofoils 33, 34, 35 and 36 this modification is similar to the preferred embodiment shown in FIG. 2. A submersible power generating structure 300 in the second embodiment has a first pair of airfoil-shaped hydrofoils 33 and 35 and a second pair of airfoil-shaped hydrofoils 34 and 36. The first pair of airfoil-shaped hydrofoils 33 and 35 has a first airfoil-shaped hydrofoil 33 and a second airfoil-shaped hydrofoil 35. Said first airfoil-shaped hydrofoil 33 is a mirror image of said second airfoil-shaped hydrofoil 35. Said first airfoil-shaped hydrofoil 33 is fixed on said left side 233 of said streamlined torpedo-shaped buoyancy tank 11 projecting horizontally leftward and said second airfoil-shaped hydrofoil 35 fixed on said right side 234 of said streamlined torpedo-shaped buoyancy tank 11 projecting horizontally rightward. Said first pair of airfoil-shaped hydrofoils 33 and 35 is located above and slightly forward of said center of gravity 222 of said submersible electrical power generating structure 300. Said second pair of airfoil-shaped hydrofoils 34 and 36 has a third airfoil-shaped hydrofoil 34 and a fourth airfoil-shaped hydrofoil 36. Said third airfoil-shaped hydrofoil 34 is a mirror image of said fourth airfoil-shaped hydrofoil 36. Said third airfoil-shaped hydrofoil 34 is fixed on said left side 233 of said streamlined torpedo-shaped buoyancy tank 11 projecting horizontally leftward and said fourth airfoil-shaped hydrofoil 36 is fixed on said right side 234 of said streamlined torpedo-shaped buoyancy tank 11 projecting horizontally rightward. Said second pair of airfoil-shaped hydrofoils 34 and 36 is located at said rear end 24 of said streamlined torpedo-shaped buoyancy tank 11. Because the anchor line attachment point is below the center of drag, if there is an increase in the drag, the increased force on the anchor line will cause the submersible generating power plant 300 to rotate vertically which will cause both said first pair of airfoil-shaped hydrofoils 33, 35 and said second pair of airfoil-shaped hydrofoils 34, 36 to increase angle of attack to increase lift to offset the increased downward vector force caused by said increased in drag acting through the downward angled anchor line.

Figure 7:
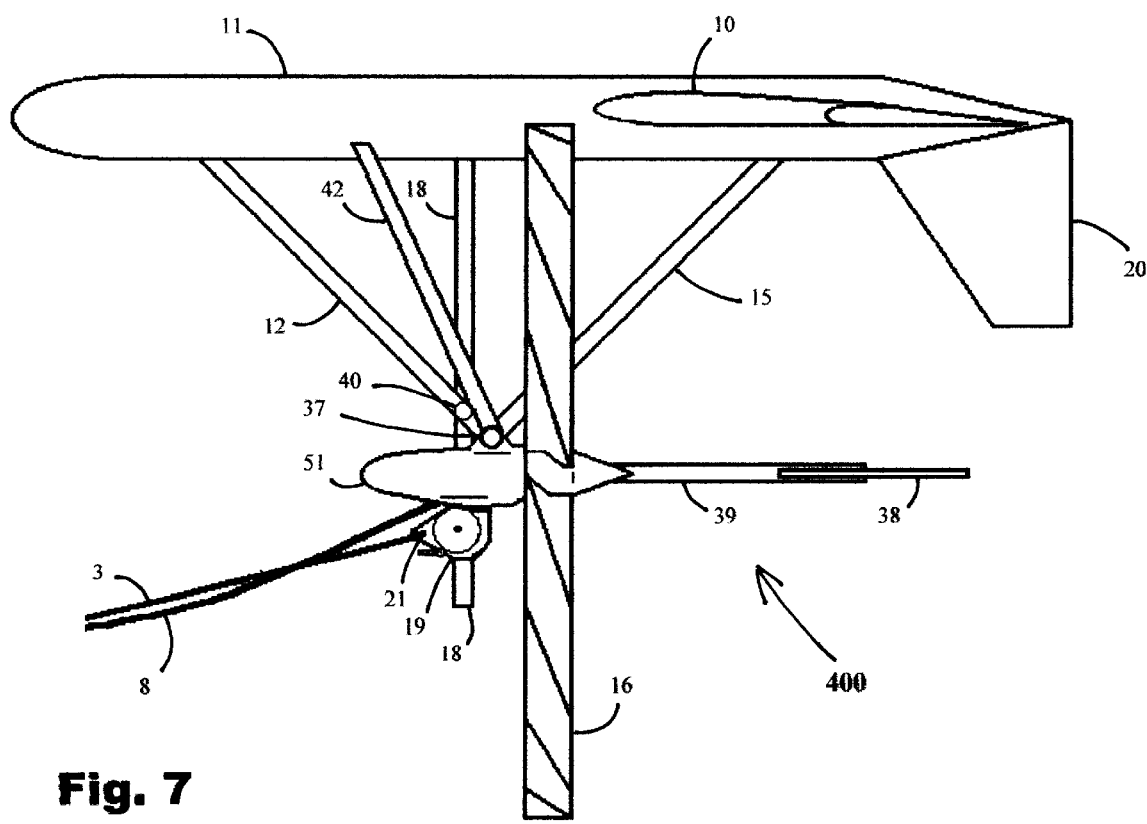
FIG. 7 is a side view of the submersible electrical power generating structure with one pair of airfoil-shaped hydrofoil and a horizontal level arm.
Figure 16:
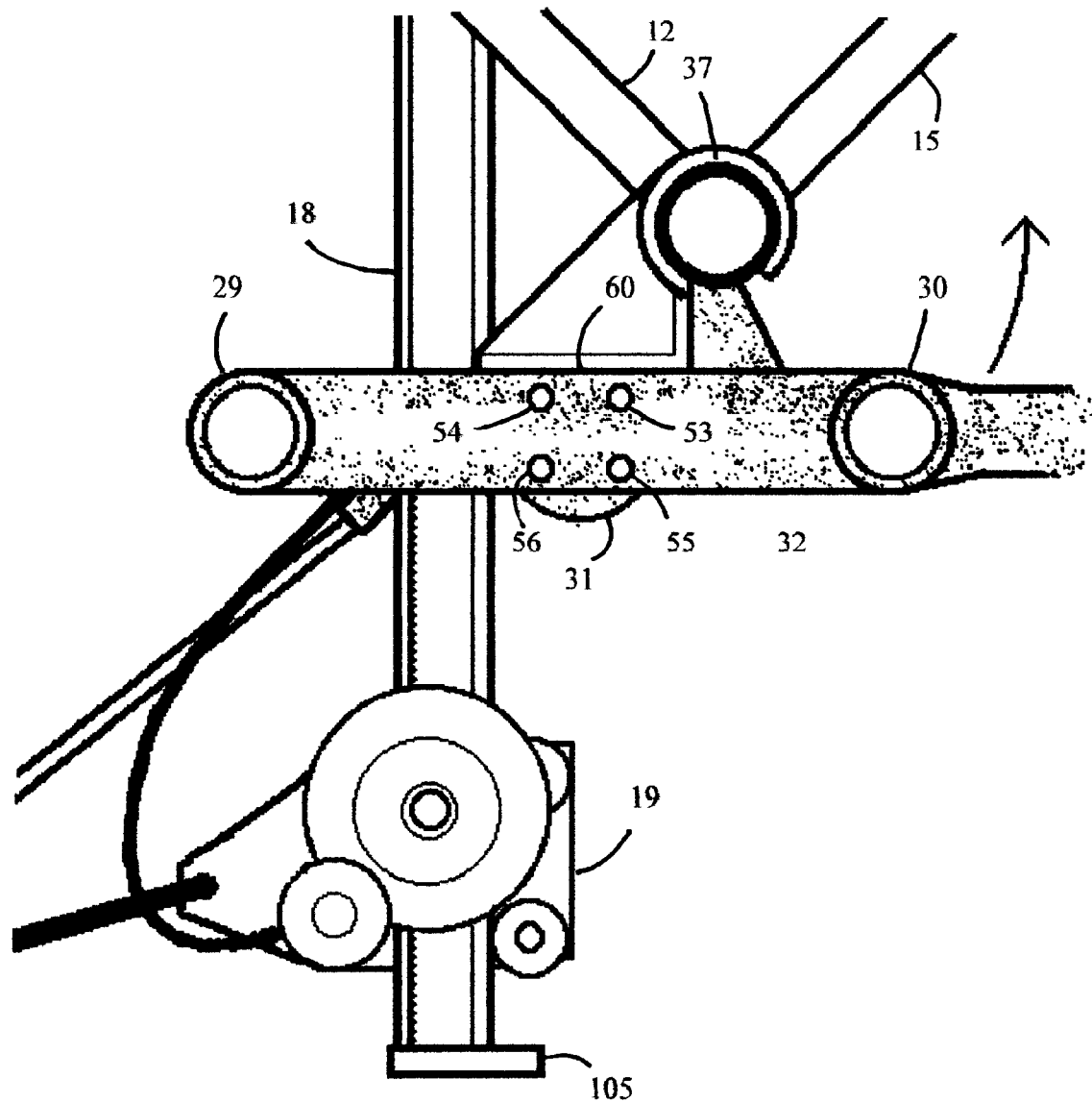
FIG. 16 is a cross section view of center structure in FIG. 7.

Referring now to FIG. 7, which is a third embodiment of the current invention, which is the modification of the preferred embodiment with pivoting water turbine rotors and watertight nacelles. If there was a wide variation in the strength of the current, this pivoting feature would produce more net lifting force when the current was flowing the strongest because this feature would eliminate that downward force that would otherwise be produced by the water's kinetic energy striking the water turbine rotors 16 and 28 while they are canted backwards at the top. The components are numbered as for the invention in FIG. 2 with the exception of the pivoting point 37, the horizontal pivot control fin 38, and the fin's lever arm 39. The nacelles 17 and 27 are replaced with similar nacelles 51 and 52 that connect to the pivoting point 37 that is above said nacelles. In the third embodiment, the strong bar 18 extends up to the streamlined torpedo-shaped buoyancy tank 11 and said strong bar 18 is attached to the brace 12 at point 40. A requirement for this system to work is that the water turbine rotors 16 and 18, lever arm 39 and fin 38 must have a specific gravity near that of the salt water they displace, which eliminates all materials with the exception of carbon fiber composites used with honeycomb. This light material would allow the pivoting point 37 to be directly over the submerged center of gravity of the pivoting portion of the generating device, which would be determined by the generators and gearbox weights within the watertight nacelles 51 and 52. FIG. 16 illustrates the stop that limits the pivoting movement of the watertight nacelles 51 and 52 and the pair of side-by-side counter-rotation full bladed water turbine rotors 16 and 28.

The third embodiment added the level arm feature to the preferred embodiment. The submersible electrical power generating structure 400 has a horizontal level arm 39 at said center point 209 of said center connecting means 29, 30 extending horizontally backward toward said rear end of said streamlined torpedo-shaped buoyancy tank 11. Said horizontal level arm 39 has a second pair of horizontal fins 38. Said second pair of horizontal fins 38 has a third horizontal fin 210 and a fourth horizontal fin 211. Said third horizontal fin 210 is a mirror image of said fourth horizontal fin 211. Said horizontal level arm 39 and said second pair of horizontal fins 38 have a specific gravity near that of water into which they are placed so that the submerged center of gravity for the pivoting portion of the generating device is directly under the pivot point 37. Said second pair of horizontal fins 38 is capable of keeping said pair of side-by-side counter-rotating full-bladed water turbine rotors 16, 28 facing directly into the current regardless of the nose-high attitude or position of the streamlined torpedo-shaped buoyancy tank 11.

Figure 8:
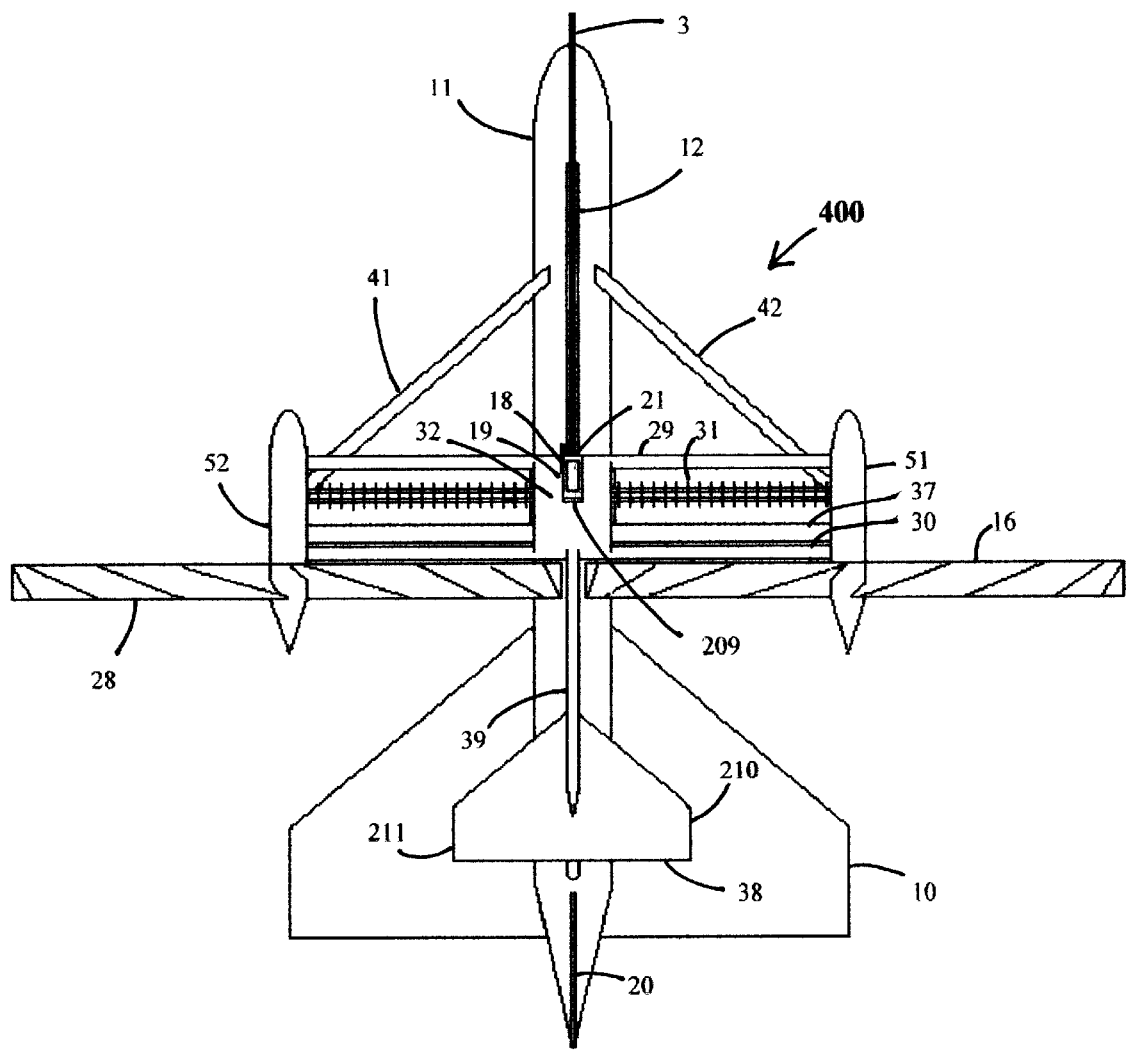
FIG. 8 is a bottom view of the submersible electrical power generating structure in FIG. 7.

FIG. 8 is a bottom view of FIG. 7. To allow room for the rotors to pivot, the angled vertical brace members 14 and 26 and the forward angled brace members 13 and 25 are replaced with forward canted braces 41 and 42. All other components are identified in FIG. 2 and FIG. 7.

Figure 9:
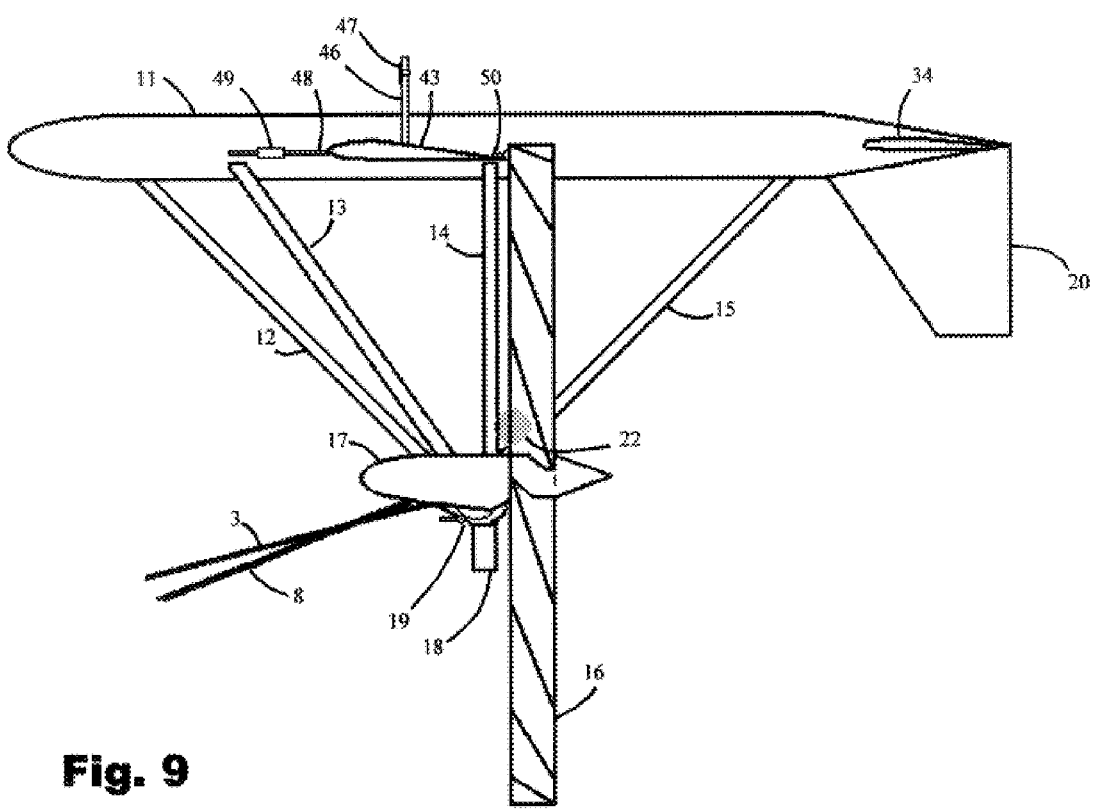
FIG. 9 is a side view of the submersible electrical power generating structure with two pairs of airfoil-shaped hydrofoil, one pair of which is a pair of self-adjusting hydrofoil.

FIG. 9 is fourth embodiment of the current invention. The fourth embodiment is a modification of the second embodiment shown in FIG. 4. The fourth embodiment is equipped with a self-adjusting lifting hydrofoil 43. All other component numbers are the same as those in FIG. 4. Instead of the entire generating device rotating in response to an increased force being applied against the low hitch point of the preferred embodiment, second embodiment and third embodiment, in this modification only the self-adjusting hydrofoils rotate to keep the submerged generating device at a constant depth in fluctuating currents.

Figure 10:
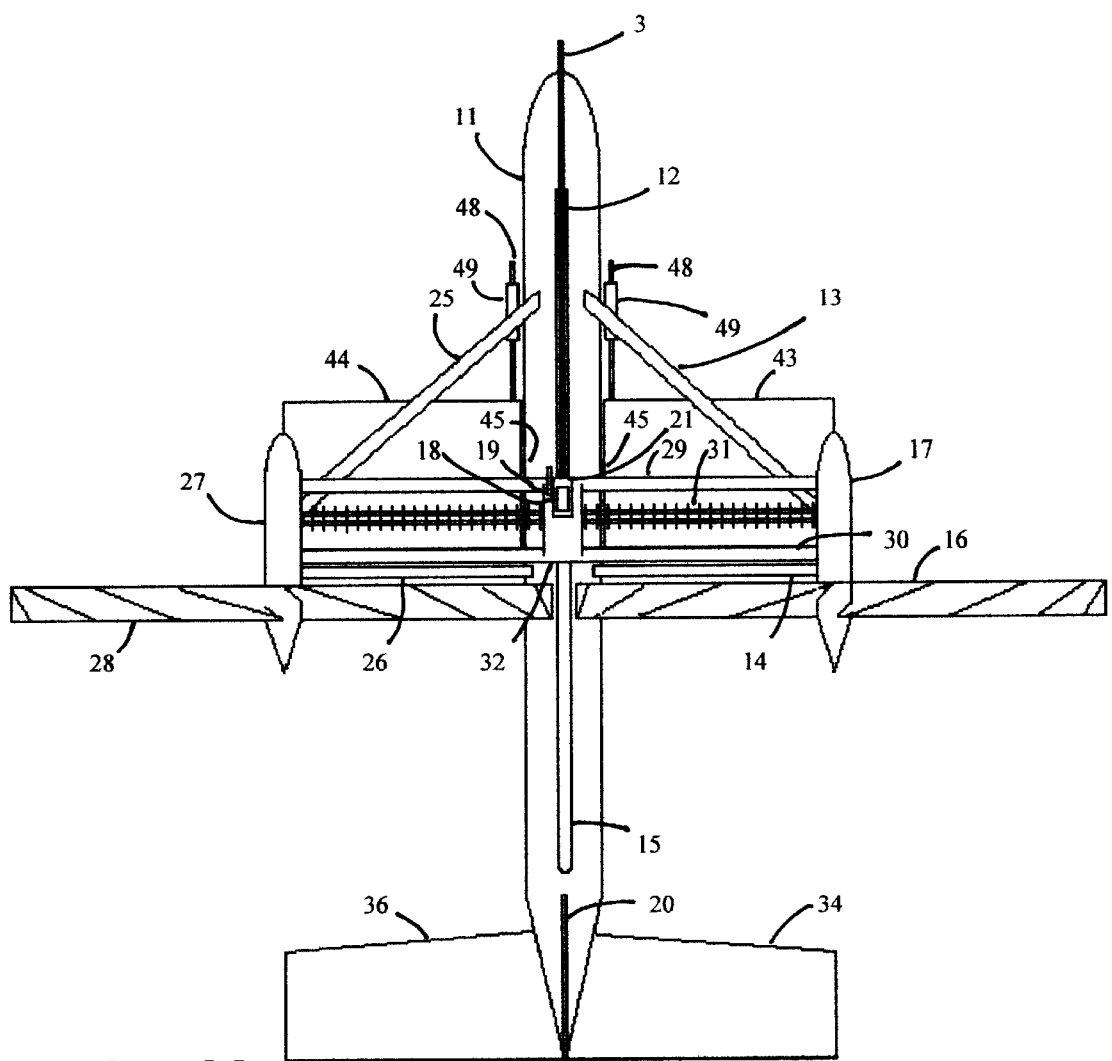
FIG. 10 is a bottom view of the submersible electrical power generating structure in FIG. 9.

FIG. 10 shows a bottom view of the fourth embodiment shown in FIG. 9. All component numbers are the same as those in FIG. 4 except that the stationary fins 33, 35 are replaced with the self-adjusting hydrofoils 43 and 44. Because the fins 43 and 44 must operate in unison, they are linked together at their pivoting point 45 by a shaft that runs through the width of said buoyancy tank 11.

Figure 11:
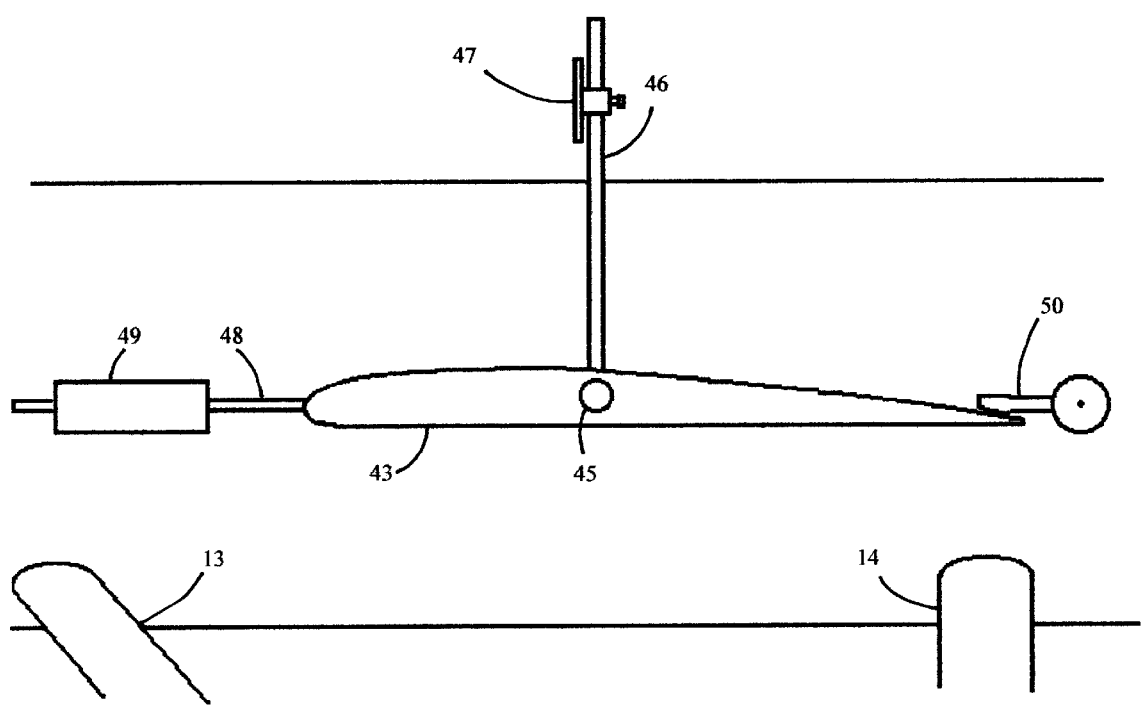
FIG. 11 is side view of the self-adjusting hydrofoil in FIG. 9.

FIG. 11 illustrates the working components of the self-adjusting fin 43 on the left side of the invention. To reduce the forces needed to move the fin 43, the surface area of said fin 43 forward of the pivoting point 45 is nearly equal to the area behind the pivoting point 45 so that the kinetic energy forces from the moving water pushing on the front portion nearly balance those pushing on the rear portion. A lever arm 46 is attached to the fin 43 at the pivoting point 45 and extend vertically upward. To this lever arm 46 is attached a flat plate 47 that can be slid up and down the lever arm 46 and secured at any point. Also, affixed to the leading edge of the fin 43 is a rod 48 that extends forward onto which a counter weight 49 can be secured at any point. The fin's leading edge would be prevented from tipping below horizontal or any angle by an adjustable stop 50. When the current is weak, the counter weight 49 would more than balance the mass of the front of the fin 43 with the mass of the rear portion to keep the front of the fin 43 as low as the stop 50 permits, thereby providing little or no lift. With the height of the movable plate 47 properly adjusted on the lever arm 46—as the current increased, increasing the downward vector force that would pull the submersible electrical power generating structure 1 down to greater depths—the increasing kinetic energy of the water pushing back against the plate will push said lever arm 46 rearward, causing the hydrofoil 44 to rotate to increase its angle of attack. This would increase the upward lifting force to neutralize the increasing downward force resulting from the current's greater velocity. By locating said self-adjusting fins 43 at or slightly foreword of the generating units submerged center of gravity, said self-adjusting fins 43 would change the lifting force while allowing the unit to remain in level trim. For the self-adjusting hydrofoils to work properly, the device 19 to which the anchor line is attached should be higher on bar 18 than for the submerged electrical power generating structures shown in FIGS. 2, 4, 7, 26 and 29. Because the self-adjusting fin 43 does not rely on a low hitch point to rotate the entire unit to increase the hydrofoil's angle of attack, the anchor's hitch point 21 should be slightly below the submersible generating unit's center of frontal resistance (drag).

FIG. 12 is a drawing of the inside of the nacelles 17, 27, 51 and 52 in FIGS. 2, 4, 7, 9 and 26 that show the turbine 16 or 28 the low speed shaft 53, the gear box 54, the high speed shaft 55, an eddy current clutch or an electronically controlled break 56, a compact 4 or 6 pole generator 58. A sump pump 59 is located at the bottom of the watertight nacelle to remove any water.

Figure 13:
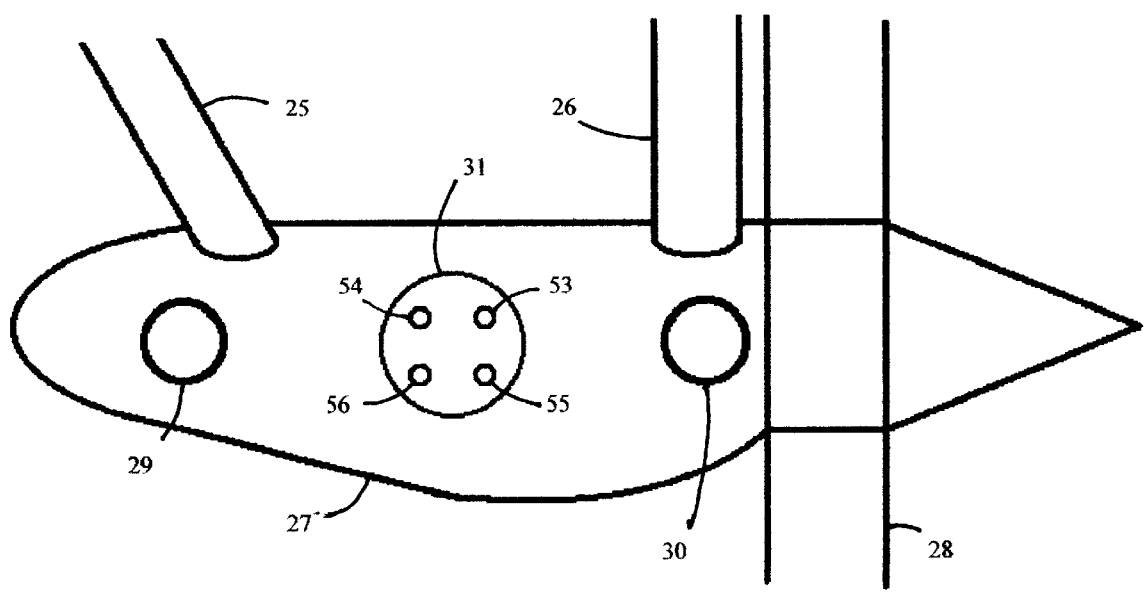
FIG. 13 is a cross section view of a nacelle with heat exchange in FIGS. 2, 4, 9 and 31.

Referring now to FIG. 13, which is a view of the right nacelle 27 of the inventions shown in FIGS. 2, 4 and 9. The connecting members 25 and 26 connect the nacelle to the buoyancy tank, and connecting member 29 and 30 connect said right nacelle to the left nacelle 17. The heat exchanger 31 extends between the nacelles and contains four tubes 53, 54, 55 and 56. Tubes 53 and 54 remove the heat from the coolant for the generator in the left nacelle 17 and tubes 55 and 56 are to remove the heat from the coolant for the generator in the right nacelle 27.

Figure 14:
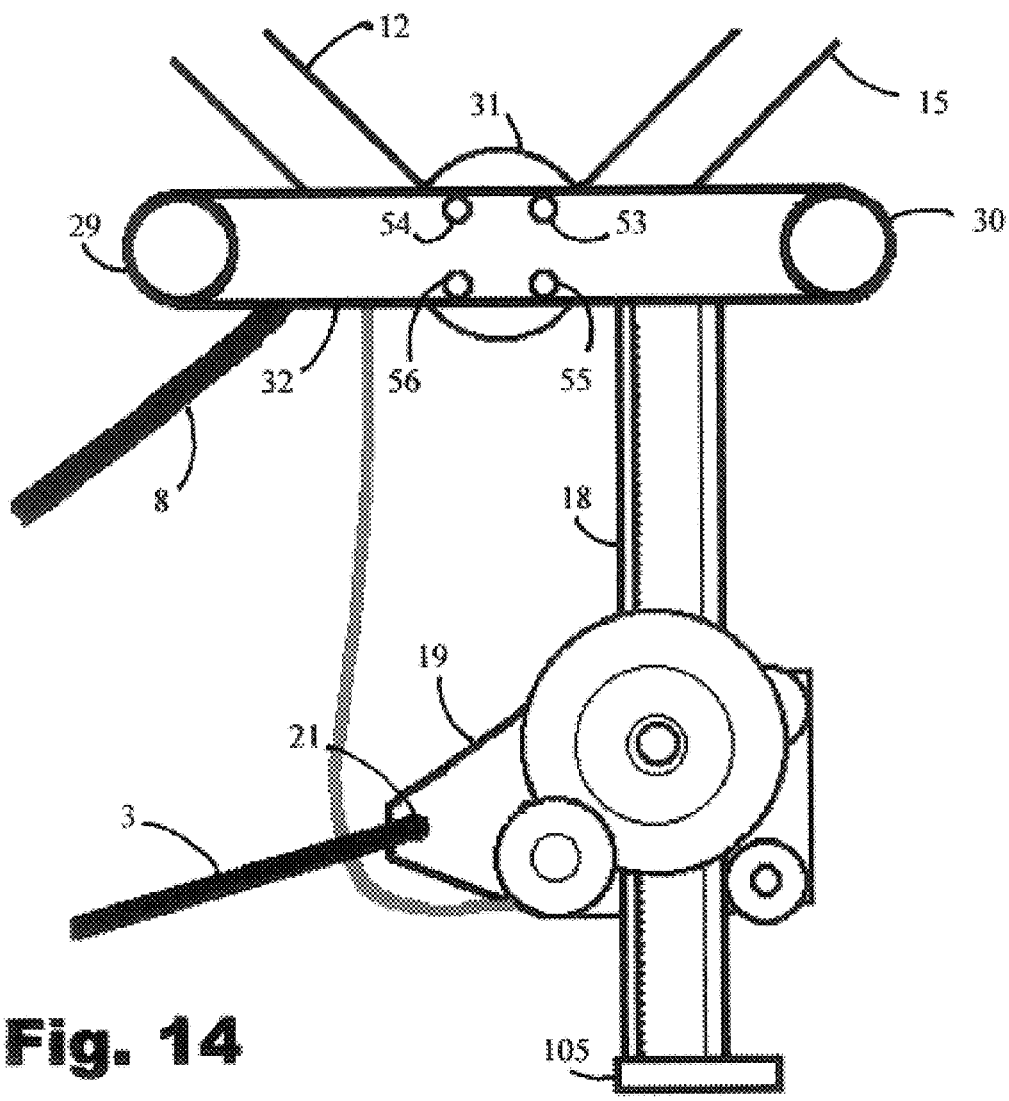
FIG. 14 is a cross section view of center structure in FIGS. 2, 4 and 9.

Referring now to FIG. 14, which is a view of the center support section of the inventions shown in FIGS. 2, 4, 9, 26 and 29. FIG. 14 shows the front diagonal connecting member 12 and the rear diagonal connecting member 15, the heat exchanger 31, the front crossing linking member 29, the rear cross linking member 30, the strong vertical bar 18 and the anchor line height adjusting device 19. Spanning between the linking members 29 and 30 is a wide center support section 32.

Figure 15:
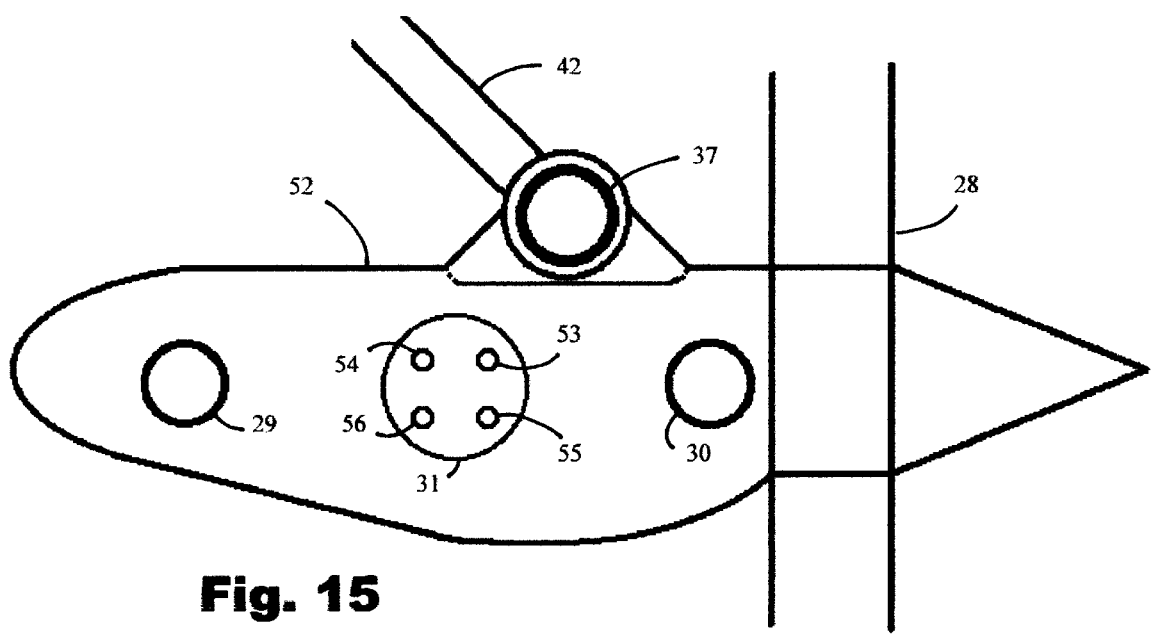
FIG. 15 is a cross section view of a nacelle in FIG. 7.

FIG. 15 is a view of the right nacelle of the third embodiment shown in FIG. 7. The components are identical with those of FIG. 13 except for the pivoting point 37 that is located over the submerged center of gravity of the pivoting portion.

FIG. 16 is a view of the center support section of the third embodiment shown in FIG. 7. FIG. 16 shows the members that connect the section to the buoyancy tank 12 and 15 the heat exchanger 31 with the four tubes for the coolant 53, 54, 55 and 56. The pivoting portion of the system can pivot only in one direction from the horizontal because of a stop 60. The pivoting point 37 allows the buoyancy tank 11 to rotate to a nose high attitude, increasing its hydrofoils' angle of attack while the pair of side-by-side counter rotating full-bladed water turbine rotors 16 and 28 remain vertical, but the stop prevents the top of said rotors from being canted backwards, which would cause a downward force.

Figure 17:
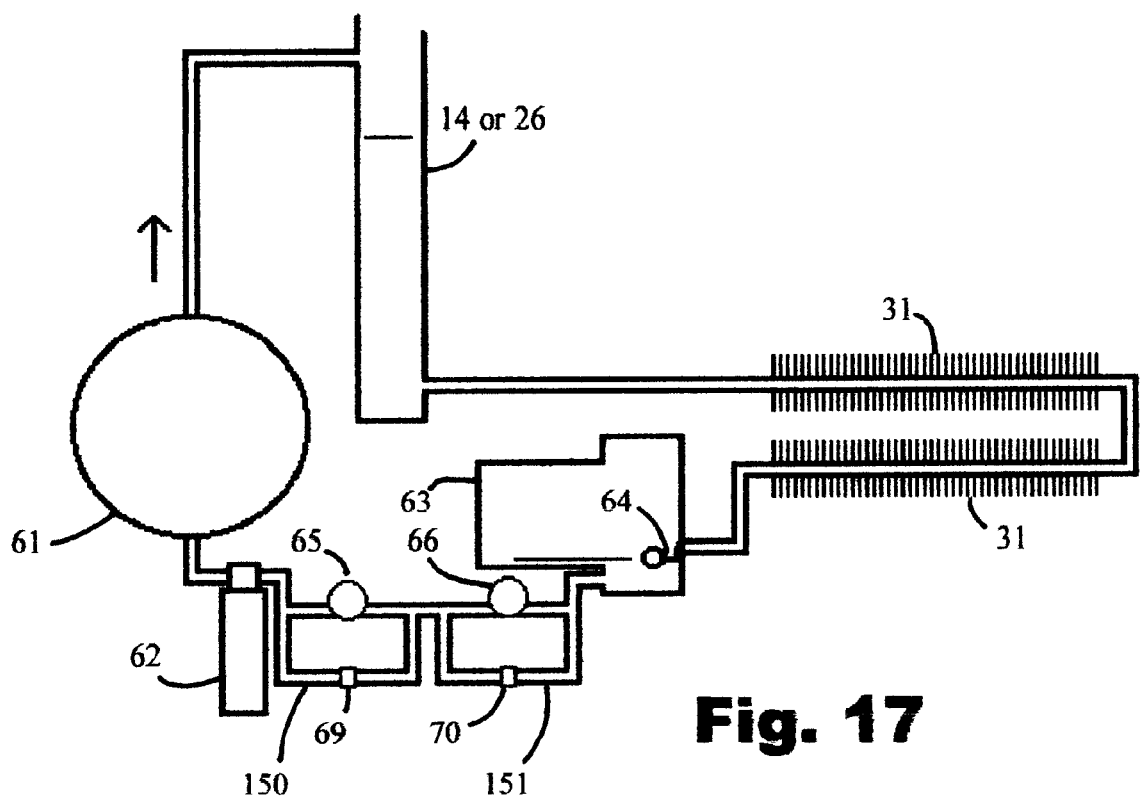
FIG. 17 is a schematic diagram of a liquid cooling system using the gearbox lubricating oil as coolant.

FIG. 17 is a schematic diagram of a cooling system that uses gearbox lubricating oil as a coolant. The hot oil being pumped from the generator 61 moves into a vertical connecting member 14 or 26 that also serves as a stand pipe. From said stand pipe the oil flows twice through the heat exchanger 31, across to the other nacelle and back. The head pressure exerted by the stand pipe 14 or 26 moves the oil into the gearbox 63, where the level is controlled by a float valve 64. The oil is constantly being pumped from said gearbox 63 by two pumps 65 and 66 that are in series to provide redundancy. Below said pumps 65 and 66 are lines 150 and 151 that will allow oil to by-pass a non-working pump. These lines are equipped with check valves 69 and 70 to prevent the oil from flowing in the wrong direction. The oil is then pumped under pressure through an oil filter 62 and back to the generator 61 to repeat the cycle.

Figure 18:
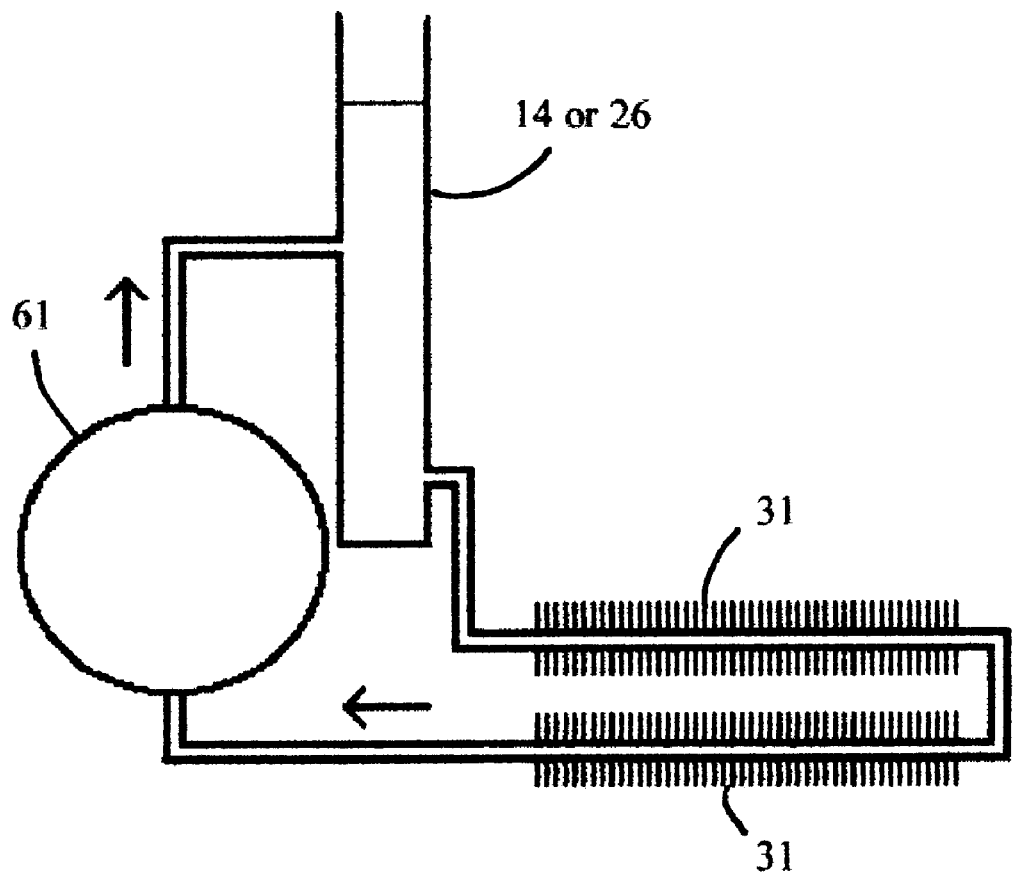
FIG. 18 is a schematic of a modification of the cooling system using convection to circulate coolant.

FIG. 18 is a schematic diagram of a modification of the system shown in FIG. 17 that uses a separate coolant that circulates without any moving parts because it uses convection. The coolant is heated by the generator 61. The heated coolant, being lighter, rises in the vertical and enters the storage reservoir that serves as a stand pipe in the connecting members 14 or 26. The coolant flows from the bottom of said stand pipe through the heat exchanger 31 twice, across to the other watertight nacelle and back. The cooled coolant then enters the generator 61 to repeat the cycle.

Figure 19:
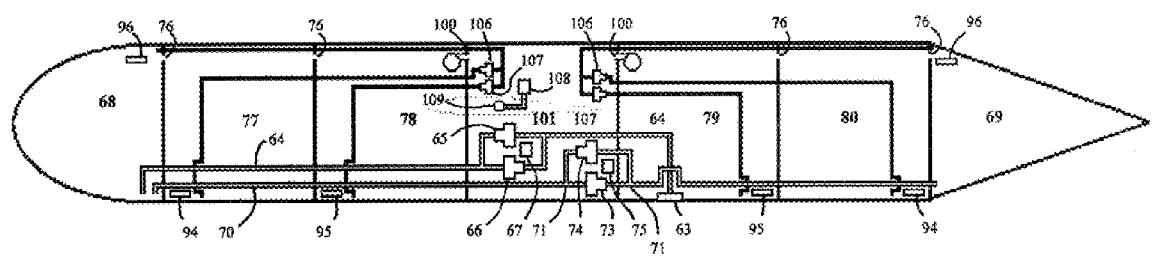
FIG. 19 is a schematic of modification that uses electrical system to automatically control depth and attitude.
Figure 31:
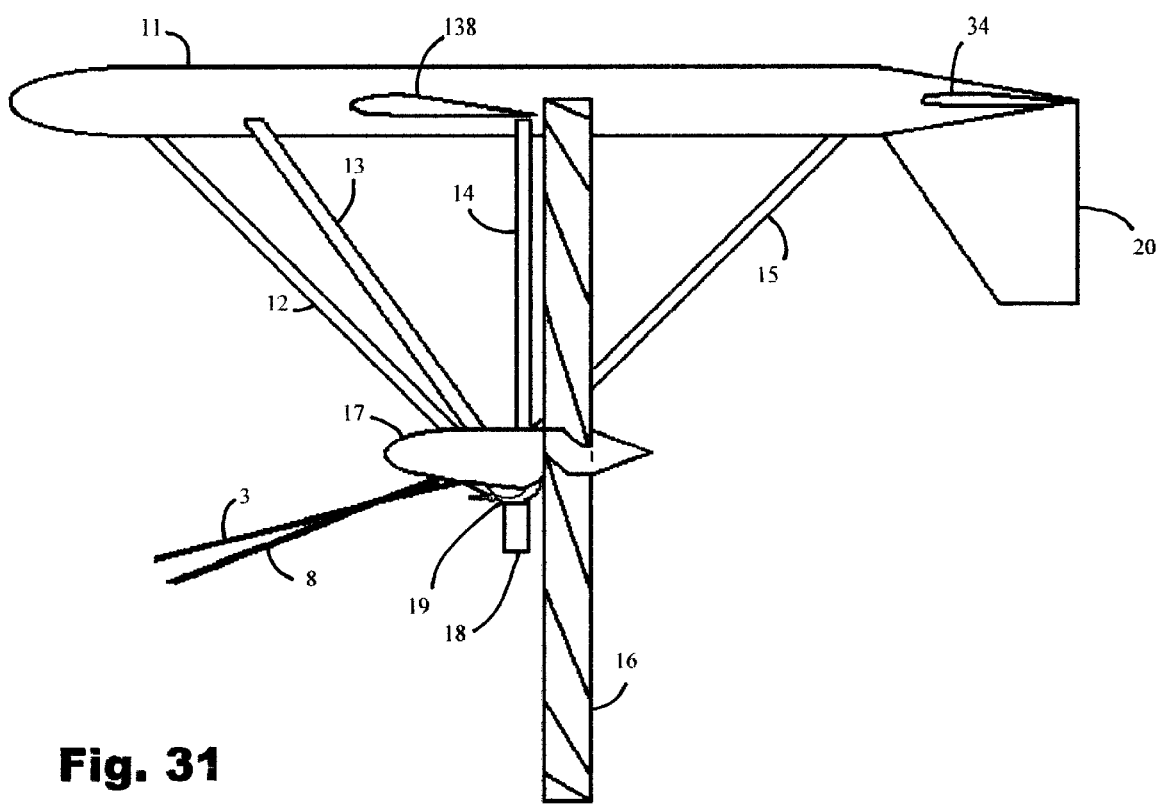
FIG. 31 is a side elevation of the modification of the submersible electrical power generating structure that uses the electric buoyancy and leveling system that is shown in FIG. 19.

FIG. 19 is a modification of those embodiments shown in FIG. 31 that utilizes an electrical system to control the depth and attitude of the submersible electrical power generating structure 11. This modification can be used if the current are directionally inconsistent and/or if the ocean bottom is not suitable for using a bottom weight 6. This modification uses both buoyancy and hydrofoils to keep the submersible electric power generating plant horizontal and within a desired depth range, with the depth limits set closer together for the hydrofoil control than for the buoyancy control. Because of its greater complexity, this system would be more vulnerable to mechanical troubles than the embodiments shown in FIGS. 2, 4, 7, 9, 26 and 29. The system in the FIG. 19 can be broken down into four separate elements. There is a buoyancy component, a leveling component, a water-return component and a hydrofoil control component.

The buoyancy component consists of a plankton filter 63, water lines 64 that go to pump 65 that is used to add water to the front compartment 68 and to a pump 66 that expels water from said front compartment. These pumps are controlled by a combination water pressure switch and rate of ascent and descent switch that is at 67, which will be shown in greater detail in FIG. 20. The leveling component has a water line 70 running from the back compartment 69 to the front compartment 68 that splits in the middle 71 and 72 to two pumps 73 and 74. Pump 73 pumps water from said back compartment to said front compartment, and pump 74 pumps the water from said front compartment to said back compartment. These pumps are controlled by a mercury switch 75. If the water entering either the front compartment 68 or the back compartment 69 exceed the capacity of those compartments, the excess water will pour through overflows 76 at the top of the bulkheads that separate compartments 68 from 77 and 77 from 78 in the front, as well as the compartments 69 from 80 and 80 from 79 in the rear. Because it is the two end compartments 68 and 69 that control buoyancy and keep the unit level, it is necessary to return the ballast water to those end compartments whenever they have empty space to receive that water. The system that accomplishes this is controlled by float switches 94 and 95 at the bottom of compartments 77, 78, 79 and 80 and at the float switches 96 at the top of compartments 68 and 69. The details of this ballast water return system is described in FIG. 22. At the top of the center compartment are water blocking valves 100 that will allow air to pass from compartments 78 and 79 into the center compartment 100 that contains the equipment, but not water.

Figure 20:
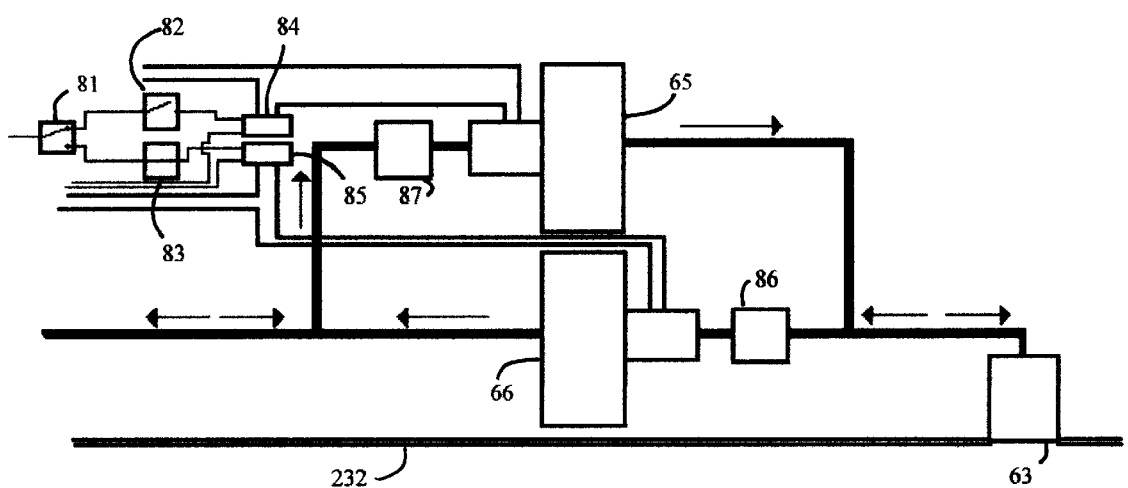
FIG. 20 is a schematic showing wiring for the buoyancy control portion of the system shown in FIG. 19.

FIG. 20 is a schematic diagram of the plumbing and wiring for the buoyancy control system. The wiring that follows is contained in the pressure control 67 shown in FIG. 19. A pressure control switch 81 activates if the water pressure at the depth is outside of pre-set limits. A rate of ascent switch 82 and a rate of descent switch 83 are wired in series with said pressure switch but parallel to each other. The rate of ascent and descent switches are each wired to separate solenoids 84 and 85 that control separate pumps that add or expel ballast water from the front compartment 68. If the pressure switch indicates that the depth is outside the preset limits, the proper pump will turn on to either add or subtract water from the front compartment and that pump will continue to run until either the rate of change becomes satisfactory or the proper depth has been reached. The FIG. 20 schematic shows that the pressure switch 81 indicates that a depth correction is needed, but the rate of ascent switch 82 is open, indicating that the unit is moving higher at a satisfactory rate. A plankton filter 63 is at the intake of the buoyancy system to filter out microscopic plankton that might infest the system with zebra mussels or barnacles, etc. Although check valves are included in the system, they may not be required. The thinnest lines in the diagram represent low-voltage control wiring; the next thinnest lines are the wiring that runs the pumps, and the heavy lines show the water pipes with the flow direction indicated by the nearby arrows. The double line at the bottom 232 is the bottom of the buoyancy tank.

Figure 21:
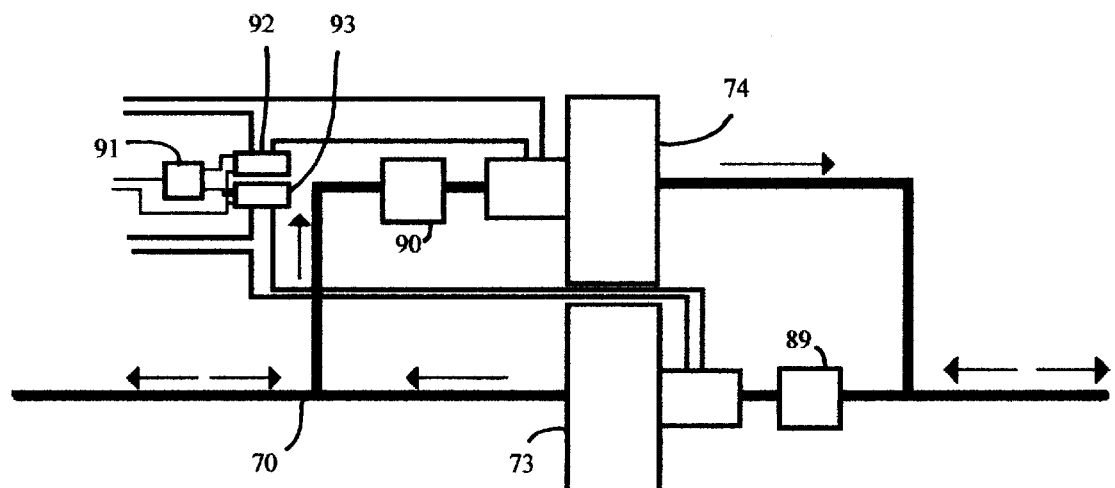
FIG. 21 is a schematic showing wiring for the leveling control system shown in FIG. 19.

FIG. 21 is a schematic diagram of the plumbing and wiring for the leveling system which is designed to maintain any level or nose-high attitude desired. A mercury switch 91 indicates whether the attitude of the device is outside the preset limits. If the attitude is outside those limits, the switch activates the solenoids 92 or 93 to turn on either pumps 73 or 74 to move water from the back compartment 69 to the front compartment 68, or from said front compartment to said back compartment. Check valves are located at 89 and 90.

Figure 22:
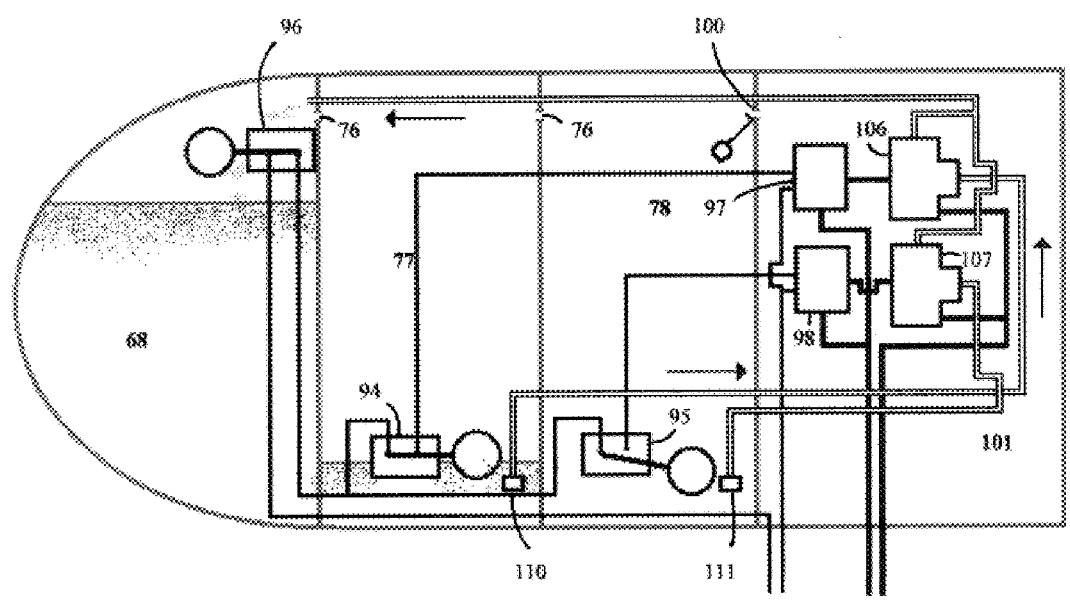
FIG. 22 is a schematic showing wiring for ballast water transfer system shown in FIG. 19.

FIG. 22 is the schematic diagram of the system for returning ballast water from compartments 77 and 78 to the front compartment 68. A schematic diagram for the back half of this system for compartments 69, 80 and 79 would be a mirror image of this diagram except that the shape of the rear compartment 69 is different than that of the front compartment 68. Float switches 94 and 95, located at the bottom of compartments 77 and 78, complete their circuits when the floats are raised by water in their respective compartments. At the top of the front compartment 68 is another float switch 96 that will complete the circuit when it is in the down position. Float switch 96 in the front compartment 68 is wired in series with the float switches 94 and 95 which are wired in parallel with each other. Float switches 94 and 95 are connected to their respective solenoids 97 and 98 that operate separate pumps 106 and 107 to pull water from their respective compartments 77 and 78 to return it to the front compartment 68. In FIG. 19 the floats for the rear compartments 79, 80 and 69 are numbered in reverse order to match the corresponding float switches in the forward compartments. FIG. 22 shows that there is water in compartment 77 that is being transferred to the front compartment 68, This is because the float 94 in compartment 77 is in the up position and float switch 96 in that front compartment is in the down position, indicating there is space in that compartment to receive the water. Check valves 110 and 111 are located at the bottom of the pipes at the bottom of their respective compartment 77 and 78. The thin black lines represent the low-voltage control circuit, the thicker black lines represent the higher voltage circuit for operating the pumps, and the double lines represent the water pipes. Where the current is relatively steady, it should be sufficient to have the water return system remove water from only compartment 77 and have compartment 78 dry, having the overflow 76 between compartments 77 and 78 replaced with a water-blocking valve of the type shown at 100.

Figure 23:
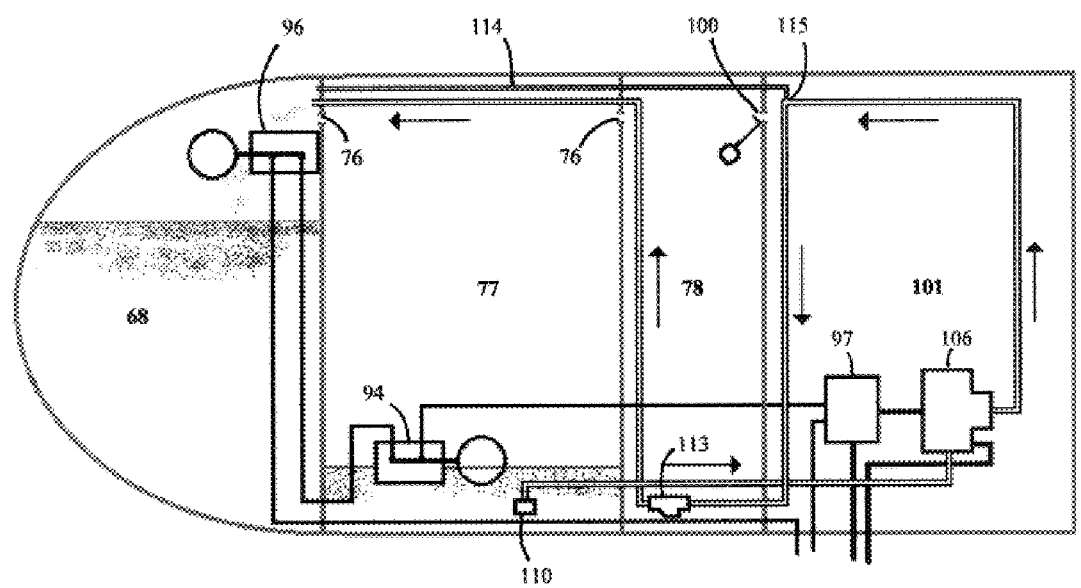
FIG. 23 is a schematic of modification of the wiring system shown in FIG. 22.

FIG. 23 is a schematic of a modification of the system shown in FIG. 22. Instead of having an electrical system to transfer water that might get into compartment 78 to the front compartment 68, this modification uses a Venturi device 113. When float 96 in the front compartment 68 is in the down position and float 94 in compartment 77 is in the up position, pump 106 will run to transfer water from compartment 77 to compartment 68. As pump 106 is transferring this water to the front compartment 68, the water is forced through a Venturi device 113 on the bottom of compartment 78 that sucks out any water that might be in compartment 78 and returns that water to compartment 68. Because the water could siphon back through the pipe system from compartment 77 to compartment 78 when the pump 106 is not running, a means for allowing air into the line at 115 through tube 114 is provided to prevent the siphoning.

Figure 24:
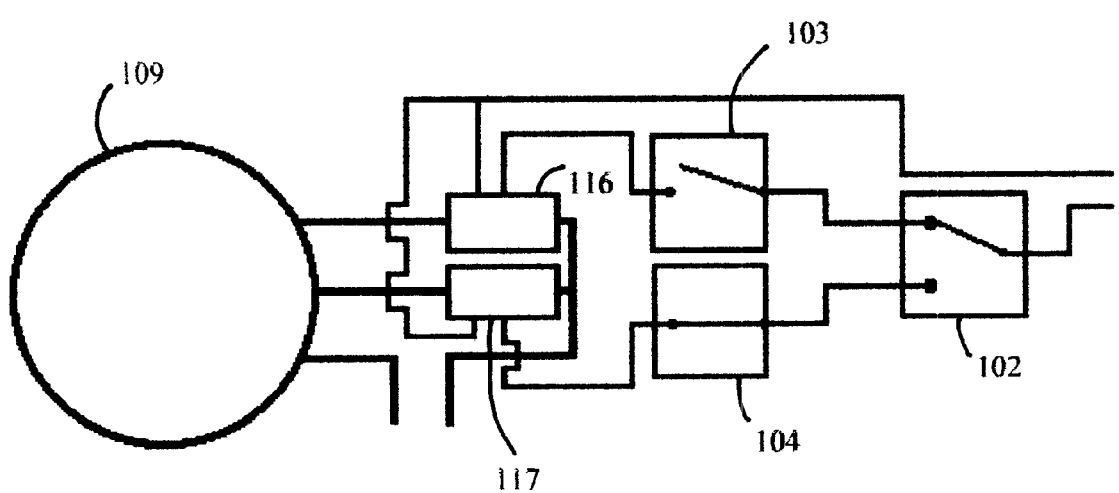
FIG. 24 is a schematic for wiring for FIG. 19 to control movable hydrofoil.

FIG. 24 is a schematic diagram for the hydrofoil control system 108 and 109 in FIG. 19. A pressure control switch 102 is set to activate if the water pressure gets above or below preset limits. If the switch is activated by the depth being outside those limits, the electrical connection is closed between that switch and either the rate of ascent switch 103 or the rate of descent switch 104. These switches then activate their respective solenoids 116 and 117 to turn the reversible electric motor 109 in FIG. 19. If there is not a sufficient rate of change in the proper direction, the circuit would remain closed and the hydrofoil would continue rotating until the rate of depth change becomes sufficient, the hydrofoil has turned to its maximum angle, or until the submersible generating device enters the desired depth range. This same wiring diagram can be used for other purposes as well, such as operating an automatic control to raise or lower the anchor line adjusting device 19 on those submersible units utilizing the low hitch point and fixed hydrofoils that are shown in FIGS. 2, 4, 7, 26 and 29—especially during the testing period when the proper height of the attachment point 21 is being determined.

Figure 25:
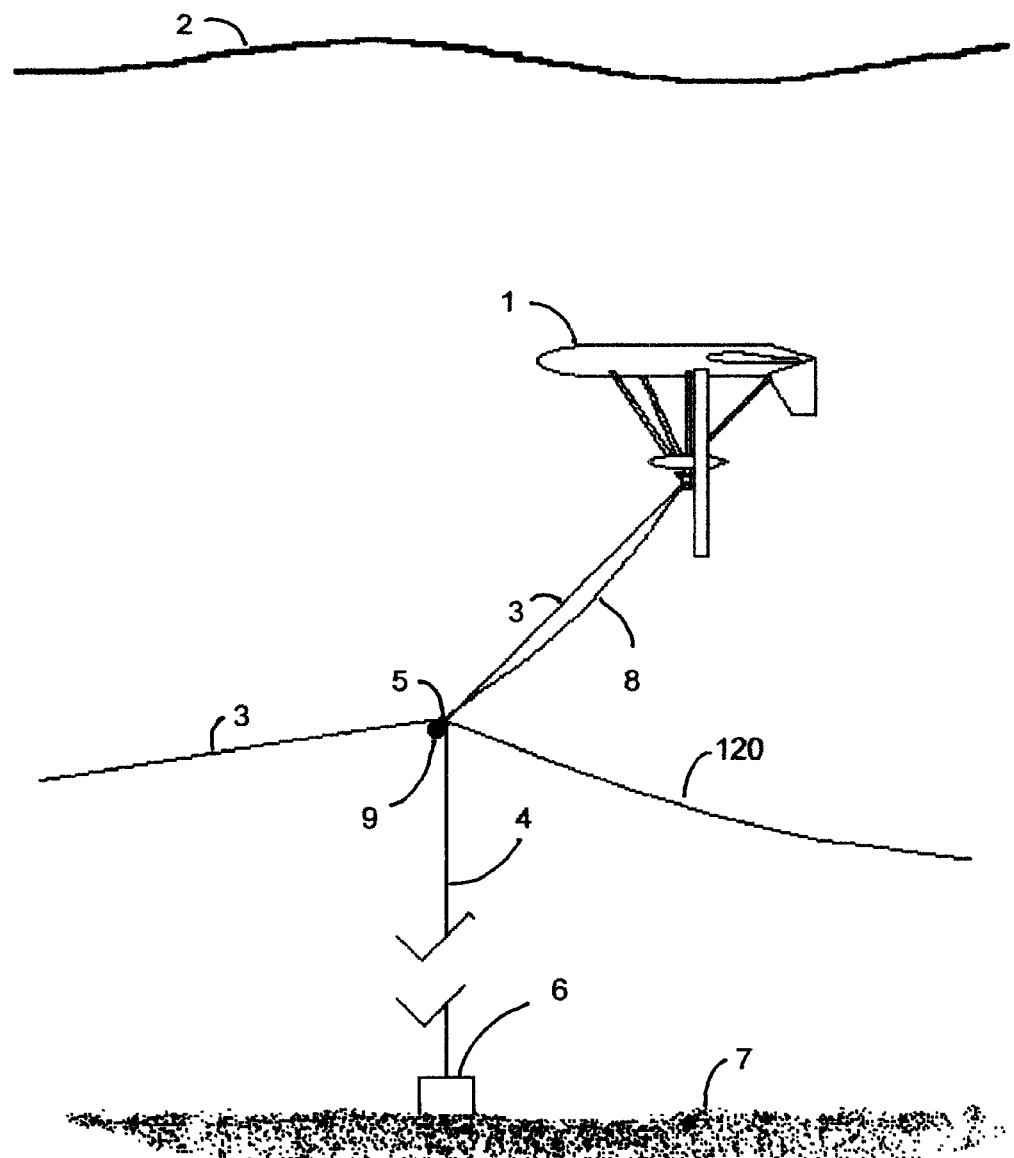
FIG. 25 is a side view of the submersible electrical power generating plant at a location where the currents reverse.

FIG. 25 is the side view of the submersible electric generating plant generating power at a location where the currents reverse. When in reversing currents, each submersible electrical power generating structure 1 requires two anchors set at 180 degrees from each other. The two anchor lines 3, 120 are joined below the submersible electrical power generating structure 1 so that only one of the anchor lines attaches to the adjustable attachment device 19. The collection cable 9, that links the submersible electrical power generating structures, transverses either anchor line 3 or 120. During times when there is no water moving, there would be no drag and therefore no downward vector force to prevent the submersible generating power plant from rising to the surface 2. For this reason, a bottom weight 6 should be attached to the anchor line at 5. If, for some reason, the said bottom weight 6 is not a good option, the modification of the invention shown in FIG. 19 should be used.

Figure 26:
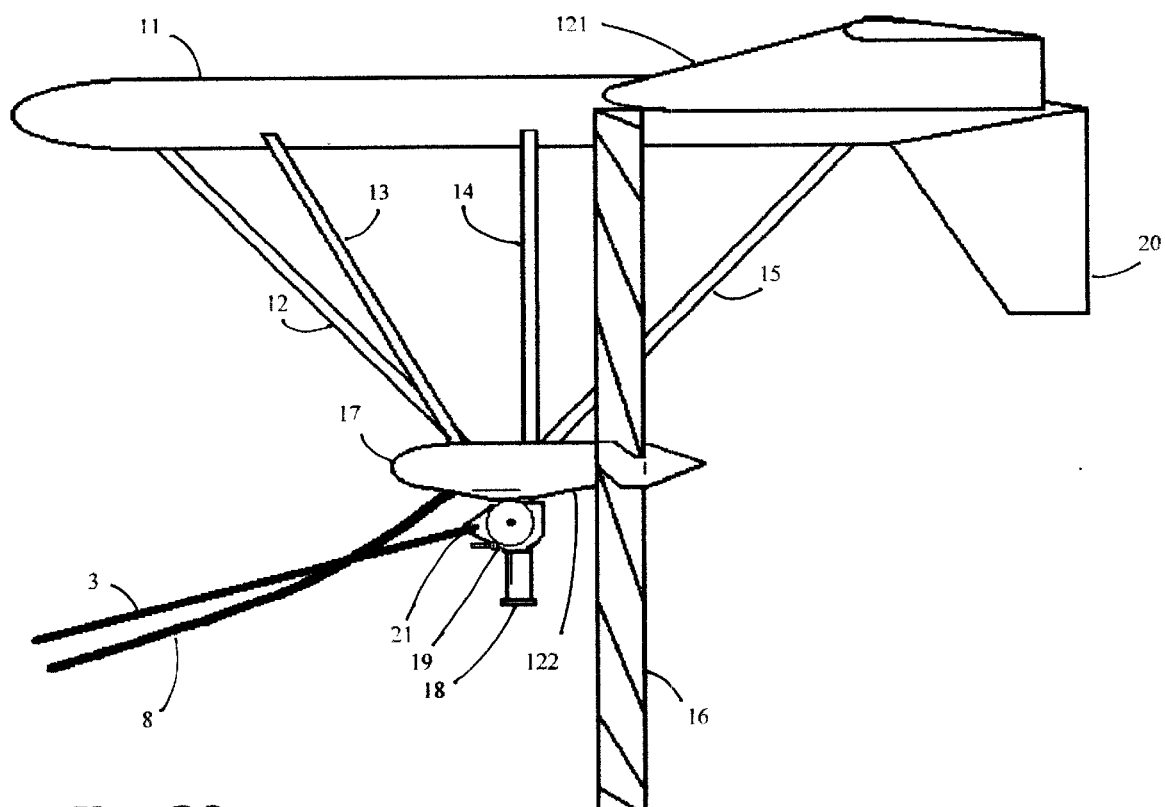
FIG. 26 is a side view of a modification of the submersible electrical power generating plant shown in FIG. 2 having longer nacelles to increase clearances to improve diver safety. This modification also features dihedral airfoil-shaped hydrofoils to increase stability.

FIG. 26 is a modification of the invention shown in FIG. 2 that provides greater safety for divers. All parts in FIG. 26 have the same numbers is shown in FIG. 2, with two exceptions. To reduce the possibilities of a diver getting caught and killed by the turning rotors, the nacelles 17 and 27 have been lengthened at 122 to increase the distance between the turbine 16 and the connecting members 14, 26 and 30 shown in FIGS. 26 and 3. This additional space will allow for a diver who gets swept into the front of the turbine 16 or 28 to be carried past said members 14, 26 and 30 without injury. The second difference between FIGS. 26 and 2 is that, instead of having a flat hydrofoil 10 as shown in FIG. 2, the hydrofoil 121 in FIG. 26 has some dihedral to further increase stability.

Figure 27:
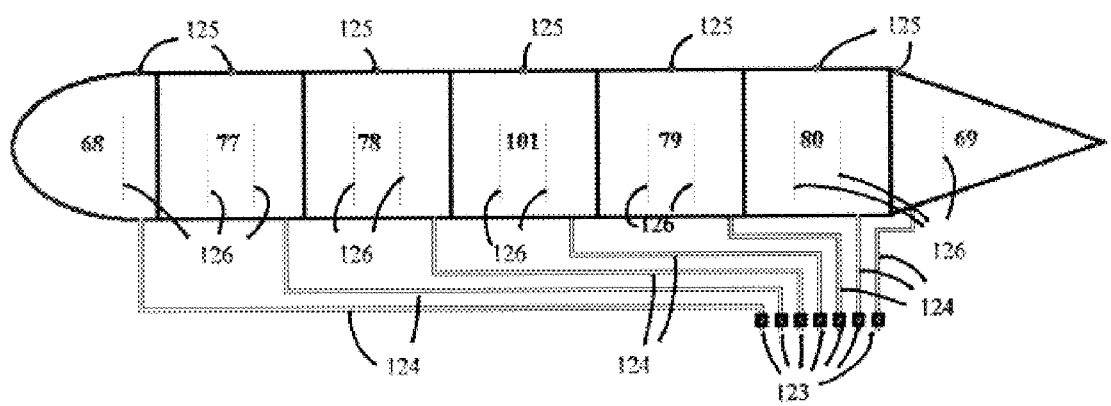
FIG. 27 is a schematic showing piping diagram for the submersible electrical power generating plants shown in FIGS. 2, 4, 7, 26, 29 and optional for FIG. 9.

FIG. 27 shows the piping system used to adjust the ballast in those buoyancy tanks 11 for those modification shown in FIGS. 2, 4, 7, 26, 29 and is optional for the modification shown in FIG. 9. Each of the six separate compartments 68, 77, 78, 101, 79, 80 and 69 have water lines feeding into them from valves 123 that are located on the side of the buoyancy tank 11, behind the turbine rotors 16 or 28. Air valves 125 are located in the tops of each of the said compartments that can be used for adding or removing air. The amount of water that is placed in each of the compartments should be metered so that the proper amounts can be quickly added to those submersible generating plants that will follow. Once the buoyancy requirements have been established and the proper amount of water added to each compartment, the valves 123 and 125 can be closed, locked and forgotten.

Figure 28:
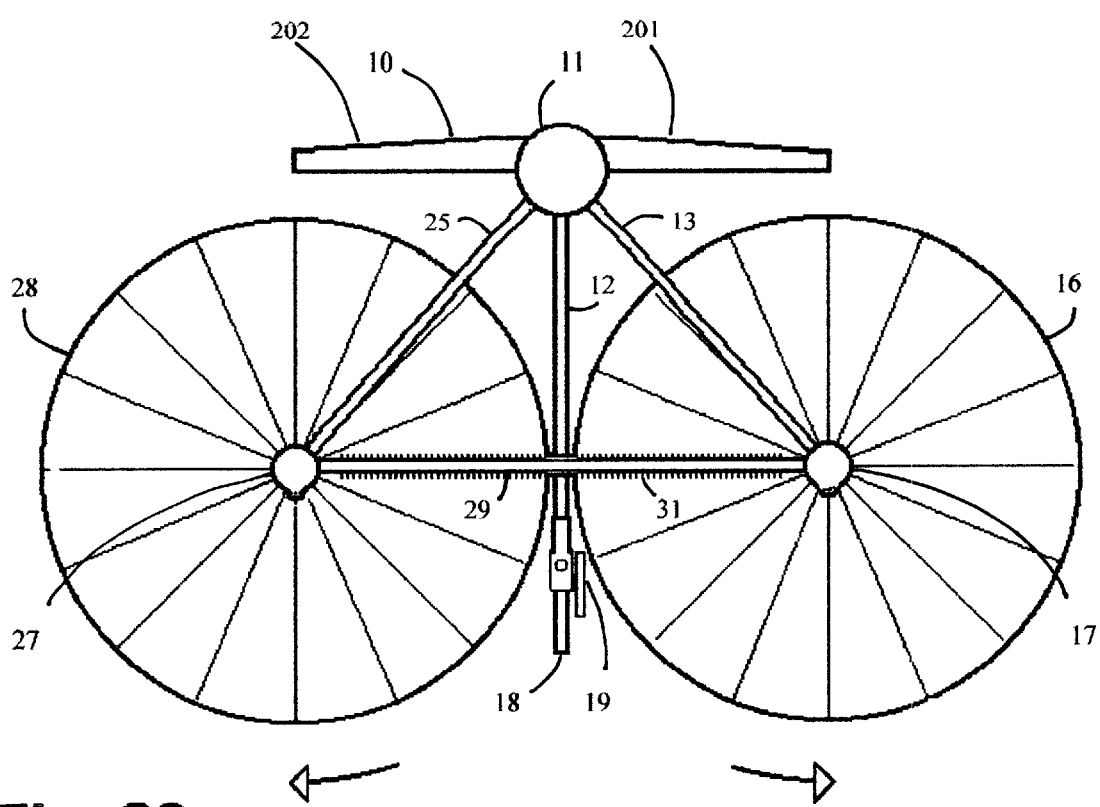
FIG. 28 is a front elevation view of the submersible electrical power generating structure in FIG. 2.

FIG. 28 shows the front elevation of the submersible generating device that is shown in FIG. 2. It is similar to front elevations of FIG. 6 except that FIG. 6 has two pair of hydrofoils 33, 35 and 34, 36 and FIG. 28 has the one pair 10, consisting of the left hydrofoil 201 and the left hydrofoil 202.

Figure 29:
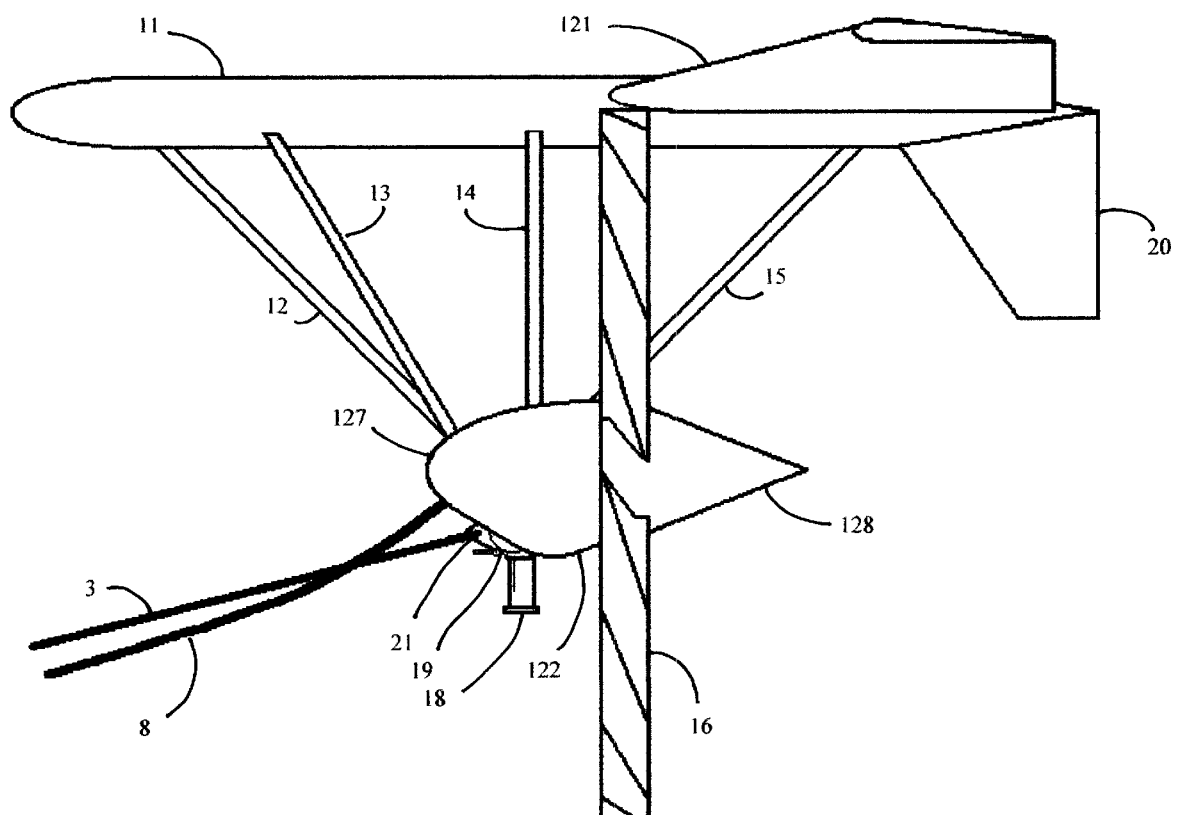
FIG. 29 is a side view of a modification of the submersible electrical power generating structure shown in FIG. 26 equipped with a many-poled, low RPM generator.
Figure 30:
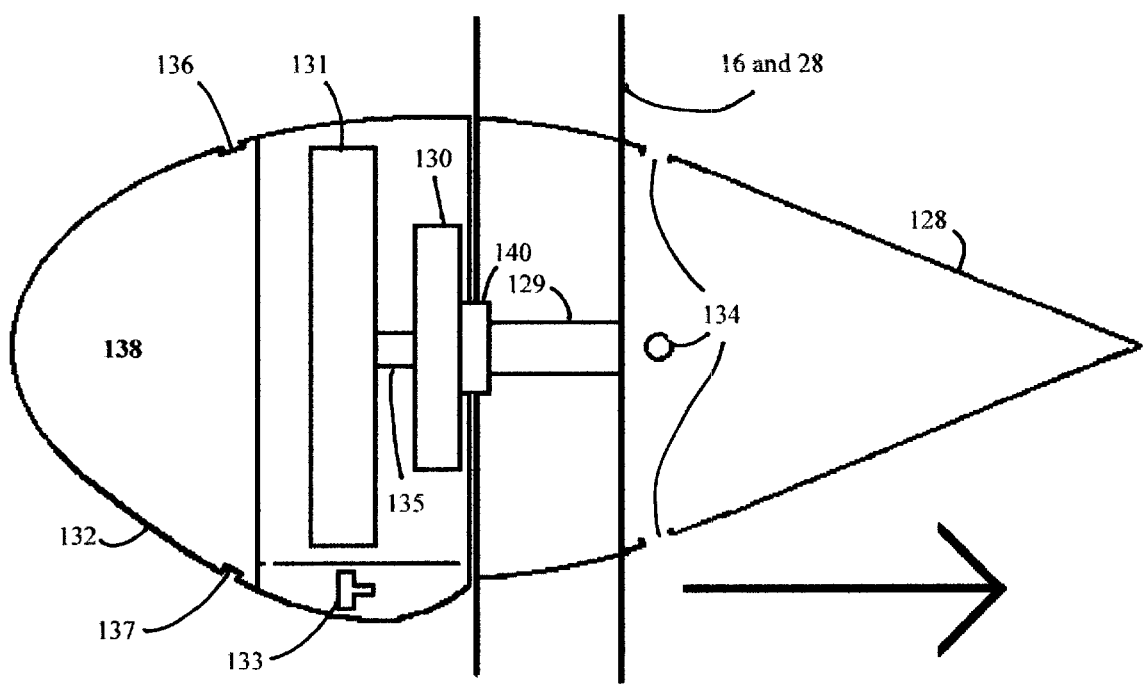
FIG. 30 is a cross section view of a nacelle using the many-poled, low RPM generator used in FIG. 29.

FIG. 29 shows a modification of the invention shown in FIG. 26 that is equipped with a many-poled, low RPM generator that have large diameter armatures with normally more than 80 poles in a large ring configuration that can generate sixty-cycle electric current from low shaft speeds. The low RPM ring generator 131 is shown in FIG. 30. All the numbers are the same as those shown in FIG. 26, except for the large nacelle 127 that replaces the smaller nacelle 17 and the floodable hub 128. A more detailed drawing of the nacelle is shown in FIG. 30.

FIG. 30 is a diagram of the inside of a nacelle for the low RPM generator shown in FIG. 29. The low-speed shaft 129 passes through a waterproof bearing 140 to the planetary gearbox 130. The faster turning shaft 135 from the gearbox drives the generator 131. To remove water that may seep in, a sump pump 133 is located below said low RPM generator 131. Because the many-poled, low RPM generators have large diameters that require a fat nacelle 132, much of the nacelle's volume is flooded to keep the submersible generating power plant's center of gravity low to maintain stability. The turbine's cone-shaped hub 128 contains holes 134 to allow it to be flooded. The compartment 138 at the front of the nacelle 132 has plugs 136 and 137 that can be removed for adding ballast water.

FIG. 31 is a side elevation of the modification of the submersible generating unit that uses the electric buoyancy and leveling system that is shown in FIG. 19. It is almost identical in outward appearance to the modification that is shown in FIG. 9, except that the movable hydrofoil 138 is powered electrically through the use of pressure sensing devices, instead of being the self-adjusting hydrofoil 43 that is powered by the kinetic energy of the water itself.

Figure 32:
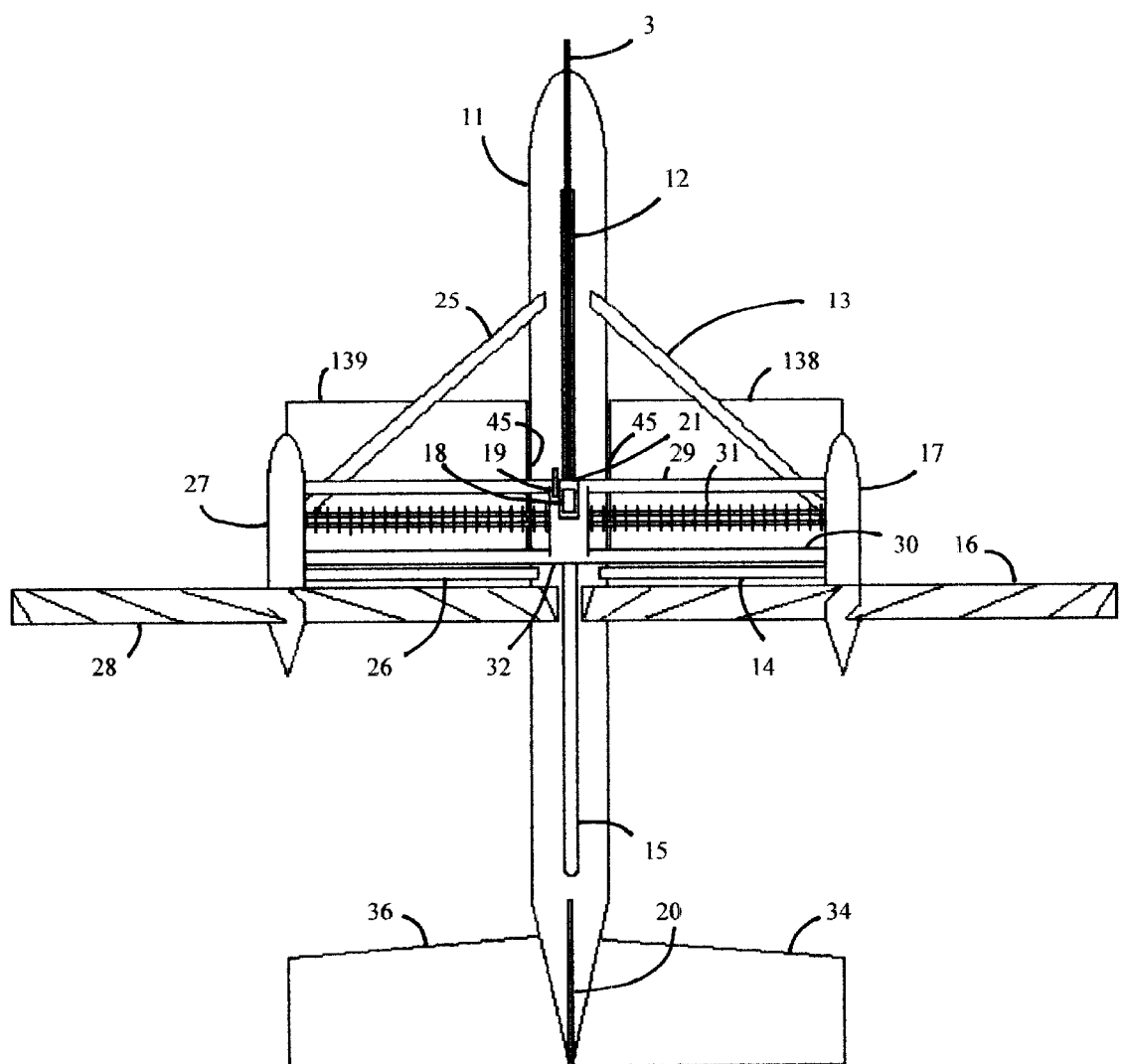
FIG. 32 is a bottom view of FIG. 31.

FIG. 32 is the bottom view of the modification that is shown in FIG. 31. All the numbers are the same as those in FIG. 9, except that the power-driven hydrofoils 138, 139 have replaced the self-adjusting hydrofoils 43, 44 and their related components.

According to important features of my invention my electric power generating plant has been carefully configured to utilize the kinetic energy of the current to adjust hydrofoil's lifting force to balance the downward vector force caused by the kinetic energy of the current acting on the downward anchor line.

As various possible embodiments may be made in the above invention for use for different purposes and as various changes might be made in the embodiments and methods above set forth, it is understood that all of the above matters here set forth or shown in the accompanying drawings are to be interpreted as illustrative and not in a limiting sense.

I claim:

1. A submersible electrical power generating plant for generating electrical power no fuel cost from the flow of ocean current, said submersible electrical power generating plant comprising:

a submersible electrical power generating structure having a superior located center of buoyancy, an inferior located center of gravity and a center of drag, said submersible electrical power generating structure further comprising a streamlined torpedo-shaped buoyancy tank with a nose end, a rear end, a top side, a bottom side, a left side, a right side, a plurality of valves and a plurality of compartments, said streamlined torpedo-shaped buoyancy tank having a vertical tail fin capable of improving directional stability of said submersible electrical power generating structure, a pair of airfoil-shaped hydrofoils, said pair of airfoil-shaped hydrofoils having a first airfoil-shaped hydrofoil and a second airfoil-shaped hydrofoil, said first airfoil-shaped hydrofoil being a mirror image of said second airfoil-shaped hydrofoil, said first airfoil-shaped hydrofoil fixed on said left side of said streamlined torpedo-shaped buoyancy tank projecting horizontally leftward and said second airfoil-shaped hydrofoil fixed on said right side of said streamlined torpedo-shaped buoyancy tank projecting horizontally rightward, said pair of airfoil-shaped hydrofoils located at said rear end of said streamlined torpedo-shaped buoyancy tank, said pair of airfoil-shaped hydrofoils capable of providing said submersible electrical power generating structure with more lift and less drag at high angle of attack when the leading edges of the hydrofoils are higher than the trailing edges in relation to the flow of water, the water level in each of said plurality of compartments being adjustable by piping the water in and out through said plurality of valves;

a pair of side-by-side counter-rotating full-bladed water turbine rotors, said pair of side-by-side counter-rotating full-bladed water turbine rotors having a first water turbine rotor and a second water turbine rotor, said first water turbine rotor being a mirror image of said second water turbine rotor, said first water turbine rotor having a first horizontal water turbine axis parallel to said streamlined torpedo-shaped buoyancy tank and a plurality of first rotor blades, said plurality of first rotor blades extending radially outward from said first horizontal water turbine axis, said second water turbine rotor having a second horizontal water turbine axis parallel to said first horizontal water turbine axis and a plurality of second rotor blades, said plurality of second rotor blades extending radially outward from said second horizontal water turbine axis, said pair of counter-rotating full-bladed water turbine rotors being located beneath said streamlined torpedo-shaped buoyancy tank and facing rear end of said streamlined torpedo-shaped buoyancy tank;

a pair of watertight nacelles, said pair of watertight nacelles having a first watertight nacelle and a second watertight nacelle, said first watertight nacelle connecting to said first horizontal water turbine axis, said second watertight nacelle connecting to said second horizontal water turbine axis, both said first watertight nacelle and said second watertight nacelle being firmly connected to each other through a center connecting means, said center connecting means having an upside, a down side and a center point, said center point being located below and slightly forward of said center of drag of said submersible electrical power generating structure, said center connecting means being securely mounted to said bottom side of said streamlined torpedo-shaped buoyancy tank through a third connecting means, said third connecting means being long enough to ensure said submersible electrical power generating structure having said center of buoyancy located above said center of gravity, said first nacelle being securely mounted to said bottom side of said streamlined torpedo-shaped buoyancy tank through a first connecting means, said second nacelle being securely mounted to said bottom side of said streamlined torpedo-shaped buoyancy tank through a second connecting means, said first nacelle having a first low-speed shaft connecting to said first horizontal water turbine axis, a first gear box connecting to said first low-speed shaft capable of converting low speed to high speed, a first high-speed shaft connecting to said first gear box, and a first electrical power generator driven by said high speed shaft capable of generating electrical power, said second watertight nacelle having a second low-speed shaft connecting to said second horizontal water turbine axis, a second gear box connecting to said second low speeding shaft capable of converting low speed to high speed, a second high-speed shaft connecting to said second gear box, and a second electrical power generator driven by said second high-speed shaft capable of generating electrical power, said pair of watertight nacelles being located sufficiently far apart to provide clearance for said pair of side-by-side counter-rotating full-bladed water turbine rotors, said center connecting means having a cooling system capable of effectively and efficiently distributing heat generated by said first gear box, said first electrical power generator, said second gear box and said second electrical power generator to outside water;

an attaching device located at said center point of said center connecting means, said attaching device being adjustable up and down vertically by a device that may be powered by electricity or compressed air to adjust the drag forces required to change the angle of attack of said pair of airfoil-shaped hydrofoils to balance changes in the downward vector force resulting form changes in the drag acting through a downward angled anchor line;

a weight member on ocean floor connecting to said submersible electrical power generating structure through a connecting means at said attaching device, said weight member on ocean floor limiting the height of said submersible electrical power generating structure floating above the ocean floor; and an electrical power collection and transmission structure connecting to said submersible electrical power generating structure for collecting and transmitting electrical current.

2. The submersible electrical power generating plant in claim 1 is capable of being free of service or replacement for a period of time ranging from about eight to twenty years.

3. The submersible electrical power generating plant in claim 1, wherein said center of gravity of said submersible electrical power generating structure can be changed vertically and longitudinally by adding water into or subtracting water from said streamlined torpedo-shaped buoyancy tank.

4. The submersible electrical power generating plant in claim 1 is neither mounted on underwater structures nor suspended from any structure at water surface.

5. The submersible electrical power generating plant in claim 1 is capable of generating electrical power from low speed current flow when equipped with larger turbines and/or smaller generators and more gearing.

6. The submersible electrical power generating plant in claim 1, wherein said vertical tail fin can be on either said top side of said submersible electrical power generating structure extending upward or said bottom side of said submersible electrical power generating structure extending downward.

7. The submersible electrical power generating plant in claim 1 is capable of conveying kinetic energy by said pair of side-by-side counter-rotating full-bladed water turbine rotors through either said first electrical power generator or said second electrical power generator.

8. The submersible electrical power generating plant in claim 1, wherein said submersible electrical power generating structure is made of carbon fiber composites.

9. The submersible electrical power generating plant in claim 1, wherein said pair of side-by-side counter-rotating full-bladed water turbine rotors are sufficiently hollow so that their density is near that of the water displaced by said pair of side-by-side counter-rotating full-bladed water turbine rotors.

10. The submersible electrical power generating plant in claim 1, wherein said pair of side-by-side counter-rotating full-bladed water turbine rotors turn so that both said plurality of first blades and said plurality of second blades are moving downward at the center of the submersible electrical power generating plant and upward on the outside of the submersible electrical power generating plant.

11. The submersible electrical power generating plant in claim 1, wherein said first gear box, said second gear box, said first low-speed shaft, said second low-speed shaft, said first high-speed shaft, said second high-speed shaft, said first electrical power generator and said second electrical power generator are lubricated and cooled by oil.

12. The submersible electrical power generating plant in claim 1, wherein both said first electrical power generator and said second electrical power have many poles to permit both said first electrical power generator and said second electrical power to produce sixty-cycle electric current from low shaft speeds.

13. A submersible electrical power generating plant for generating electrical power with no fuel costs from the flow of ocean current, said submersible electrical power generating plant comprising:

a submersible electrical power generating structure having a superior located center of buoyancy, an inferior located center of gravity and a center of drag, said submersible electrical power generating structure further comprising a streamlined torpedo-shaped buoyancy tank with a nose end, a rear end, a top side, a bottom side, a left side, a right side, a plurality of valves, and a plurality of compartments, said streamlined torpedo-shaped buoyancy tank having a vertical tail fin capable of improving directional stability of said submersible electrical power generating structure, a first pair of airfoil-shaped hydrofoils having a first airfoil-shaped hydrofoil and a second airfoil-shaped hydrofoil, said first airfoil-shaped hydrofoil being a mirror image of said second airfoil-shaped hydrofoil, said first airfoil-shaped hydrofoil fixed on said left side of said streamlined torpedo-shaped buoyancy tank projecting horizontally leftward and said second airfoil-shaped hydrofoil fixed on said right side of said streamlined torpedo-shaped buoyancy tank projecting horizontally rightward, said first pair of airfoil-shaped hydrofoils located above said center of gravity of said submersible electrical power generating structure, a second pair of airfoil-shaped hydrofoils, said second pair of airfoil-shaped hydrofoils having a third airfoil-shaped hydrofoil and a fourth airfoil-shaped hydrofoil, said third airfoil-shaped hydrofoil being a mirror image of said fourth airfoil-shaped hydrofoil, said third airfoil-shaped hydrofoil fixed on said left side of said streamlined torpedo-shaped buoyancy tank projecting horizontally leftward and said fourth airfoil-shaped hydrofoil fixed on said right side of said streamlined torpedo-shaped buoyancy tank projecting horizontally rightward, said second pair of airfoil-shaped hydrofoils located at said rear end of said streamlined torpedo-shaped buoyancy tank, both said first pair of airfoil-shaped hydrofoils and said second pair of airfoil-shaped hydrofoils capable of providing said submersible electrical power generating structure with more lift and less drag at high angle of attack when the leading edges of the hydrofoils are higher than the trailing edges in relation to the flow of water, the water level in each of said plurality of compartments being adjustable by piping the water in and out through said plurality of valves;

a pair of side-by-side counter-rotating full-bladed water turbine rotors, said pair of side-by-side counter-rotating full-bladed water turbine rotors having a first water turbine rotor and a second water turbine rotor, said first water turbine rotor being a mirror image of said second water turbine rotor, said first water turbine rotor having a first horizontal water turbine axis parallel to said streamlined torpedo-shaped buoyancy tank and a plurality of first rotor blades, said plurality of first rotor blades extending radially outward from said first horizontal water turbine axis, said second water turbine rotor having a second horizontal water turbine axis parallel to said first horizontal water turbine axis and a plurality of second rotor blades, said plurality of second rotor blades extending radially outward from said second horizontal water turbine axis, said pair of counter-rotating full-bladed water turbine rotors being located beneath said streamlined torpedo-shaped buoyancy tank and facing rear end of said streamlined torpedo-shaped buoyancy tank;

a pair of watertight nacelles, said pair of watertight nacelles having a first watertight nacelle and a second watertight nacelle, said first watertight nacelle and said second watertight nacelle being identical, said first watertight nacelle connecting to said first horizontal water turbine axis, said second watertight nacelle connecting to said second horizontal water turbine axis, both said first watertight nacelle and said second watertight nacelle being firmly connected to each other through a center connecting means, said center connecting means having an upside, a down side and a center point, said center point being located below and slightly forward of said center of drag of said submersible electrical power generating structure, said center connecting means being securely mounted to said bottom side of said streamlined torpedo-shaped buoyancy tank through a third connecting means, said third connecting means being long enough to ensure said submersible electrical power generating structure having said center of buoyancy located above said center of gravity, said first nacelle being securely mounted to said bottom side of said streamlined torpedo-shaped buoyancy tank through a first connecting means, said second nacelle being securely mounted to said bottom side of said streamlined torpedo-shaped buoyancy tank through a second connecting means, said first nacelle having a first low-speed shaft connecting to said first horizontal water turbine axis, a first gear box connecting to said first low-speed shaft capable of converting low speed to high speed, a first high-speed shaft connecting to said first gear box, and a first electrical power generator driven by said high speed shaft capable of generating electrical power, said second watertight nacelle having a second low-speed shaft connecting to said second horizontal water turbine axis, a second gear box connecting to said second low-speed shaft capable of converting low speed to high speed, a second high-speed shaft connecting to said second gear box, and a second electrical power generator driven by said second high-speed shaft capable of generating electrical power, said pair of watertight nacelles being located sufficiently far apart to provide clearance for said pair of side-by-side counter-rotating full-bladed water turbine rotors, said center connecting means having a cooling system capable of effectively and efficiently distributing heat generated by said first gear box, said first electrical power generator, said second gear box and said second electrical power generator to outside water;

an attaching device located at said center point of said center connecting means, said attaching device being adjustable up and down vertically by a device that may be powered by electricity or compressed air to adjust the drag forces required to change the angle of attack of said pair of airfoil-shaped hydrofoils to balance changes in the downward vector force resulting from changes in the drag acting through a downward angled anchor line;

a weight member on ocean floor connecting to said submersible electrical power generating structure through a connecting means at said attaching device, said weight member on ocean floor limiting the height of said submersible electrical power generating structure floating above the ocean floor; and an electrical power collection and transmission structure connecting to said submersible electrical power generating structure for collecting and transmitting electrical current generated by said submersible electrical power generating structure.

14. The submersible electrical power generating plant in claim 13 is capable of being free of service or replacement for a period of time ranging from about eight to twenty years.

15. The submersible electrical power generating plant in claim 13, wherein said center of gravity of said submersible electrical power generating structure can be changed vertically and longitudinally by adding water into or subtracting water from said streamlined torpedo-shaped buoyancy tank.

16. The submersible electrical power generating plant in claim 13 is neither mounted on underwater structures nor suspended from any structure at water surface.

17. The submersible electrical power generating plant in claim 13 is capable of generating electrical power from low speed current flow when equipped with larger turbines and/or smaller generators and more gearing.

18. The submersible electrical power generating plant in claim 13 wherein said vertical tail fin can be on either said top side of said submersible electrical power generating structure extending upward or said bottom side of said submersible electrical power generating structure extending downward.

19. The submersible electrical power generating plant in claim 13 is capable of conveying kinetic energy by said pair of side-by-side counter-rotating full-bladed water turbine rotors through either said first electrical power generator or said second electrical power generator.

20. The submersible electrical power generating plant in claim 13, wherein said submersible electrical power generating structure is made of carbon fiber composites.

21. The submersible electrical power generating plant in claim 13, wherein said pair of side-by-side counter-rotating full-bladed water turbine rotors are sufficiently hollow so that their density is near that of the water displaced by said pair of side-by-side counter-rotating full-bladed water turbine rotors.

22. The submersible electrical power generating plant in claim 13, wherein said pair of side-by-side counter-rotating full-bladed water turbine rotors turn so that both said plurality of first blades and said plurality of second blades are moving downward at the center of the submersible electrical power generating plant and upward on the outside of the submersible electrical power generating plant.

23. The submersible electrical power generating plant in claim 13, wherein said first gear box, said second gear box, said first low-speed shaft, said second low-speed shaft, said first high-speed shaft, said second high-speed shaft, said first electrical power generator and said second electrical power generator are lubricated and cooled by oil.

24. The submersible electrical power generating plant in claim 13, wherein both said first electrical power generator and said second electrical power generator have many poles to permit both said first electrical power generator and said second electrical power to produce sixty-cycle electric current from low shaft speeds.

25. A submersible electrical power generating plant for generating electrical power with no fuel cost from the flow of ocean current, said submersible electrical power generating plant comprising:
a submersible electrical power generating structure having a superior located center of buoyancy, an inferior located center of gravity and a center of drag, said submersible power generating structure further comprising a streamlined torpedo-shaped buoyancy tank with a nose end, a rear end, a top side, a bottom side, a left side, a right side, and a plurality of compartments, said streamlined torpedo-shaped buoyancy tank being located above and between a pair of side-by-side counter-rotating full-bladed water turbine rotors, said pair of side-by-side counter-rotating full-bladed water turbine rotors having a first water turbine rotor with a first horizontal water turbine axis parallel to said streamlined torpedo-shaped buoyancy tank and a second water turbine rotor with a second horizontal water turbine axis parallel to said first horizontal water turbine axis, and a pair of watertight nacelles, said pair of watertight nacelles having a first watertight nacelle and a second watertight nacelle, said first watertight nacelle connecting to said first horizontal water turbine axis, said second watertight nacelle connecting to said second horizontal water turbine axis, said first watertight nacelle and said second watertight nacelle being connected to each other through a center connecting means, said center connecting means having an upside, a downside and a center point, said center point being placed below and slightly forward of said center of drag, said center connecting means being mounted to said bottom side of said streamlined torpedo-shaped buoyancy tank through a third connecting means;
an attaching device located at said center point of said center connecting means, said attaching device being adjustable up and down vertically; and
an electrical power collection and transmission structure connecting to said submersible electrical power generating structure for collecting and transmitting electrical current generated by said submersible electrical power generating structure.

26. The submersible electrical power generating plant in claim 25, said submersible electrical power generating plant being free of service or replacement for a period of time ranging from about eight to twenty years.

27. The submersible electrical power generating plant in claim 25, wherein said center of buoyancy of said submersible electrical power generating plant is above said center of gravity of said submersible electrical power generating plant.

28. The submersible electrical power generating plant in claim 25, wherein said center of gravity of said submersible electrical power generating plant is adjustable vertically and longitudinally by adding water into or subtracting water from said streamlined torpedo-shaped buoyancy tank.

29. The submersible electrical power generating plant in claim 25, said submersible electrical power generating plant conveying kinetic energy from said pair of side-by-side counter-rotating full-bladed water turbine rotors through either said first electrical power generator or said second electrical power generator.

30. The submersible electrical power generating plant in claim 25, wherein said pair of side-by-side counter-rotating full-bladed water turbine rotors are sufficiently hollow so that their density is near that of the water displaced by said pair of side-by-side counter-rotating full-bladed water turbine rotors.

31. The submersible electrical power generating plant in claim 25, wherein said pair of side-by-side counter-rotating full-bladed water turbine rotors turn so that both said plurality of first blades and said plurality of second blades are moving downward at the center of the submersible electrical power generating plant and upward on the outside of the submersible electrical power generating plant.

32. The submersible electrical power generating plant in claim 25, wherein said pair of watertight nacelles is lubricated and cooled by oil.

33. The submersible electrical power generating plant in claim 25, wherein both said first electrical power generator and said second electrical power generator have many poles to permit both said first electrical power generator and said second electrical power to produce sixty-cycle electric current from low shaft speeds.

34. The submersible electrical power generating plant in claim 25, wherein said streamlined torpedo-shaped buoyancy tank has a vertical tail fin capable of improving directional stability of said submersible electrical power generating plant, said vertical tail fin being on either said top side of said submersible electrical power generating plant extending upward or said bottom side of said submersible electrical power generating plant extending downward.

35. The submersible electrical power generating plant in claim 25, wherein said first water turbine rotor has a plurality of first rotor blades, said plurality of first rotor blades extending radially outward from said first horizontal water turbine axis.

36. The submersible electrical power generating plant in claim 25, wherein said second water turbine rotor has a plurality of second rotor blades, said plurality of second rotor blades extending radially outward from said second horizontal water turbine axis.

37. The submersible electrical power generating plant in claim 25, wherein said second watertight nacelle comprises a second low-speed shaft connecting to said second horizontal water turbine axis, a second gear box connecting to said second low speeding shaft capable of converting low speed to high speed, a second high-speed shaft connecting to said second gear box, and a second electrical power generator driven by said second high-speed shaft capable of generating electrical power.

38. The submersible electrical power generating plant in claim 25, wherein said pair of watertight nacelles is located sufficiently far apart to provide clearance for said pair of side-by-side counter-rotating full-bladed water turbine rotors.

39. The submersible electrical power generating plant in claim 25, wherein said center connecting means has a cooling system capable of effectively and efficiently distributing heat generated by said pair of generators and gearboxes in said pair of watertight nacelles.

40. A submersible electrical power generating plant for generating electrical power with no fuel cost from the flow of ocean current, said submersible electrical power generating plant comprising:
a submersible electrical power generating structure having a superior located center of buoyancy, an inferior located center of gravity and a center of drag, said submersible power generating structure further comprising a streamlined torpedo-shaped buoyancy tank with a nose end, a rear end, a top side, a bottom side, a left side, a right side, a plurality of valves, and a plurality of compartments, said streamlined torpedo-shaped buoyancy tank having a vertical tail fin capable of improving directional stability of said submersible electrical power generating structure, a pair of airfoil-shaped hydrofoils, said pair of airfoil-shaped hydrofoils having a first airfoil-shaped hydrofoil and a second airfoil-shaped hydrofoil, said first airfoil-shaped hydrofoil being a mirror image of said second airfoil-shaped hydrofoil, said first airfoil-shaped hydrofoil fixed on said left side of said streamlined torpedo-shaped buoyancy tank projecting horizontally leftward and said second airfoil-shaped hydrofoil fixed on said right side of said streamlined torpedo-shaped buoyancy tank projecting horizontally rightward, said pair of airfoil-shaped hydrofoils located at said rear end of said streamlined torpedo-shaped buoyancy tank, said pair of airfoil-shaped hydrofoils capable of providing said submersible electrical power generating structure with more lift and less drag at high angle of attack when the leading edges of the hydrofoils are higher than the trailing edges in relation to the flow of water;

a pair of side-by-side counter-rotating full-bladed water turbine rotors, said pair of side-by-side counter-rotating full-bladed water turbine rotors having a first water turbine rotor and a second water turbine rotor, said first water turbine rotor being a mirror image of said second water turbine rotor, said first water turbine rotor having a first horizontal water turbine axis parallel to said streamlined torpedo-shaped buoyancy tank and a plurality of first rotor blades, said plurality of first rotor blades extending radially outward from said first horizontal water turbine axis, said second water turbine rotor having a second horizontal water turbine axis parallel to said first horizontal water turbine axis and a plurality of second rotor blades, said plurality of second rotor blades extending radially outward from said second horizontal water turbine axis, said pair of counter-rotating full-bladed water turbine rotors being located beneath said streamlined torpedo-shaped buoyancy tank and facing rear end of said streamlined torpedo-shaped buoyancy tank;

a pair of watertight nacelles, said pair of watertight nacelles having a first watertight nacelle with a first pivoting point and a second watertight nacelle with a second pivoting point, said first watertight nacelle connecting to said first horizontal water turbine axis, said second watertight nacelle connecting to said second horizontal water turbine axis, both said first watertight nacelle and said second watertight nacelle being connected to each other through a center connecting means, said center connecting means having a upside, a down side and a center point, said center point being located below and slightly forward of said center of drag of said submersible electrical power generating structure, said center connecting means being mounted to said bottom side of said streamlined torpedo-shaped buoyancy tank through a third connecting means, said third connecting means being long enough to ensure said submersible electrical power generating structure having said center of buoyancy located above said center of gravity, said first nacelle being mounted to said bottom side of said streamlined torpedo-shaped buoyancy tank through a first connecting means at said first pivoting point, said first nacelle capable of turning vertically around said first pivoting point, said second nacelle being mounted to said bottom side of said streamlined torpedo-shaped buoyancy tank through a second connecting means at said second pivoting point, said second nacelle capable of turning vertically around said second pivoting point, said first nacelle having a first low-speed shaft connecting to said first horizontal water turbine axis, a first gear box connecting to said first low-speed shaft capable of converting low speed to high speed, a first high-speed shaft connecting to said first gear box, and a first electrical power generator driven by said high speed shaft capable of generating electrical power, said second watertight nacelle having a second low-speed shaft connecting to said second horizontal water turbine axis, a second gear box connecting to said second low-speed shaft capable of converting low speed to high speed, a second high-speed shaft connecting to said second gear box, and a second electrical power generator driven by said second high-speed shaft capable of generating electrical power, said pair of watertight nacelles being located sufficiently far apart to provide clearance for said pair of side-by-side counter-rotating full-bladed water turbine rotors, said center connecting means having a cooling system capable of effectively and efficiently distributing heat generated by said first gear box, said first electrical power generator, said second gear box and said second electrical power generator to outside water, said center connecting means having a horizontal level arm at said center point of said center connecting means extending horizontally backward toward said rear end of said streamlined torpedo-shaped buoyancy tank, said horizontal level arm having a second pair of horizontal fins, said second pair of horizontal fins having a third horizontal fin and a fourth horizontal fin, said third horizontal fin being a mirror image of said fourth horizontal fin, said horizontal level arm and said second pair of horizontal fins having a density near that of the water they displace, said second pair of horizontal fins capable of keeping said pair of side-by-side counter-rotating full-bladed water turbine rotors facing directly into the current regardless of the nose-high attitude or position of the streamlined torpedo-shaped buoyancy tank;

an attaching device located at said center point of said center connecting means, said attaching device being adjustable up and down vertically by a device that may be powered by electricity or compressed air to adjust the drag forces required to change the angle of attack of said pair of airfoil-shaped hydrofoils to balance changes in the downward vector force resulting from changes in the drag acting through a downward angled anchor line;

a weight member on ocean floor connecting to said submersible electrical power generating structure through a connecting means at said attaching device, said weight member on ocean floor limiting the height of said submersible electrical power generating structure floating above the ocean floor; and an electrical power collection and transmission structure connecting to said submersible electrical power generating structure for collecting and transmitting electrical current.

41. The submersible electrical power generating plant in claim 40 is capable of being free of service or replacement for a period of time ranging from about eight to twenty years.

42. The submersible electrical power generating plant in claim 40, wherein said center of gravity of said submersible electrical power generating structure can be changed vertically and longitudinally by adding water to or subtracting water from said streamlined torpedo-shaped buoyancy tank.

43. The submersible electrical power generating plant in claim 40 is neither mounted on underwater structures nor suspended from any structure at water surface.

44. The submersible electrical power generating plant in claim 40 is capable of generating electrical power from low speed current flow when equipped with larger turbines and/or smaller generators and more gearing.

45. The submersible electrical power generating plant in claim 40, wherein said vertical tail fin can be on either said top side of said submersible electrical power generating structure extending upward or said bottom side of said submersible electrical power generating structure extending downward.

46. The submersible electrical power generating plant in claim 40 is capable of conveying kinetic energy by said pair of side-by-side counter-rotating full-bladed water turbine rotors through either said first electrical power generator or said second electrical power generator.

47. The submersible electrical power generating plant in claim 40, wherein said submersible electrical power generating structure is made of carbon fiber composites.

48. The submersible electrical power generating plant in claim 40, wherein said pair of side-by-side counter-rotating full-bladed water turbine rotors are sufficiently hollow so that their density is near that of the water displaced by said pair of side-by-side counter rotating full-baled water turbine rotors.

49. The submersible electrical power generating plant in claim 40, wherein said pair of side-by-side counter-rotating full-bladed water turbine rotors turn so that both said plurality of first blades and said plurality of second blades are moving downward at the center of the submersible electrical power generating plant and upward on the outside of the submersible electrical power generating plant.

50. The submersible electrical power generating plant in claim 40, wherein said first gear box, said second gear box, said first low-speed shaft, said second low-speed shaft, said first high-speed shaft, said second high-speed shaft, said first electrical power generator and said second electrical power generator are lubricated and cooled by oil.

51. The submersible electrical power generating plant in claim 40, wherein both said first electrical power generator and said second electrical power generator have many poles to permit both said first electrical power generator and said second electrical power to produce sixty-cycle electric current from low shaft speeds.

52. A submersible electrical power generating plant for generating electrical power with no fuel costs from the flow of ocean current, said submersible electrical power generating plant comprising:

a submersible electrical power generating structure having a superior located center of buoyancy, an inferior located center of gravity and a center of drag, said submersible power generating structure further comprising a streamlined torpedo-shaped buoyancy tank with a nose end, a rear end, a top side, a bottom side, a left side, said left side having a first adjustable stop, a right side, said right side having a second adjustable stop, a plurality of valves, and a plurality of compartments, said streamlined torpedo-shaped buoyancy tank having a vertical tail fin capable of improving directional stability of said submersible electrical power generating structure, a first pair of airfoil-shaped hydrofoils having a first airfoil-shaped hydrofoil and a second airfoil-shaped hydrofoil, said first airfoil-shaped hydrofoil having a first leading edge, said second airfoil-shaped hydrofoil having a second leading edge, said first pair of airfoil-shaped hydrofoils being self-adjusting lifting hydrofoils, said first airfoil-shaped hydrofoil being a mirror image of said second airfoil-shaped hydrofoil, said first airfoil-shaped hydrofoil fixed on said left side of said streamlined torpedo-shaped buoyancy tank at a first pivoting point through a first pivoting member projecting horizontally leftward, a first front surface area of said first airfoil-shaped hydrofoil front of said first pivoting member being nearly equal to a first back surface area of said first airfoil-shaped hydrofoil behind said first pivoting member, said first airfoil-shaped hydrofoil having a first lever arm, said first lever arm attached to said first airfoil-shaped hydrofoil at said first pivoting point and extending vertically upward, said first lever arm having a first flat plate, said first flat plate capable of being slid up and down said first lever arm and secured at any point, said first airfoil-shaped hydrofoil having a first rod at said first leading edge, said first rod extending forward having a first counter weight, said first counter weight capable of being secured at any point on said first rod, said first leading edge being prevented from tipping below horizontal or any angle by said first adjustable stop, and said second airfoil-shaped hydrofoil fixed on said right side of said streamlined torpedo-shaped buoyancy tank at a second pivoting point through a second pivoting member projecting horizontally rightward, a second front surface area of said second airfoil-shaped hydrofoil front of said second pivoting member being nearly equal to a second back surface area of said second airfoil-shaped hydrofoil behind said second pivoting member, said second airfoil-shaped hydrofoil having a second lever arm, said second lever arm attached to said second airfoil-shaped hydrofoil at said second pivoting point and extending vertically upward, said second lever arm having a second flat plat, said second flat plate capable of being slid up and down said second lever arm and secured at any point, said second airfoil-shaped hydrofoil having a second rod at said second leading edge, said second rod extending forward having a second counter weight, said second counter weight capable of being secured at any point on said second rod, said second leading edge being prevented from tipping below horizontal or any angle by said second adjustable stop, said first airfoil-shaped hydrofoil and said second airfoil-shaped hydrofoil being linked together by a shaft extending horizontally through said streamlined torpedo-shaped buoyancy tank at both said first pivoting point and said second pivoting point, said first pair of airfoil-shaped hydrofoils being located right above or slightly forward of said center of gravity of said submersible electrical power generating structure, said first pair of self-adjusting airfoil-shaped hydrofoils capable of providing said submersible electrical power generating structure with more lift and less drag at high angle of attack when the leading edges of the hydrofoils are higher than the trailing edges in relation to the flow of water, a second pair of airfoil-shaped hydrofoils, said second pair of airfoil-shaped hydrofoils having a third airfoil-shaped hydrofoil and a fourth airfoil-shaped hydrofoil, said third airfoil-shaped hydrofoil being a mirror image of said fourth airfoil-shaped hydrofoil, said third airfoil-shaped hydrofoil fixed on said left side of said streamlined torpedo-shaped buoyancy tank projecting horizontally leftward and said fourth airfoil-shaped hydrofoil fixed on said right side of said streamlined torpedo-shaped buoyancy tank projecting horizontally rightward, said second pair of airfoil-shaped hydrofoils located at said rear end of said streamlined torpedo-shaped buoyancy tank capable of keeping said submersible electrical power generating structure level;

a pair of side-by-side counter-rotating full-bladed water turbine rotors, said pair of side-by-side counter-rotating full-bladed water turbine rotors being kept vertical and facing directly into the current by said second pair of airfoil-shaped hydrofoils, said pair of side-by-side counter-rotating full-bladed water turbine rotors having a first water turbine rotor and a second water turbine rotor, said first water turbine rotor being a mirror image of said second water turbine rotor, said first water turbine rotor having a first horizontal water turbine axis parallel to said streamlined torpedo-shaped buoyancy tank and a plurality of first rotor blades, said plurality of first rotor blades extending radially outward from said first horizontal water turbine axis, said second water turbine rotor having a second horizontal water turbine axis parallel to said first horizontal water turbine axis and a plurality of second rotor blades, said plurality of second rotor blades extending radially outward from said second horizontal water turbine axis, said pair of counter-rotating full-bladed water turbine rotors being located beneath said streamlined torpedo-shaped buoyancy tank and facing rear end of said streamlined torpedo-shaped buoyancy tank;

a pair of watertight nacelles, said pair of watertight nacelles having a first watertight nacelle and a second watertight nacelle, said first watertight nacelle being a mirror image of said second watertight nacelle, said first watertight nacelle connecting to said first horizontal water turbine axis, said second watertight nacelle connecting to said second horizontal water turbine axis, both said first watertight nacelle and said second watertight nacelle being firmly connected to each other through a center connecting means, said center connecting means having an upside, a down side and a center point, said center point being located below and slightly forward of said center of drag of said submersible electrical power generating structure, said center connecting means being securely mounted to said bottom side of said streamlined torpedo-shaped buoyancy tank through a third connecting means, said third connecting means being long enough to ensure said submersible electrical power generating structure having said center of buoyancy located above said center of gravity, said first nacelle being securely mounted to said bottom side of said streamlined torpedo-shaped buoyancy tank through a first connecting means, said second nacelle being securely mounted to said bottom side of said streamlined torpedo-shaped buoyancy tank through a second connecting means, said first nacelle having a first low-speed shaft connecting to said first horizontal water turbine axis, a first gear box connecting to said first low-speed shaft capable of converting low speed to high speed, a first high-speed shaft connecting to said first gear box, and a first electrical power generator driven by said high speed shaft capable of generating electrical power, said second watertight nacelle having a second low-speed shaft connecting to said second horizontal water turbine axis, a second gear box connecting to said second low-speed shaft capable of converting low speed to high speed, a second high-speed shaft connecting to said second gear box, and a second electrical power generator driven by said second high-speed shaft capable of generating electrical power, said pair of watertight nacelles being located sufficiently far apart to provide clearance for said pair of side-by-side counter-rotating full-bladed water turbine rotors, said center connecting means having a cooling system capable of effectively and efficiently distributing heat generated by said first gear box, said first electrical power generator, said second gear box, and said second electrical power generator to outside water;

an attaching device located at said center point of said center connecting means, said attaching device being adjustable up and down vertically;

a weight member on ocean floor connecting to said submersible electrical power generating structure through a connecting means at said attaching device, said weight member on ocean floor limiting the height of said submersible electrical power generating structure floating above the ocean floor; and an electrical power collection and transmission structure connecting to said submersible electrical power generating structure for collecting and transmitting electrical current generated by said submersible electrical power generating structure.

53. The submersible electrical power generating plant in claim 52, wherein said self-adjusting hydrofoils utilize the changing kinetic energy in the current to adjust the hydrofoil's lifting forces to balance those downward vector forces that are caused by those changes in current velocity.

54. The submersible electrical power generating plant in claim 52, wherein said center of gravity of said submersible electrical power generating structure can be changed vertically and longitudinally by adding water into or subtracting water from said streamlined torpedo-shaped buoyancy tank.

55. The submersible electrical power generating plant in claim 52, wherein piping from each of said plurality of compartments of said streamlined torpedo-shaped buoyancy tank is connected to said plurality of valves that are accessible for manipulation near said rear end of said streamlined torpedo-shaped buoyancy tank buoyancy for adjusting water levels in each of said plurality of compartments.

56. The submersible electrical power generating plant in claim 52 is neither mounted on underwater structures nor suspended from any structure at water surface.

57. The submersible electrical power generating plant in claim 52 is capable of generating electrical power from low speed current flow when equipped with larger turbines and/or smaller generators and more gearing.

58. The submersible electrical power generating plant in claim 52 wherein said vertical tail fin can be on either said top side of said submersible electrical power generating structure extending upward or said bottom side of said submersible electrical power generating structure extending downward.

59. The submersible electrical power generating plant in claim 52 is capable of conveying kinetic energy by said pair of side-by-side counter-rotating full-bladed water turbine rotors through either said first electrical power generator or said second electrical power generator.

60. The submersible electrical power generating plant in claim 52 is capable of remaining substantially horizontal under different downward forces.

61. The submersible electrical power generating plant in claim 52, wherein said submersible electrical power generating structure is made of carbon fiber composites.

62. The submersible electrical power generating plant in claim 52, wherein said pair of side-by-side counter-rotating full-bladed water turbine rotors are sufficiently hollow so that their density is near that of the water displaced by said pair of side-by-side counter-rotating full-bladed water turbine rotors.

63. The submersible electrical power generating plant in claim 52, wherein said pair of side-by-side counter-rotating full-bladed water turbine rotors turn so that both said plurality of first blades and said plurality of second blades are moving downward at the center of the submersible electrical power generating plant and upward on the outside of the submersible electrical power generating plant.

64. The submersible electrical power generating plant in claim 52, wherein said first gear box, said second gear box, said first low-speed shaft, said second low-speed shaft, said first high-speed shaft, said second high-speed shaft, said first electrical power generator and said second electrical power generator are lubricated and cooled by oil.

65. The submersible electrical power generating plant in claim 52, wherein both said first electrical power generator and said second electrical power generator are ring generators with many poles to permit both said first electrical power generator and said second electrical power to produce sixty-cycle electric current from low shaft speeds.

66. A submersible electrical power generating plant for generating electrical power with no fuel costs from the flow of ocean current, said submersible electrical power generating plant comprising:

a submersible electrical power generating structure having a superior located center of buoyancy, an inferior located center of gravity and a center of drag, said submersible power generating structure further comprising a streamlined torpedo-shaped buoyancy tank with a nose end, a rear end, a top side, a bottom side, a left side, a right side, a plurality of valves, and a plurality of compartments, said streamlined torpedo-shaped buoyancy tank having a first pair of airfoil-shaped hydrofoils having a first airfoil-shaped hydrofoil and a second airfoil-shaped hydrofoil, said first airfoil-shaped hydrofoil being a mirror image of said second airfoil-shaped hydrofoil, said first airfoil-shaped hydrofoil fixed on said left side of said streamlined torpedo-shaped buoyancy tank projecting horizontally leftward and said second airfoil-shaped hydrofoil fixed on said right side of said streamlined torpedo-shaped buoyancy tank projecting horizontally rightward, said first pair of airfoil-shaped hydrofoils located above said center of gravity of said submersible electrical power generating structure, a second pair of airfoil-shaped hydrofoils, said second pair of airfoil-shaped hydrofoils having a third airfoil-shaped hydrofoil and a fourth airfoil-shaped hydrofoil, said third airfoil-shaped hydrofoil being a mirror image of said fourth airfoil-shaped hydrofoil, said third airfoil-shaped hydrofoil fixed on said left side of said streamlined torpedo-shaped buoyancy tank projecting horizontally leftward and said fourth airfoil-shaped hydrofoil fixed on said right side of said streamlined torpedo-shaped buoyancy tank projecting horizontally rightward, said second pair of airfoil-shaped hydrofoils located at said rear end of said streamlined torpedo-shaped buoyancy tank, both said first pair of airfoil-shaped hydrofoils and said second pair of airfoil-shaped hydrofoils capable of providing said submersible electrical power generating structure with more lift and less drag at high angle of attack when the leading edges of the hydrofoils are higher than the trailing edges in relation to the flow of water, the water level in each of said plurality of compartments being adjustable by piping the water in and out through said plurality of valves;

a pair of side-by-side counter-rotating full-bladed water turbine rotors, said pair of side-by-side counter-rotating full-bladed water turbine rotors having a first water turbine rotor and a second water turbine rotor, said first water turbine rotor being a mirror image of said second water turbine rotor, said first water turbine rotor having a first horizontal water turbine axis parallel to said streamlined torpedo-shaped buoyancy tank and a plurality of first rotor blades, said plurality of first rotor blades extending radially outward from said first horizontal water turbine axis, said second water turbine rotor having a second horizontal water turbine axis parallel to said first horizontal water turbine axis and a plurality of second rotor blades, said plurality of second rotor blades extending radially outward from said second horizontal water turbine axis, said pair of counter-rotating full-bladed water turbine rotors being located beneath said streamlined torpedo-shaped buoyancy tank and facing rear end of said streamlined torpedo-shaped buoyancy tank;

a pair of watertight nacelles, said pair of watertight nacelles having a first watertight nacelle and a second watertight nacelle, said first watertight nacelle being a mirror image of said second watertight nacelle, said first watertight nacelle connecting to said first horizontal water turbine axis, said second watertight nacelle connecting to said second horizontal water turbine axis, both said first watertight nacelle and said second watertight nacelle being firmly connected to each other through a center connecting means, said center connecting means having a upside, a down side and a center point, said center point being located below and slightly forward of said center of drag of said submersible electrical power generating structure, said center connecting means being securely mounted to said bottom side of said streamlined torpedo-shaped buoyancy tank through a third connecting means, said third connecting means being long enough to ensure said submersible electrical power generating structure having said center of buoyancy located above said center of gravity, said first nacelle being securely mounted to said bottom side of said streamlined torpedo-shaped buoyancy tank through a first connecting means, said second nacelle being securely mounted to said bottom side of said streamlined torpedo-shaped buoyancy tank through a second connecting means, said first nacelle having a first low-speed shaft connecting to said first horizontal water turbine axis, a first gear box connecting to said first low-speed shaft capable of converting low speed to high speed, a first high-speed shaft connecting to said first gear box, and a first electrical power generator driven by said high speed shaft capable of generating electrical power, said second watertight nacelle having a second low-speed shaft connecting to said second horizontal water turbine axis, a second gear box connecting to said second low-speed shaft capable of converting low speed to high speed, a second high-speed shaft connecting to said second gear box, and a second electrical power generator driven by said second high-speed shaft capable of generating electrical power, said pair of watertight nacelles being located sufficiently far apart to provide clearance for said pair of side-by-side counter-rotating full-bladed water turbine rotors, said center connecting means having a cooling system capable of effectively and efficiently distributing heat generated by said first gear box, said first electrical power generator, said second gear box and said second electrical power generator to outside water; and an attaching device located at said center point of said center connecting means, said attaching device being adjustable up and down vertically by a device that may be powered by electricity or compressed air to adjust the drag forces required to change the angle of attack of said pair of airfoil-shaped hydrofoils to balance changes in the downward vector force resulting from changes in the drag acting through a downward angled anchor line.

67. The submersible electrical power generating plant in claim 66 is capable of being free of service or replacement for a period of time ranging from about eight to twenty years.

68. The submersible electrical power generating plant in claim 67 is capable of changing said center of gravity by adding water into or subtracting water from said streamlined torpedo-shaped buoyancy tank.

69. The submersible electrical power generating plant in claim 68, wherein said streamlined torpedo-shaped buoyancy tank has a vertical tail fin capable of improving directional stability of said submersible electrical power generating structure.

70. The submersible electrical power generating plant in claim 69, wherein said vertical tail fin is either said top side of said submersible electrical power generating structure extending upward or said bottom side of said submersible electrical power generating structure extending downward.

71. The submersible electrical power generating plant in claim 70, wherein said submersible electrical power generating structure is made of carbon fiber composites.

72. The submersible electrical power generating plant in claim 71 is neither mounted on underwater structures nor suspended from any structure at water surface.

73. The submersible electrical power generating plant in claim 72 is capable of generating electrical power from low speed current flow when equipped with larger turbines and/or smaller generators and more gearing.

74. The submersible electrical power generating plant in claim 73 is capable of conveying kinetic energy by said pair of side-by-side counter-rotating full-bladed water turbine rotors through either said first electrical power generator or said second electrical power generator.

75. The submersible electrical power generating plant in claim 74 has a weight member on ocean floor connecting to said submersible electrical power generating structure through a connecting means at said attaching device, said weight member on ocean floor limiting the height of said submersible electrical power generating structure floating above the ocean floor.

76. The submersible electrical power generating plant in claim 75 has an electrical power collection and transmission structure connecting to said submersible electrical power generating structure for collecting and transmitting electrical current generated by said submersible electrical power generating structure.

77. The submersible electrical power generating plant in claim 66, wherein said pair of side-by-side counter-rotating full-bladed water turbine rotors are sufficiently hollow so that their density is near that of the water displaced by said pair of side-by-side counter-rotating full-bladed water turbine rotors.

78. The submersible electrical power generating plant in claim 66, wherein said pair of side-by-side counter-rotating full-bladed water turbine rotors turn so that both said plurality of first blades and said plurality of second blades are moving downward at the center of the submersible electrical power generating plant and upward on the outside of the submersible electrical power generating plant.

79. The submersible electrical power generating plant in claim 66, wherein said first gear box, said second gear box, said first low-speed shaft, said second low-speed shaft, said first high-speed shaft, said second high-speed shaft, said first electrical power generator and said second electrical power generator are lubricated and cooled by oil.

80. The submersible electrical power generating plant in claim 66, wherein both said first electrical power generator and said second electrical power generator have many poles to permit both said first electrical power generator and said second electrical power generator to produce sixty-cycle electric current from low shaft speeds.

81. The submersible electric power generating plant in claim 1, wherein kinetic energy in the ocean current is utilized to adjust angle of attack of the hydrofoil to balance the lifting force to the downward vector force resulting from the drag acting on the downward angled anchor lone.

82. The submersible electric power generating plant in claim 13, wherein kinetic energy in the ocean current is utilized to adjust angle of attack of the hydrofoil to balance the lifting force to the downward vector force resulting from the drag acting on the downward angled anchor lone.

83. The submersible electric power generating plant in claim 40, wherein kinetic energy in the ocean current is utilized to adjust angle of attack of the hydrofoil to balance the lifting force to the downward vector force resulting from the drag acting on the downward angled anchor lone.

84. The submersible electric power generating plant in claim 52 wherein kinetic energy in the ocean current is utilized to adjust angle of attack of the hydrofoil to balance the lifting force to the downward vector force resulting from the drag acting on the downward angled anchor lone.

85. A submersible electrical power generating plant for generating electrical power with no fuel costs from the flow of ocean current, said submersible electrical power generating plant comprising:

a submersible electrical power generating structure having a superior located center of buoyancy, an inferior located center of gravity and a center of drag, said submersible electrical power generating structure further comprising a streamlined torpedo-shaped buoyancy tank with a nose end, a rear end, a top side, a bottom side, a left side, a right side, and a plurality of compartments, said streamlined torpedo-shaped buoyancy tank having a vertical tail fin capable of improving directional stability of said submersible electrical power generating structure, a first pair of airfoil-shaped hydrofoils having a first airfoil-shaped hydrofoil and a second airfoil-shaped hydrofoil, said first pair of airfoil-shaped hydrofoils being controlled by water-pressure reading devices, having a first movable airfoil-shaped hydrofoil and a second movable airfoil-shaped hydrofoil, said first movable airfoil-shaped hydrofoil being a mirror image of said second movable airfoil-shaped hydrofoil, said first movable airfoil-shaped hydrofoil being located on said left side of said streamlined torpedo-shaped buoyancy tank projecting horizontally leftward and said second movable airfoil-shaped hydrofoil being located on said right side of said streamlined torpedo-shaped buoyancy tank projecting horizontally rightward, a second pair of airfoil-shaped hydrofoils, said second pair of airfoil-shaped hydrofoils having a third airfoil-shaped hydrofoil and a fourth airfoil-shaped hydrofoil, said third airfoil-shaped hydrofoil being a mirror image of said fourth airfoil-shaped hydrofoil, said third airfoil-shaped hydrofoil fixed on said left side of said streamlined torpedo-shaped buoyancy tank projecting horizontally leftward and said fourth airfoil-shaped hydrofoil fixed on said right side of said streamlined torpedo-shaped buoyancy tank projecting horizontally rightward, said first pair of airfoil-shaped hydrofoils located above said center of gravity of said submersible electrical power generating structure, said second pair of airfoil-shaped hydrofoils fixed at said rear end of said streamlined torpedo-shaped buoyancy tank; said first airfoil-shaped hydrofoil fixed on said left side of said streamlined torpedo-shaped buoyancy tank projecting horizontally leftward and said second airfoil-shaped hydrofoil fixed on said right side of said streamlined torpedo-shaped buoyancy tank projecting horizontally rightward;

a second pair of airfoil-shaped hydrofoils, said second pair of airfoil-shaped hydrofoils having a third airfoil-shaped hydrofoil and a fourth airfoil-shaped hydrofoil, said third airfoil-shaped hydrofoil being a mirror image of said fourth airfoil-shaped hydrofoil, said third airfoil-shaped hydrofoil fixed on said left side of said streamlined torpedo-shaped buoyancy tank projecting horizontally leftward and said fourth airfoil-shaped hydrofoil fixed on said right side of said streamlined torpedo-shaped buoyancy tank projecting horizontally rightward, said second pair of airfoil-shaped hydrofoils located at said rear end of said streamlined torpedo-shaped buoyancy tank, both said first pair of airfoil-shaped hydrofoils and said second pair of airfoil-shaped hydrofoils capable of providing said submersible electrical power generating structure with more lift and less drag at high angle of attack;

a pair of side-by-side counter-rotating full-bladed water turbine rotors, said pair of side-by-side counter-rotating full-bladed water turbine rotors having a first water turbine rotor and a second water turbine rotor, said first water turbine rotor being a mirror image of said second water turbine rotor, said first water turbine rotor having a first horizontal water turbine axis parallel to said streamlined torpedo-shaped buoyancy tank and a plurality of first rotor blades, said plurality of first rotor blades extending radially outward from said first horizontal water turbine axis, said second water turbine rotor having a second horizontal water turbine axis parallel to said first horizontal water turbine axis and a plurality of second rotor blades, said plurality of second rotor blades extending radially outward from said second horizontal water turbine axis, said pair of counter-rotating full-bladed water turbine rotors being located beneath said streamlined torpedo-shaped buoyancy tank and facing rear end of said streamlined torpedo-shaped buoyancy tank;

a pair of watertight nacelles, said pair of watertight nacelles having a first watertight nacelle and a second watertight nacelle, said first watertight nacelle is a mirror image of said second watertight nacelle, said first watertight nacelle connecting to said first horizontal water turbine axis, said second watertight nacelle connecting to said second horizontal water turbine axis, both said first watertight nacelle and said second watertight nacelle being firmly connected to each other through a center connecting means, said center connecting means having an upside, a down side and a center point, said center point being located below and slightly forward of said center of drag of said submersible electrical power generating structure, said center connecting means being securely mounted to said bottom side of said streamlined torpedo-shaped buoyancy tank through a third connecting means, said third connecting means being long enough to ensure said submersible electrical power generating structure having said center of buoyancy located above said center of gravity, said first nacelle being securely mounted to said bottom side of said streamlined torpedo-shaped buoyancy tank through a first connecting means, said second nacelle being securely mounted to said bottom side of said streamlined torpedo-shaped buoyancy tank through a second connecting means, said first nacelle having a first low-speed shaft connecting to said first horizontal water turbine axis, a first gear box connecting to said first low-speed shaft capable of converting low speed to high speed, a first high-speed shaft connecting to said first gear box, and a first electrical power generator driven by said high speed shaft capable of generating electrical power, said second watertight nacelle having a second low-speed shaft connecting to said second horizontal water turbine axis, a second gear box connecting to said second low-speed shaft capable of converting low speed to high speed, a second high-speed shaft connecting to said second gear box, and a second electrical power generator driven by said second high-speed shaft capable of generating electrical power, said pair of watertight nacelles being located sufficiently far apart to provide clearance for said pair of side-by-side counter-rotating full-bladed water turbine rotors, said center connecting means having a cooling system capable of effectively and efficiently distributing heat generated by said first gear box, said first electrical power generator, said second gear box and said second electrical power generator to outside water;

a water pressure reading system, said water pressure reading system capable of reading water pressure and the rate of water pressure changes of outside water at various points outside said streamlined torpedo-shaped buoyancy tank from a plurality of water pressure reading devices;

a water pump system, said water pump system being located in said streamlined torpedo-shaped buoyancy tank, said pump system having a first group of pumps and a second group of pumps, both said first group of pumps and said second group of pumps having a plurality of pumps, said first group of pumps capable of pumping water in and out of said streamlined torpedo-shaped buoyancy tank to adjust the total weight of said submersible electrical power generating structure, said second group of pumps capable of transferring water between said plurality of compartments;

a depth control system being located in the said streamlined torpedo-shaped buoyancy tank, said depth control system capable of reading water pressure of outside water and rate of water pressure changes of outside water, said depth control system capable of controlling said water pump system and said first movable airfoil-shaped hydrofoil and said second movable airfoil-shaped hydrofoil; and a level-controlling switch system in the streamlined torpedo-shaped buoyancy tank, said level-controlling switch system having a plurality of level-controlling switches capable of allowing the transfer of water between said plurality of compartments.

86. The submersible electrical power generating plant in claim 85, said submersible electrical power generating plants maintaining a uniform depth by adding water into or subtracting water from said plurality of compartments.

87. The submersible electrical power generating plant in claim 85, said submersible electrical power generating plant maintaining a uniform depth and horizontal position, while under different downward forces, without using a bottom weight connecting to said submersible electrical power generating plant.

88. The submersible electrical power generating plant in claim 85, wherein a water filtering system in the streamlined torpedo-shaped buoyancy tank is capable of filtering plankton from water entering said streamlined torpedo-shaped buoyancy tank.

89. The submersible electrical power generating plant in claim 85 is capable of being free of service or replacement for a period of time ranging from about eight to twenty years.

90. The submersible electrical power generating plant in claim 85 is neither mounted on underwater structures nor suspended from any structure at water surface.

91. The submersible electrical power generating plant in claim 85 is capable of generating electrical power from low speed current flow when equipped with larger turbines and/or smaller generators and more gearing.

92. The submersible electrical power generating plant in claim 85, wherein said streamlined torpedo-shaped buoyancy tank has a vertical tail fin capable of improving directional stability of said submersible electrical power generating plant, said vertical tail fin being on either said top side of said submersible electrical power generating plant extending upward or said bottom side of said submersible electrical power generating plant extending downward.

93. The submersible electrical power generating plant in claim 85 is capable of conveying kinetic energy by said pair of side-by-side counter-rotating full-bladed water turbine rotors through either said first electrical power generator or said second electrical power generator.

94. The submersible electrical power generating plant in claim 85, wherein said submersible electrical power generating structure is made of carbon fiber composites.

95. The submersible electrical power generating plant in claim 85, wherein said pair of side-by-side counter-rotating full-bladed water turbine rotors are sufficiently hollow so that their density is near that of the water displaced by said pair of side-by-side counter-rotating full-bladed water turbine rotors.

96. The submersible electrical power generating plant in claim 85 wherein said pair of side-by-side counter-rotating full-bladed water turbine rotors turn so that both said plurality of first blades and said plurality of second blades are moving downward at the center of the submersible electrical power generating plant and upward on the outside of the submersible electrical power generating plant.

97. The submersible electrical power generating plant in claim 85, wherein said first gear box, said second gear box, said first low-speed shaft, said second low-speed shaft, said first high-speed shaft, said second high-speed shaft, said first electrical power generator and said second electrical power generator are lubricated and cooled by oil.

98. The submersible electrical power generating plant in claim 85, wherein both said first electrical power generator and said second electrical power generator have many poles to permit both said first electrical power generator and said second electrical power generator to produce sixty-cycle electric current from low shaft speeds.

* * * * *